United States Patent [19]
Ichinose et al.

[11] Patent Number: 5,662,088
[45] Date of Patent: Sep. 2, 1997

[54] ENGINE

[75] Inventors: Hiroki Ichinose, Fujinomiya; Keiso Takeda, Mishima; Susumu Kojima; Shinji Sadakane, both of Susono, all of Japan

[73] Assignee: Toyota Jidosha Kabushiki Kaisha, Aichi, Japan

[21] Appl. No.: 729,657

[22] Filed: Oct. 21, 1996

Related U.S. Application Data

[62] Division of Ser. No. 515,883, Aug. 16, 1995, Pat. No. 5,596,957.

[30] Foreign Application Priority Data

Aug. 17, 1994 [JP] Japan .................... 6-193121
Apr. 7, 1995 [JP] Japan .................... 7-82857

[51] Int. Cl.$^6$ ........................... F02M 51/00
[52] U.S. Cl. ............................. 123/492; 123/585
[58] Field of Search ................ 123/492, 179.18, 123/413, 585, 675

[56] References Cited

U.S. PATENT DOCUMENTS

| | | | |
|---|---|---|---|
| 4,523,561 | 6/1985 | Kosuge | 123/179.18 |
| 4,644,919 | 2/1987 | Inoguchi et al. | 123/179.18 |
| 4,672,929 | 6/1987 | Wissmann et al. | 123/179.18 |
| 5,233,831 | 8/1993 | Hitomi et al. | 123/179.18 |
| 5,474,052 | 12/1995 | Aquino et al. | 123/675 |
| 5,515,825 | 5/1996 | Arai et al. | 123/413 |
| 5,526,794 | 6/1996 | Messih et al. | 123/492 |
| 5,542,388 | 8/1996 | Ichinose et al. | 123/492 |
| 5,546,909 | 8/1996 | Messih et al. | 123/492 |
| 5,546,910 | 8/1996 | Messih et al. | 123/492 |

FOREIGN PATENT DOCUMENTS

| | | |
|---|---|---|
| 59-77049 | 5/1982 | Japan . |
| 58-25666 | 2/1983 | Japan . |
| 61-19968 | 1/1986 | Japan . |
| 62-71337 | 5/1987 | Japan . |
| 63-143349 | 6/1988 | Japan . |
| 63-108567 | 7/1988 | Japan . |
| 1-198749 | 8/1989 | Japan . |
| 3-138443 | 6/1991 | Japan . |
| 6-229353 | 8/1994 | Japan . |

*Primary Examiner*—Raymond A. Nelli
*Attorney, Agent, or Firm*—Kenyon & Kenyon

[57] ABSTRACT

An engine, having an intake passage, a throttle valve arranged in the intake passage, and a fuel injector arranged in the intake passage for injecting fuel into the intake passage, comprises an air-flow control valve arranged in the intake passage between the fuel injector and the throttle valve. The air-flow control valve is controlled to close during the engine starting operation, and to open after the engine starting operation completes. The air-flow control valve has a valve element having an axis about which the element is rotatable when the valve is opened or closed. The rotational direction of the valve element is selected so that air flowing through the valve is guided by the valve toward the fuel injector when the air-flow control valve is controlled to an intermediate open position which is between the closed position and the full open position.

10 Claims, 65 Drawing Sheets

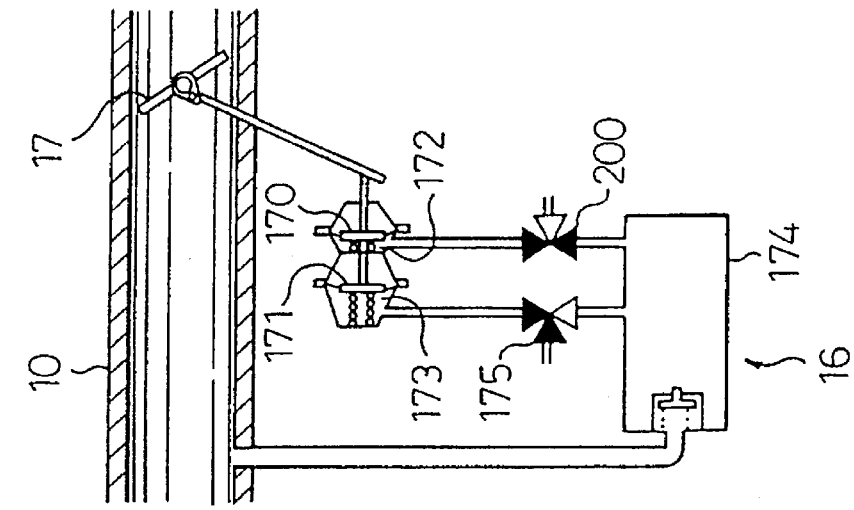
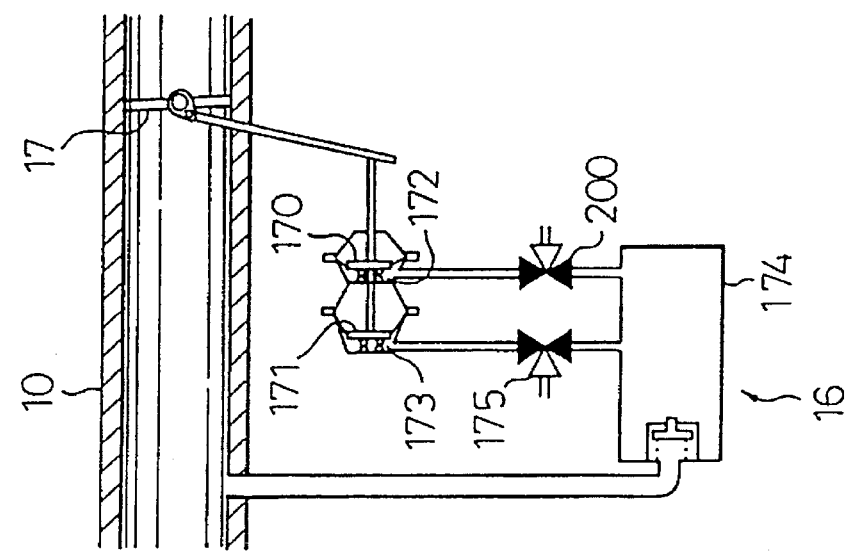
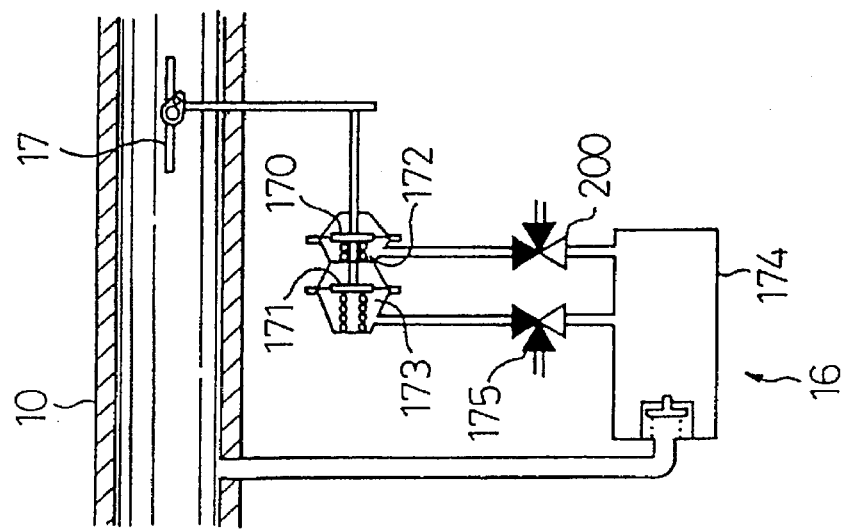

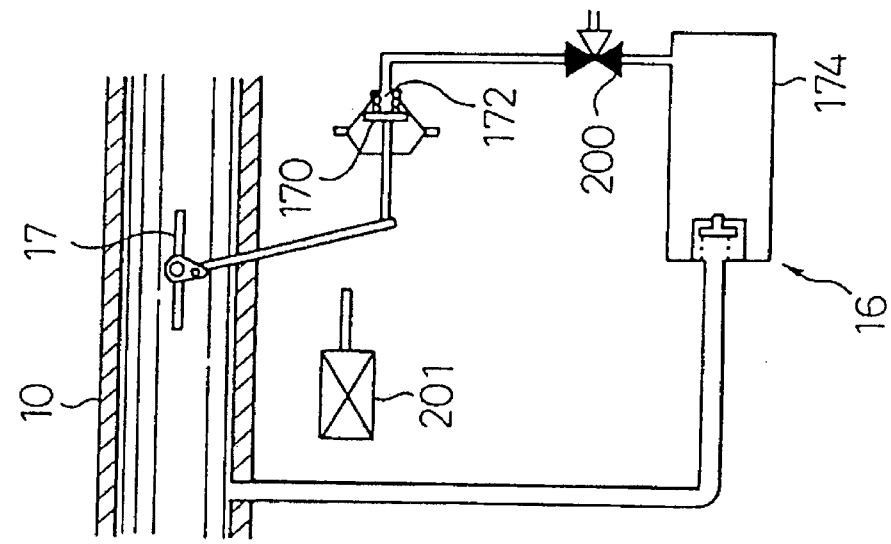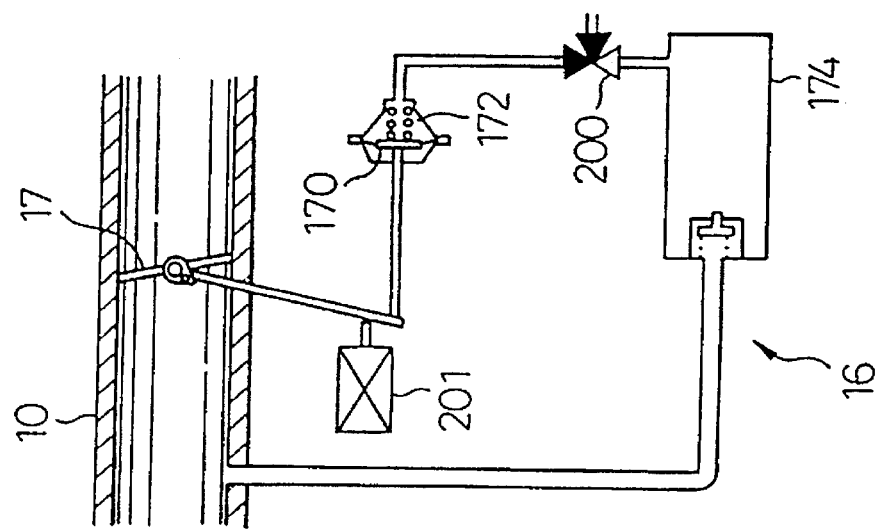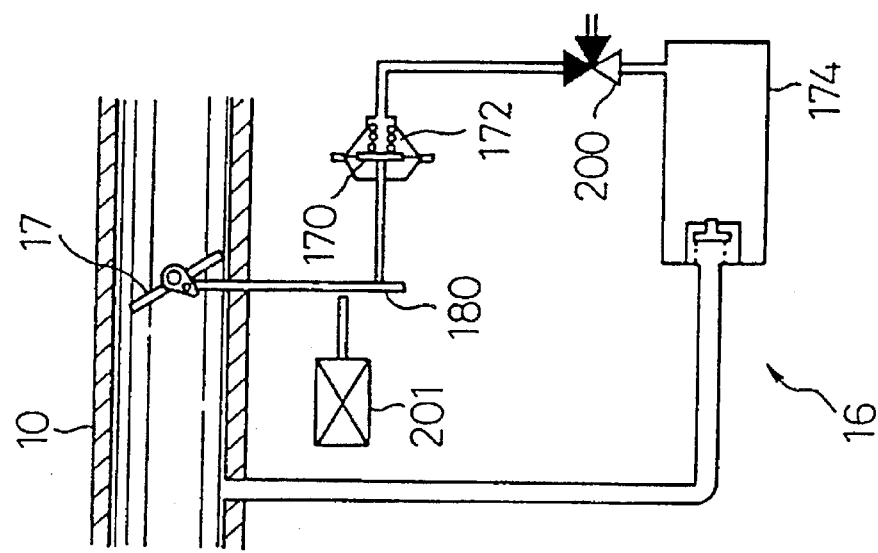

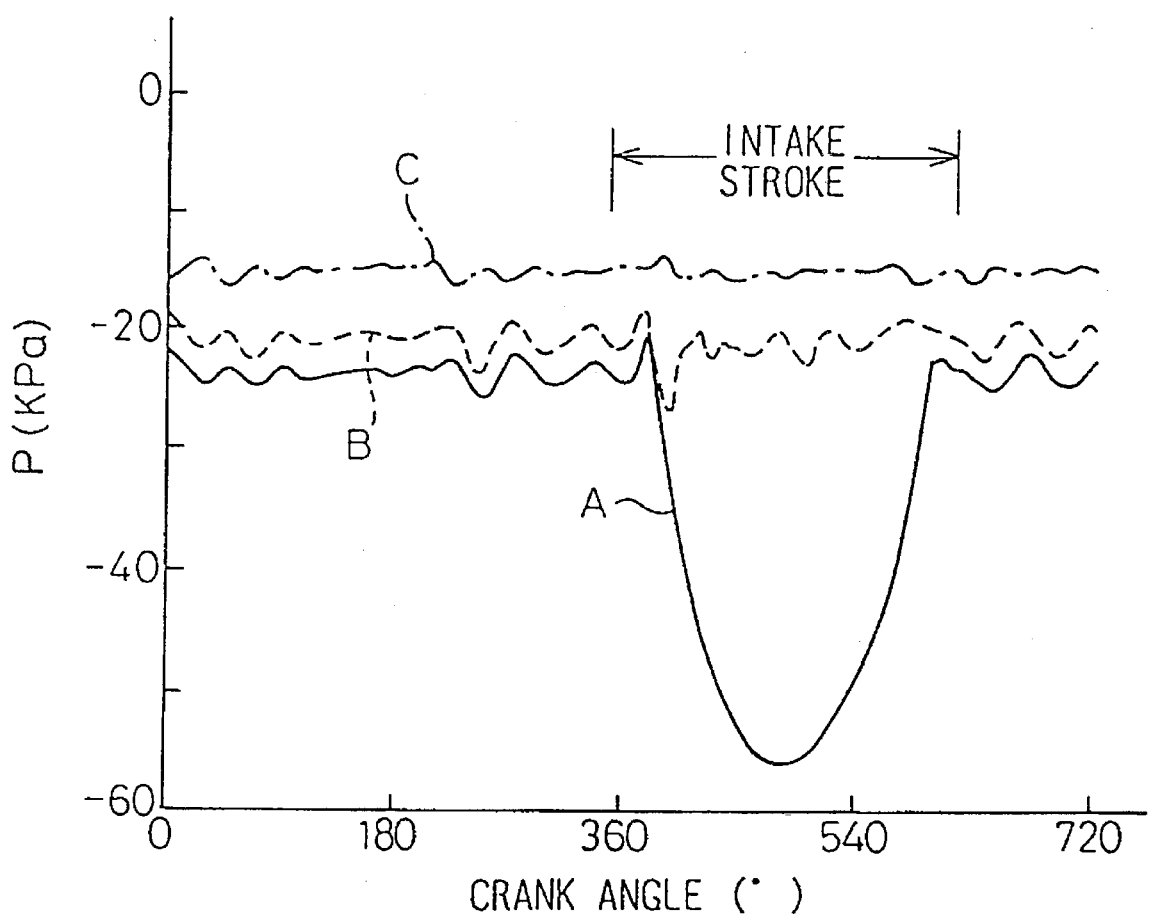

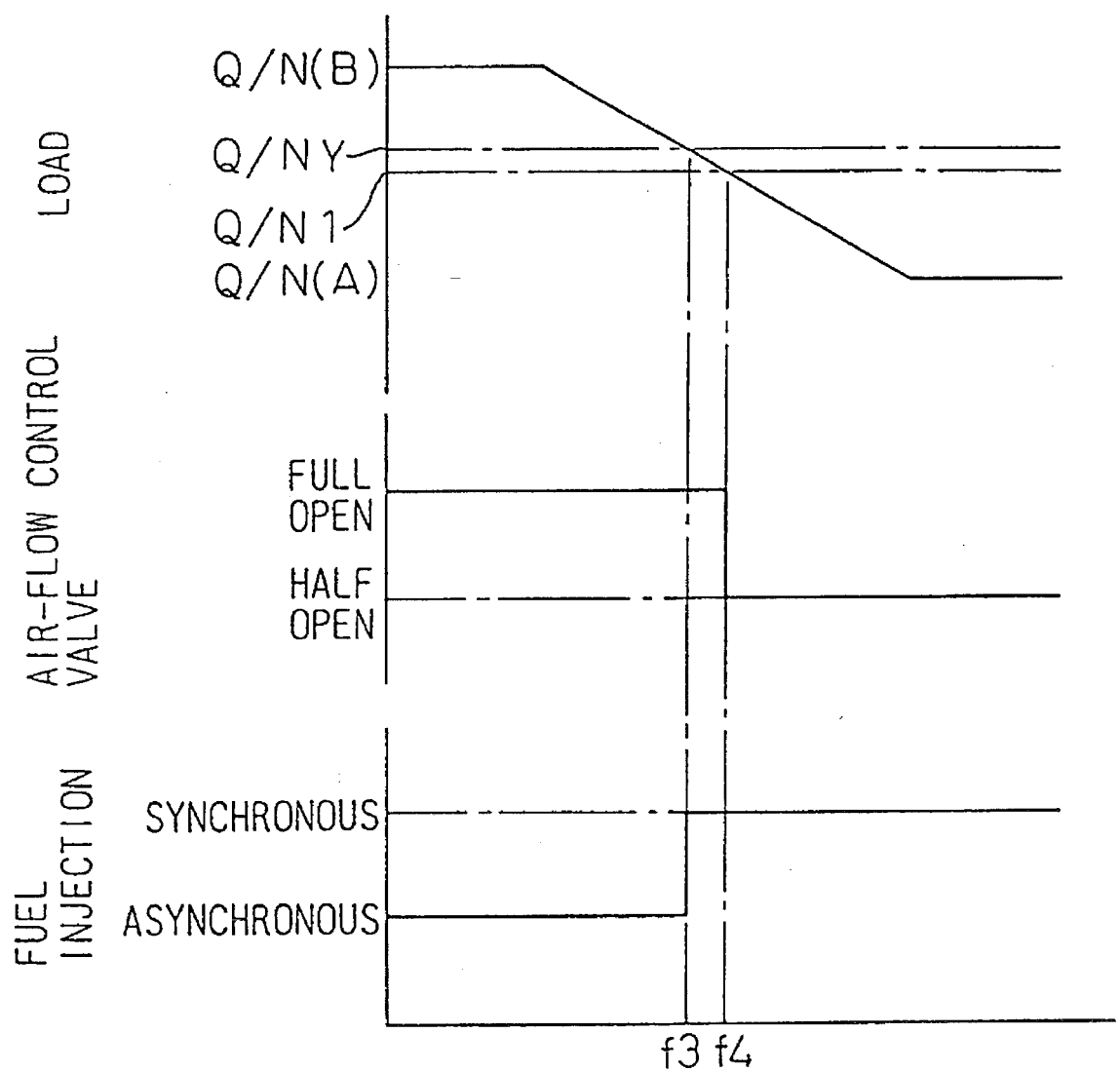

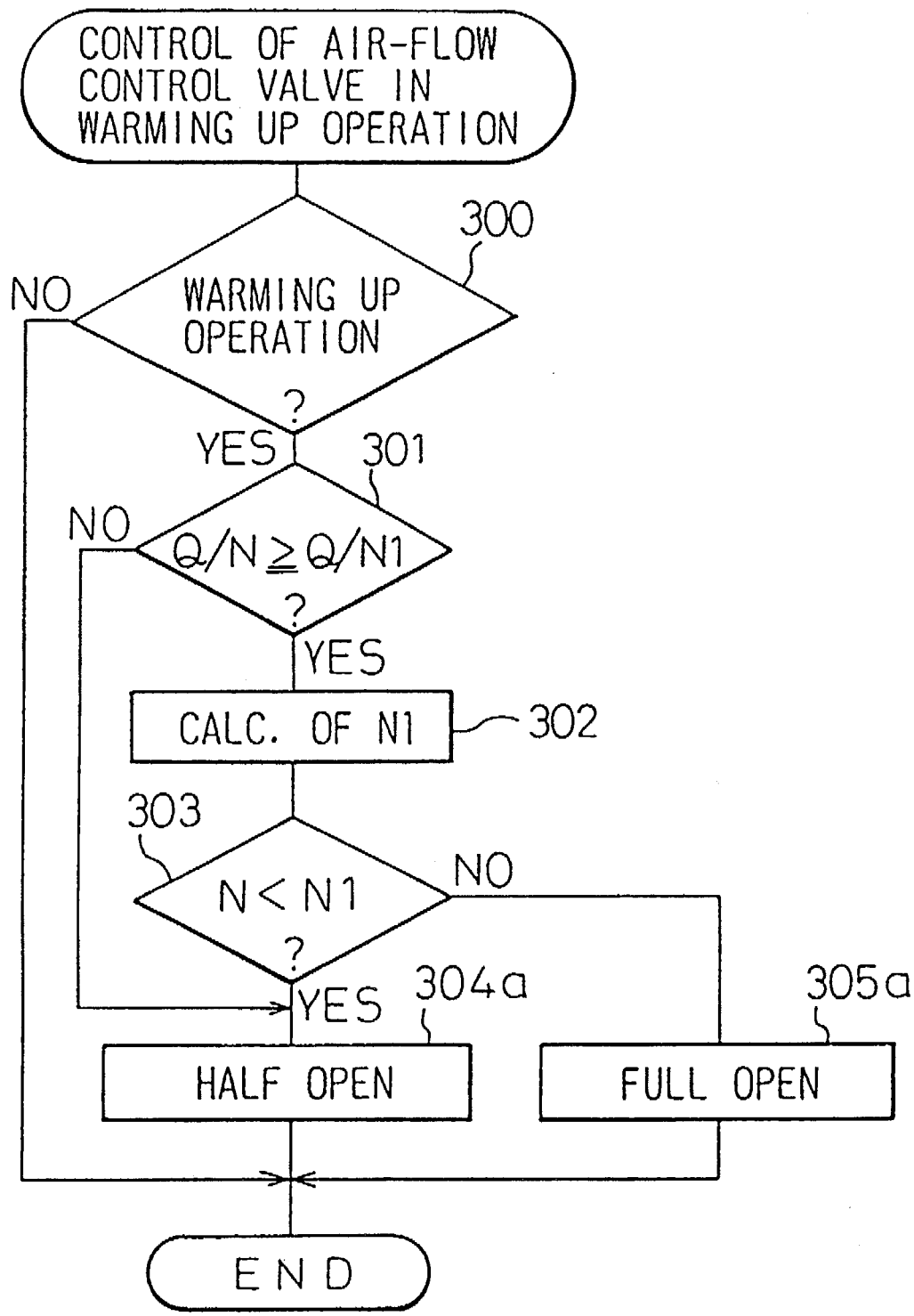

ENGINE

This application is a division of application Ser. No. 08/515,883, filed on Aug. 16, 1995, now U.S. Pat. No. 5,596,957.

BACKGROUND OF THE INVENTION

1. Field of the Invention

The present invention relates to an engine.

2. Description of the Related Art

Japanese Unexamined Patent Publication No. 63-143349 discloses an internal combustion engine having an intake passage, a throttle valve arranged in the intake passage, and a fuel injector arranged in the intake passage downstream of the throttle valve for injecting fuel in the intake passage. The engine is provided with an air-flow control valve arranged in the intake passage between the throttle valve and the fuel injector. The air-flow control valve is closed during an engine starting operation, and is opened after the engine starting operation is completed.

In a typical engine, when the engine is to be started, a certain quantity of air exists in the intake passage downstream of the throttle valve, even if the throttle valve is substantially closed. If this air is drawn into a combustion chamber of the engine, the air-fuel ratio of an air-fuel mixture formed in the combustion chamber is made lean and it causes an improper combustion. As a result, an exhaust gas from the engine contains a large quantity of unburned hydrocarbons (HC). In particular, when the engine includes a surge tank in the intake passage downstream of the throttle valve, a larger quantity of air will be drawn into the combustion chamber at the starting operation of the engine, to further increase the unburned HC in the exhaust gas. To solve this problem, in the above-mentioned engine, the air-flow control valve is arranged in the intake passage between the throttle valve and the fuel injector, and the valve is substantially closed during the engine starting operation, to prevent the combustion chamber from drawing in a large quantity of air.

In the above-mentioned engine, when the engine starting operation is completed, the air-flow control valve is opened to secure a proper amount of air for combustion. The air-flow control valve has a valve element with an axis about which the element is rotatable, and thus, to open the air-flow control valve, the valve element is rotated about the axis thereof. If a rotation direction about the axis of the air-flow control valve is selected so that air flowing through the air-flow control valve is biased toward a wall of the intake passage opposite to the fuel injector by the valve which is at an intermediate open position between a closed position and a full open position thereof, the air will not properly hit and atomize fuel injected from the fuel injector. JPP '349 provides no suggestion about biasing an air flow by the air-flow control valve when the valve is at the intermediate open position.

SUMMARY OF THE INVENTION

An object of the present invention is to provide a engine capable of promoting atomization of the injected fuel, to ensure a proper combustion, while suppressing a discharge of unburned HC during an engine starting operation.

According to one aspect of the present invention, there is provided an engine having an intake passage, a throttle valve arranged in the intake passage, and a fuel injector arranged in the intake passage downstream of the throttle valve for injecting fuel into the intake passage, the engine comprising: an air-flow control valve arranged in the intake passage between the fuel injector and the throttle valve and having a valve element with an axis, the valve element being rotatable about the axis thereof, the air-flow control valve being able to be controlled between a closed position and a full open position; and valve control means for controlling a valve position of the air-flow control valve, wherein the valve control means controls the air-flow control valve to be substantially closed during an engine starting operation, and to be open after the engine starting operation is finished, and wherein a rotational direction of the valve element is selected so that air flowing through the air-flow control valve is guided by the air-flow control valve toward the fuel injector when the air-flow control valve is controlled to an intermediate open position which is between the closed position and the full open position.

According to another aspect of the present invention, there is provided an engine having an intake passage, a throttle valve arranged in the intake passage, and a fuel injector arranged in the intake passage downstream of the throttle valve for injecting fuel into the intake passage, the engine comprising: an air-flow control valve arranged in the intake passage between the fuel injector and the throttle valve; valve control means for controlling a valve position of the air-flow control valve, the valve control means normally controlling the air-flow control valve to an intermediate open position which is between a closed position and a full open position thereof when an engine load is lower than a reference load depending on an engine speed, and to the full open position when the engine load is higher than the reference load; first calculating means for calculating a reference torque which depends on an engine operating condition; second calculating means for calculating an engine torque which would be obtained if the air-flow control valve was controlled to the intermediate open position under the current engine operating condition; and determining means for determining whether the calculated torque calculated by the second calculating means is larger than the reference torque when the air-flow control valve is to be controlled to the full open position, wherein the valve control means controls the air-flow control valve to the intermediate open position when the determining means determines that the calculated torque calculated by the second calculating means is larger than the reference torque.

According to still another aspect of the present invention, there is provided an engine having an intake passage, a throttle valve arranged in the intake passage, and a fuel injector arranged in the intake passage downstream of the throttle valve for injecting fuel into the intake passage, the engine comprising: an air-flow control valve arranged in the intake passage between the fuel injector and the throttle valve; and valve control means for controlling a valve position of the air-flow control valve, the valve control means normally controlling the air-flow control valve to an intermediate open position which is between a closed position and a full open position thereof when an engine load is lower than a reference load depending on an engine speed, and to the full open position when the engine load is higher than the reference load, wherein the fuel injector carries out a synchronous fuel injection in which a fuel injection by the fuel injector is carried out at an intake stroke of the engine when the airflow control valve is controlled to the intermediate open position, and carries out an asynchronous fuel injection in which the fuel injection is carried out at an engine stroke other than the intake stroke when the air-flow control valve is controlled to the full open position, and wherein the engine further comprises fuel injection control means for controlling the fuel injector so that fuel injection type is changed regardless the valve position of the air-flow control valve depending on an engine operating condition.

According to still another aspect of the present invention, there is provided an engine having an intake passage, a throttle valve arranged in the intake passage, and a fuel injector arranged in the intake passage downstream of the throttle valve for injecting fuel into the intake passage, the engine comprising: an air-flow control valve arranged in the intake passage between the fuel injector and the throttle valve; valve control means for controlling a valve position of the air-flow control valve; increasing means for increasing an amount of a gas flowing backwardly in the intake passage, wherein the valve control means controls the air-flow control valve to an intermediate open position which is between a closed position and a full open position thereof when an engine load is lower than a first reference load depending on an engine speed, and to the full open position when the engine load is higher than the first reference load, and wherein the increasing means carries out the increasing operation of the amount of the backwardly-flowing gas when an engine load is lower then a second reference load depending on an engine speed, and stops the increasing operation when the engine load is higher than the second reference load.

According to still another aspect of the present invention, there is provided an engine having an intake passage, a surge tank arranged in the intake passage, a throttle valve arranged in the intake passage upstream of the surge tank, and a fuel injector arranged in the intake passage downstream of the surge tank for injecting fuel into the intake passage, the engine comprising: an air-flow control valve arranged in the intake passage between the fuel injector and the surge tank; valve control means for controlling a valve position of the air-flow control valve, the valve control means controlling the air-flow control valve to an intermediate open position which is between a closed position and a full open position thereof when an engine load is lower than a reference load depending on an engine speed, and to the full open position when the engine load is higher than the reference load; a pressure sensor arranged in the intake passage between the surge tank and the airflow control valve, for detecting a pressure in the intake passage; and air-amount calculating means for calculating an amount of air fed into the engine based on outputs of the pressure sensor.

According to still another aspect of the present invention, there is provided an engine having an intake passage, a throttle valve arranged in the intake passage, and a fuel injector arranged in the intake passage downstream of the throttle valve for injecting fuel into the intake passage, the engine comprising: an air-flow control valve arranged in the intake passage between the fuel injector and the throttle valve; valve control means for controlling a valve position of the air-flow control valve; end pressure difference keeping means for keeping a difference between a pressure in the intake passage upstream of the throttle valve and that in the intake passage between the throttle valve and the air-flow control valve substantially constant, wherein the pressure difference control means controls the valve control means to control a degree of opening of the air-flow control valve so that the pressure difference is substantially kept at a constant, after the engine starting operation is finished.

BRIEF DESCRIPTION OF THE DRAWINGS

In the drawings:

FIGS. 28A through 28C are enlarged views illustrating still another embodiment of a driving apparatus for driving the air-flow control valve;

FIGS. 31A through 31C are enlarged views illustrating still another embodiment of a driving apparatus for driving the air-flow control valve;

FIG. 32 is a diagram illustrating changes in the output of a pressure sensor, depending on positions where the pressure sensor is arranged;

FIG. 46B is a time chart illustrating a fuel injection type when the engine is slowly decelerated;

FIG. 50 is a flowchart for executing control of in a warm-up operation of the engine;

DESCRIPTION OF THE PREFERRED EMBODIMENTS

Figure 1:
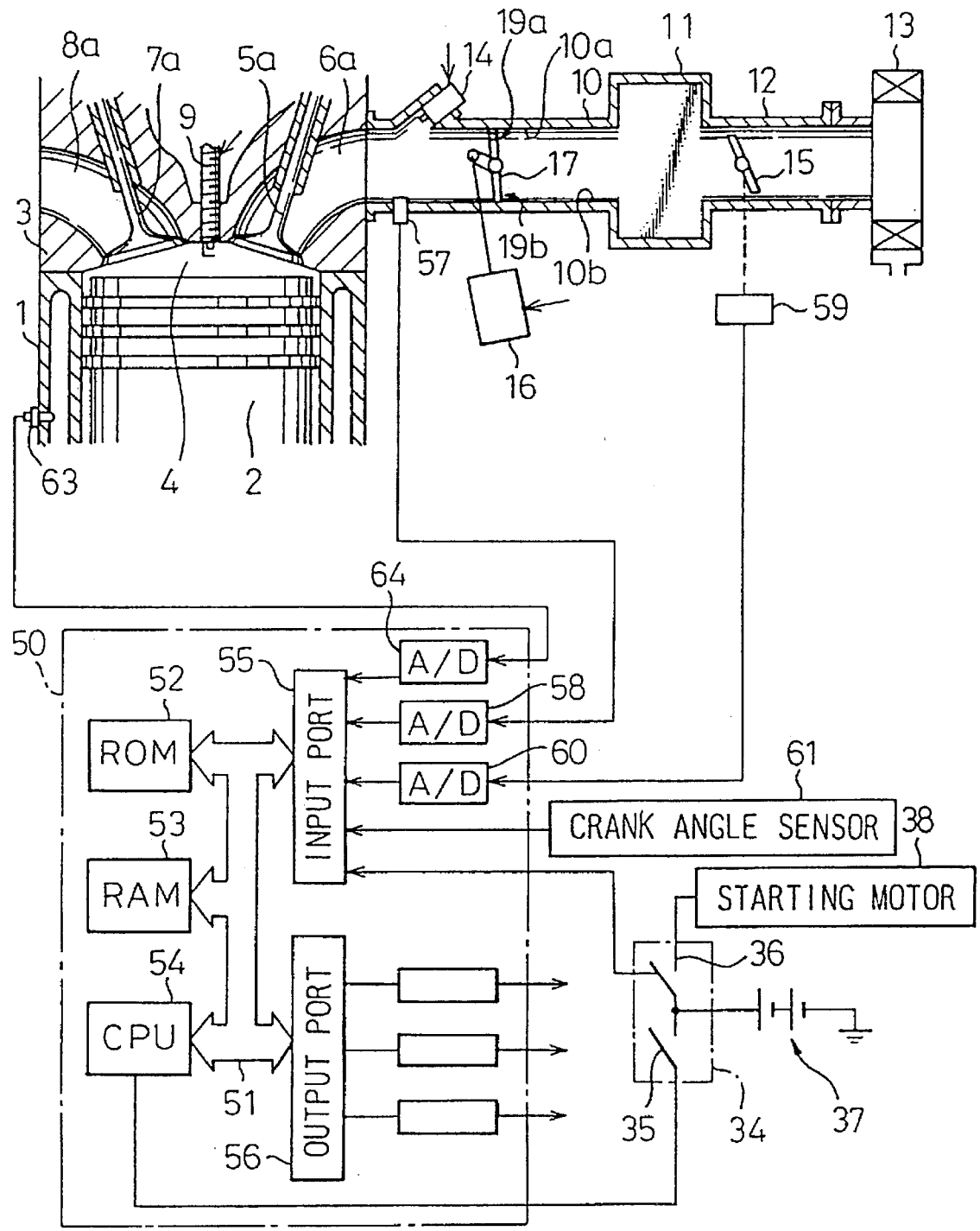
FIG. 1 is a general view illustrating an engine.
Figure 2:
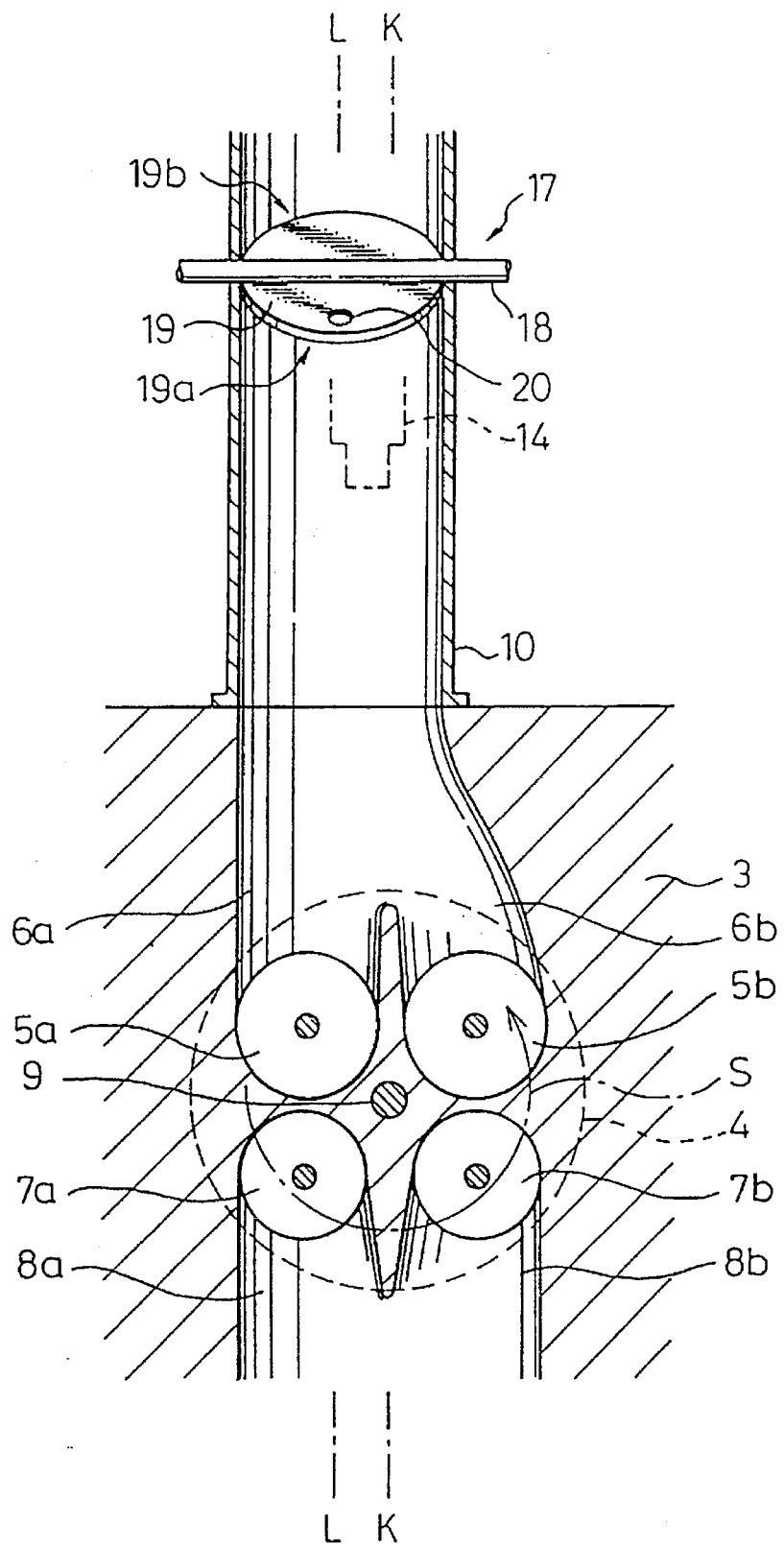
FIG. 2 is a sectional plan view illustrating a cylinder block of the engine.

FIGS. 1 and 2 show an internal combustion engine according to the present invention. The engine has a cylinder block 1, a piston 2 reciprocating in the cylinder block 1, a cylinder head 3 fixed to the top of the cylinder block 1, a combustion chamber 4 defined between the top of the piston 2 and the cylinder head 3, a first intake valve 5a, a first intake port 6a accommodating the valve 5a, a second intake valve 5b, a second intake port 6b accommodating the valve 5b, a first exhaust valve 7a, a first exhaust port 8a accommodating the valve 7a, a second exhaust valve 7b, a second exhaust port 8b accommodating the valve 7b, and a spark plug 9 arranged in the combustion chamber 4. The intake ports 5a and 5b are connected to a common branch 10, which is connected to a surge tank 11. The surge tank 11, which is provided to prevent air-flow pulsation, is connected to an intake duct 12, which is connected to an air cleaner 13. The exhaust ports 8a and 8b are connected to a common exhaust manifold (not shown), which is connected to a catalytic converter (not shown). A fuel injector 14 is arranged in the branch 10. A throttle valve 15 is arranged in the duct 12. The degree of opening of the throttle valve 15 TA becomes larger as a depression of an accelerator pedal becomes larger. The spark plug 9 and the fuel injector 14 are controlled by signals output from an electronic control unit 50.

As shown in FIG. 2, the intake valves 5a and 5b are symmetrically arranged with respect to a plane K—K that contains a cylinder axis. Also symmetrical with respect to the plane K—K are the exhaust valves 7a and 7b. The spark plug 9 is arranged on the plane K—K. The center axis L—L of the branch 10 is shifted from the plane K—K toward the intake valve 5a. The center axis of the intake port 6a is substantially in parallel with the axis L—L. Contrarily, the center axis of the intake port 6b forms an angle with respect to the axis L—L.

An air-flow control valve 17 is arranged between the fuel injector 14 and the throttle valve 15 in the branch 10. The valve 17 is driven by a driving apparatus 16 of vacuum or solenoid type. In this embodiment, the valve 17 is a butterfly valve having a shaft 18 and a disk 19 fixed to the shaft 18. The shaft 18 is on the center axis L—L and is connected to the driving apparatus 16. The disk 19 includes an upper disk part 19a that is close to the fuel injector 14 with respect to the shaft 18, and a lower disk part 19b that is opposite to the upper disk part 19a with respect to the shaft 18. The upper disk part 19a has a small hole 20. The branch 10 includes an upper wall part 10a and a lower wall part 10b. The lower wall part 10b is opposite to the upper wall part 10a with respect to the center axis L—L. In the upper wall part 10a, the fuel injector 14 is arranged.

When the valve 17 is closed, the upper disk part 19a is in contact with the upper wall part 10a, and the lower disk part 19b is in contact with the lower wall part 10b. The air-flow control valve 17 is opened by rotating the disk 19 around the shaft 18. The rotating direction of the disk is selected as follows: to open the valve 17, the upper disk part 19a is moved downstream and the lower disk part 19b upstream. To close the valve 17, the upper disk part 19a is moved upstream toward the upper wall part 10a and the lower disk part 19b downstream toward the lower wall part 10b.

A key switch 34 includes an ignition switch 35 and a starting motor switch 36. The switch 36 is operable to ON only when the ignition switch 35 is ON. The ignition switch 35 is turned ON to supply power from a battery 37 to a CPU 54. The starting motor switch 36 is turned ON to activate a starting motor 38.

The electronic control unit 50 is a digital computer. A bidirectional bus 51 connects a read-only memory (ROM) 52, a random-access memory (RAM) 53, the CPU (micro processor) 54, an input port 55, and an output port 56 to one another. A pressure sensor 57 is attached to the branch 10 upstream of the air-flow control valve 17. The pressure sensor 57 generates a voltage in proportion to the pressure in the branch 10. The voltage is transferred to the input port 55 through an AD converter 58. According to an output signal of the AD converter 58, the CPU 54 calculates the amount of air fed into the engine. The throttle valve 15 is connected to a degree sensor 59, which generates a voltage in proportion to the degree of opening TA of the throttle valve 15. The voltage is transferred to the input port 55 through an AD converter 60. A water temperature sensor 63 generates a voltage in proportion to the temperature of the cooling water of the engine. The voltage is supplied to the input port 55 through an AD converter 64. The input port 55 is also connected to a crank angle sensor 61, which generates a pulse whenever a crankshaft is turned by, for example, 30 degrees. According to the pulses, the CPU 54 calculates an engine speed. The input port 55 is also supplied with the signal indicating whether the starting motor switch 36 is ON or OFF. The output port 56 is connected to the spark plug 9, fuel injector 14, and driving apparatus 16 through respective drive circuits Next, control of the air-flow control valve 17 will be explained.

Figure 3A:
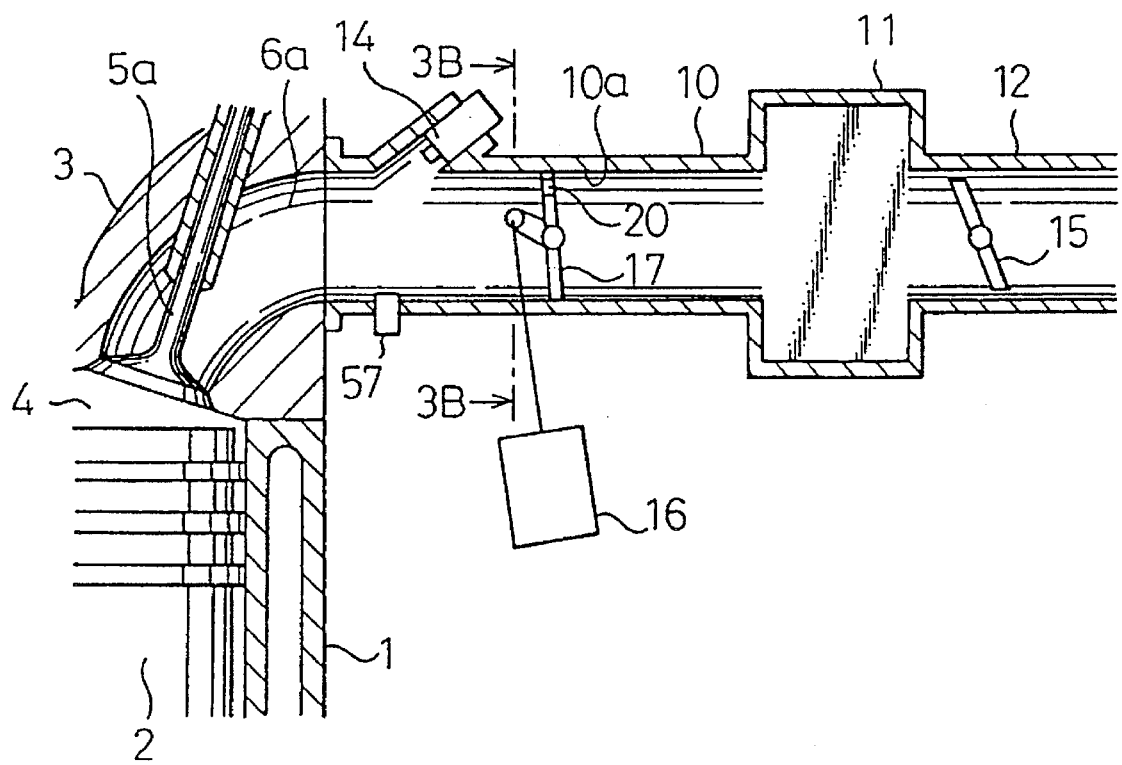
FIG. 3A is a partial sectional view illustrating the engine with an air-flow control valve being closed.
Figure 3B:
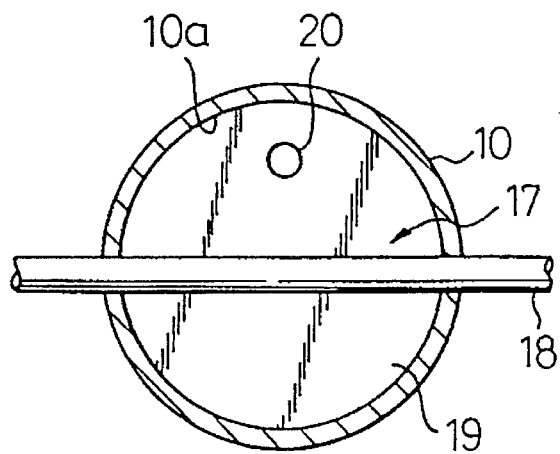
FIG. 3B is a partial sectional view of the engine, taken along a line 3B—3B in FIG. 3A.

An engine starting operation is carried out in a period from when the starting motor switch 35 is turned ON until the engine speed reaches a predetermined speed N0, for example, 400 rpm. During the engine starting operation, the valve 17 is closed as shown in FIGS. 3A and 3B. Namely, the periphery of the disk 19 of the valve 17 is in contact with the inner wall of the branch 10 as shown in FIG. 3B, that the upstream and downstream sides of the valve 17 communicate with each other only through the hole 20.

When the starting motor 38 starts driving the engine, the intake valves 5a and 5b are opened to draw air into the combustion chamber 4. Since the air-flow control valve 17 is closed at this time, a limited amount of air is introduced into the combustion chamber 4. Namely, air in a space between the valves 5a and 5b and the valve 17, as well as the air passed through the hole 20 are drawn into the combustion chamber 4. In this way, the amount of air introduced into the combustion chamber 4 is limited at the starting operation, and, thereby, at the same time, the amount of injected fuel is reduced. Further, since the valve 17 is closed, the negative pressure produced in the branch 10 downstream of the valve 17 is reinforced to speedily atomize the injected fuel and improve combustion in the combustion chamber 4. This results in reducing the amount of unburned HC exhausted into the exhaust manifold. Furthermore, when the valve 17 is closed, the hole 20 is in the vicinity of the upper wall part 10a. As a result, air passed through the hole 20 hits the injected fuel from the fuel injector 14, to further atomize the fuel and improve combustion.

Figure 4:
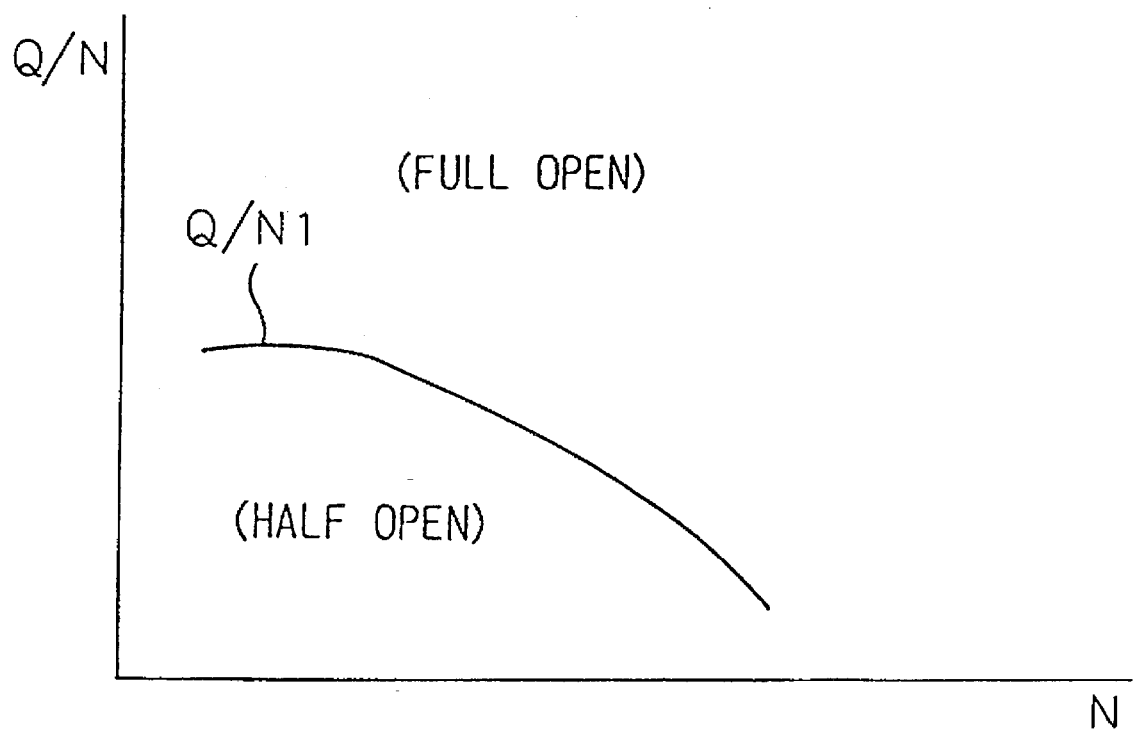
FIG. 4 is a diagram illustrating a first reference load.
Figure 5A:
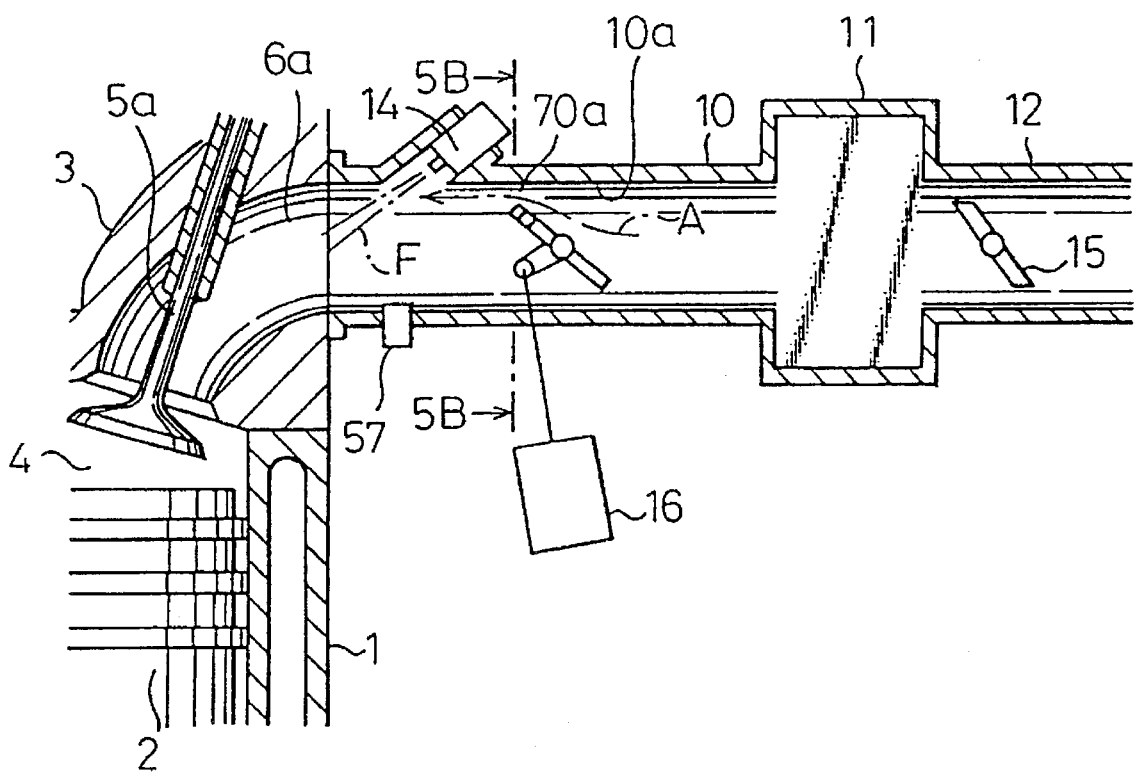
FIG. 5A is a partial sectional view illustrating the engine with the air-flow control valve being controlled to a half open position.
Figure 5B:
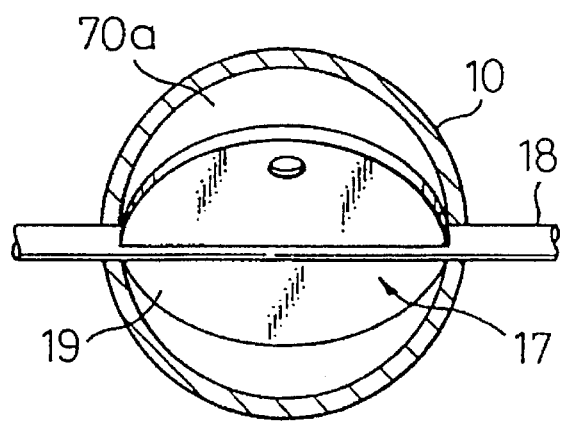
FIG. 5B is a partial sectional view of the engine, taken along a line 5B—5B in FIG. 5A.
Figure 7A:
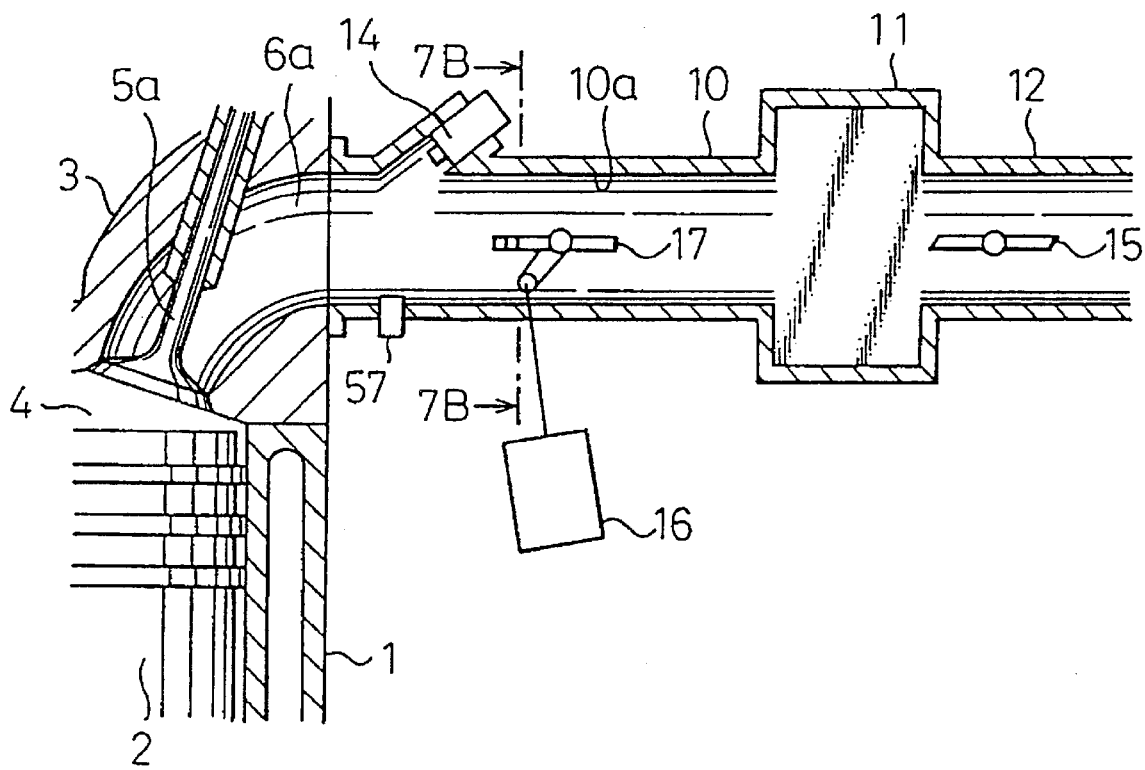
FIGS. 7A and 7B are partial sectional views illustrating the engine with the air-flow control valve being controlled to a full open position.
Figure 7B:
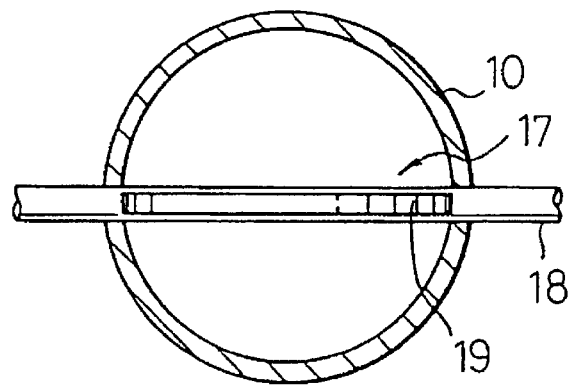

Once the engine starting operation is completed, the driving apparatus 16 controls the air-flow control valve 17 to an intermediate open position or a full open position depending on an engine operating condition. In this embodiment, the valve 17 is controlled depending on an engine speed N and an engine load Q/N (Q being the amount of air fed into the engine). If the engine load Q/N is below a first reference load Q/N1 that is determined according to the engine speed N as shown in FIG. 4, the valve 17 is controlled to the intermediate open position as shown in FIGS. 5A and 5B. When the engine load Q/N is above the first reference load Q/N1, the valve 17 is controlled to the full open position as shown in FIGS. 7A and 7B. In this way, the valve 17 is opened to supply a proper amount of air to the combustion chamber 4 after the engine starting operation completes. The map of FIG. 4 is stored in the ROM 52. The degree of opening of the valve 17 is larger than that of the throttle valve 15 after the engine starting operation completes.

When the valve 17 is at the intermediate open position as shown in FIGS. 5A and 5B, the degree of opening of the valve 17 is about half that at the full open position. Namely, the intermediate open position is a half open position, in this embodiment. To change the valve position of the valve 17 from the closed position to the half open position, the upper disk part 19a is moved downstream. When the valve 17 is at the half open position, most of air flowing along the disk 19 passes through a gap 70a formed between the disk 19 and the upper wall part 10a as indicated with an arrow A in FIG. 5A. In the engine shown in FIG. 1, synchronous fuel injection is carried out when the valve 17 is at the half open position. Namely, the fuel injector 14 injects fuel during an intake stroke of the engine. Accordingly, air A passing through the gap 70a advances along the upper wall part 10a and then hits the injected fuel F, to thereby sufficiently atomize the fuel F. This results in improving combustion in the combustion chamber 4.

Then, air A and fuel F together enter the intake ports 6a and 6b. As shown in FIG. 2, the center axis of the intake port 6a is substantially in parallel with the center axis of the branch 10. Accordingly, when the air-flow control valve 17 is at the half open position, most of air A entering the intake port 6a flows through the intake valve 5a into the combustion chamber 4. Air A then flows along the inner well of the combustion chamber 4, to form a swirl S as shown in FIG. 2. Further, most of air flowing along the upper wall part 10a into the intake port 6a enters the combustion chamber 4 through an opening formed between the intake valve 5a and the cylinder head 3 in the vicinities of the exhaust valves 7a and 7b. Then, the air descends along the inner wall of the combustion chamber 4 under the exhaust valves 7a and 7b, to form a swirl S shown in FIG. 6, in the form of spiral. This results in further improving combustion in the combustion chamber 4.

The negative pressure produced in the branch 10 downstream of the air-flow control valve 17 and in the intake ports 6a and 6b with the valve 17 being at the half open position is stronger than that with the valve 17 being at the full open position. This strong negative pressure promotes evaporation of fuel attached to the intake ports 6a and 6b, to thereby supply a correct amount of fuel into the combustion chamber 4.

During an overlap period during which the intake valves 5a and 5b and the exhaust valves 7a and 7b are all open, an exhaust gas or an air-fuel mixture in the combustion chamber 4 is blown back into the intake ports 6a and 6b through the intake valves 5a and 5b. Such a backwardly flowing gas is reduced by the air-flow control valve 17 when it is at the half open position. As a result, injected fuel will not be pushed back by the backward flowing gas, and thus, a correct amount of fuel will be supplied into the combustion chamber 4. When the engine load Q/N is higher than the first reference load Q/N1, the amount of air supplied into the combustion chamber 4 will be too small if the air-flow control valve 17 is kept at the half open position as shown in FIGS. 5A and 5B. Accordingly, when the engine load Q/N is above the first reference load Q/N1, the driving apparatus 16 changes the valve 17 to the full open position as shown in FIGS. 7A and 7B. While the valve 17 is being maintained at the full open position, no shortage of air will occur in the combustion chamber 4 even if the engine load Q/N is high.

When the air-flow control valve 17 is at the full open position, an asynchronous fuel injection, wherein the fuel injection is finished before the intake stroke, is carried out. Namely, a fuel injection is carried out at a compression stroke of the engine. If the synchronous fuel injection is carried out when the valve 17 is at the full open position, fuel will directly be injected into the combustion chamber 4, and thus, it is difficult to form an uniform air-fuel mixture in the combustion chamber 4. On the other hand, if the asynchronous fuel injection is carried out when the valve 17 is at the full open position, the fuel hits the walls of the intake ports 5a and 6b end the back of the heads of the intake valves 5a and 5b and is atomized. The fuel attached to these parts is atomized by a backwardly flowing gas and is supplied into the combustion chamber 4, to form a uniform air-fuel mixture therein. This secures proper combustion. When the valve 17 is at the half open position, fuel is properly atomized and forms a uniform air-fuel mixture in the combustion chamber 4 even under the synchronous fuel injection, as mentioned above.

Figure 8:
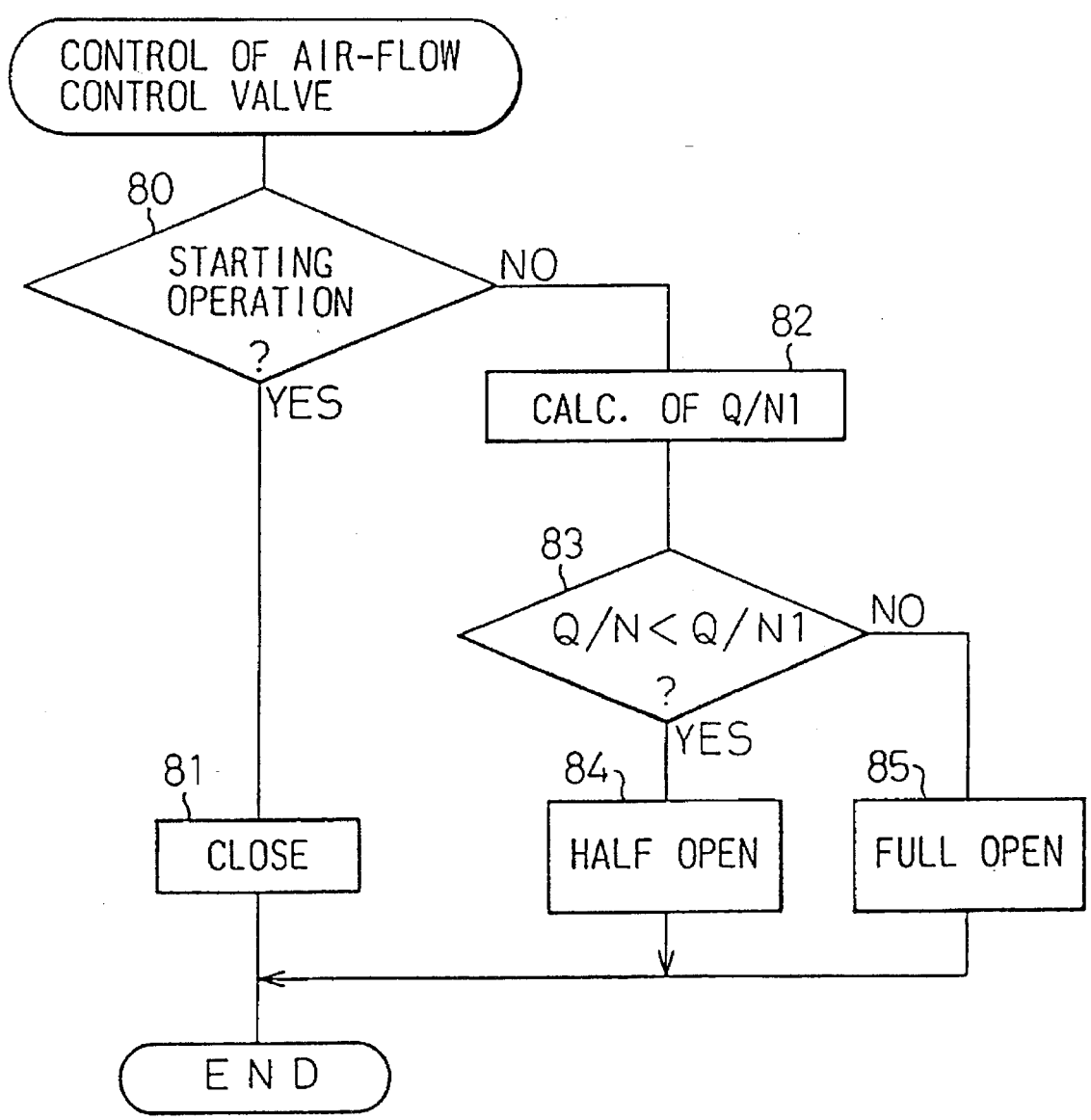
FIG. 8 is a flowchart for executing control of the air-flow control valve.

FIG. 8 shows a routine for executing control of the air-flow control valve 17. This routine is executed by interruption every predetermined time.

Referring to FIG. 8, at step 80, it is determined whether an engine starting operation is in process. The engine starting operation is carried out in a period from when the starting motor switch 36 is turned ON until the engine exceeds a reference engine speed NO. If the engine starting operation is in process, the routine goes to step 81, where the driving apparatus 16 controls the valve 17 to close. Then, the processing cycle is ended.

If the engine starting operation is completed, the routine goes to step 82, where a first reference load Q/N1 is calculated using the map shown in FIG. 4. Then, the routine goes to step 83, where it is determined whether the present engine load Q/N is smaller than the first reference load Q/N1. If Q/N<QN1, the routine goes to step 84, where the driving apparatus 16 controls the valve 17 to the half open position, and then, the processing cycle is ended. If Q/N≧QN1, the routine goes to step 85, where the driving apparatus 16 controls the valve 17 to the full open position, and then, the processing cycle is ended.

Another technique of controlling the air-flow control valve 17 according to the present invention will be explained with reference to FIGS. 9 through 13.

In the engine shown in FIG. 1, part of fuel F injected from the fuel injector 14 adheres to the walls of the intake ports 6a and 6b. Then, the adhered fuel evaporates due to the negative pressure produced in the intake ports 6a and 6b and is drawn, with the air, into the combustion chamber 4. If the engine is accelerated when the valve 17 is changed from the half open position to the full open position, the negative pressure produced in the intake ports 6a and 6b abruptly weakens to decrease the amount of fuel supplied into the combustion chamber 4 below a proper level. As a result, the air-fuel ratio in the combustion chamber temporarily becomes lean. This tendency becomes more conspicuous as the acceleration advances. Accordingly, it is usual to increase the amount of fuel injected into the combustion chamber 4 when the engine is accelerated. In practice, however, the acceleration and deceleration of the engine are continuous, so that it is difficult to stabilize the air-fuel ratio by increasing the amount of injected fuel during the acceleration.

Figure 9:
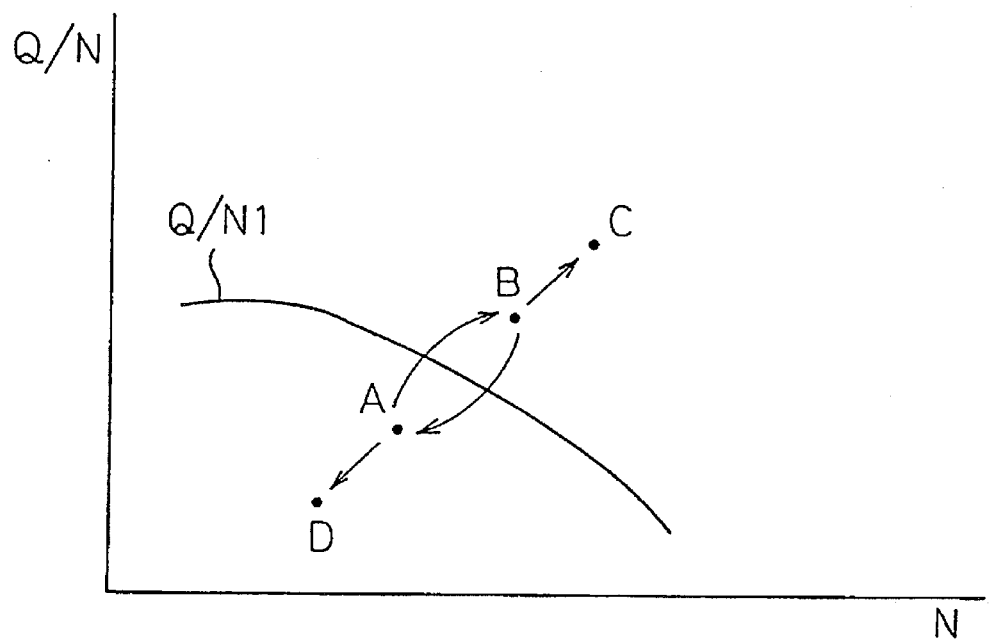
FIG. 9 is a diagram illustrating changes in operating conditions of the engine.

To solve this problem, in this embodiment, the air-flow control valve 17 is controlled as shown in FIGS. 9 to 13. When the engine operating condition changes from A to B as shown in FIG. 9 wherein the engine load Q/N exceeds the first reference load Q/N1, the valve 17 is changed from the half open position to the full open position. If the engine is rapidly accelerated in this situation, the time of changing the valve 17 to the full open position is delayed by a first set period TI1. Namely, the valve 17 is kept at the half open position for the period TI1 after the engine load Q/N exceeds the first reference load Q/N1, if the engine is rapidly accelerated at this moment. After the period TI1, the valve 17 is controlled from the half open position to the full open position. The rapid acceleration is checked according to a load change ΔQ/N. If the load change ΔQ/N is greater than a reference change Δ1, it is determined that the engine is rapidly accelerated. Instead, the rapid acceleration may be checked according to a change in the degree of opening TA of the throttle valve 15, or a change in the engine speed N.

Figure 10:
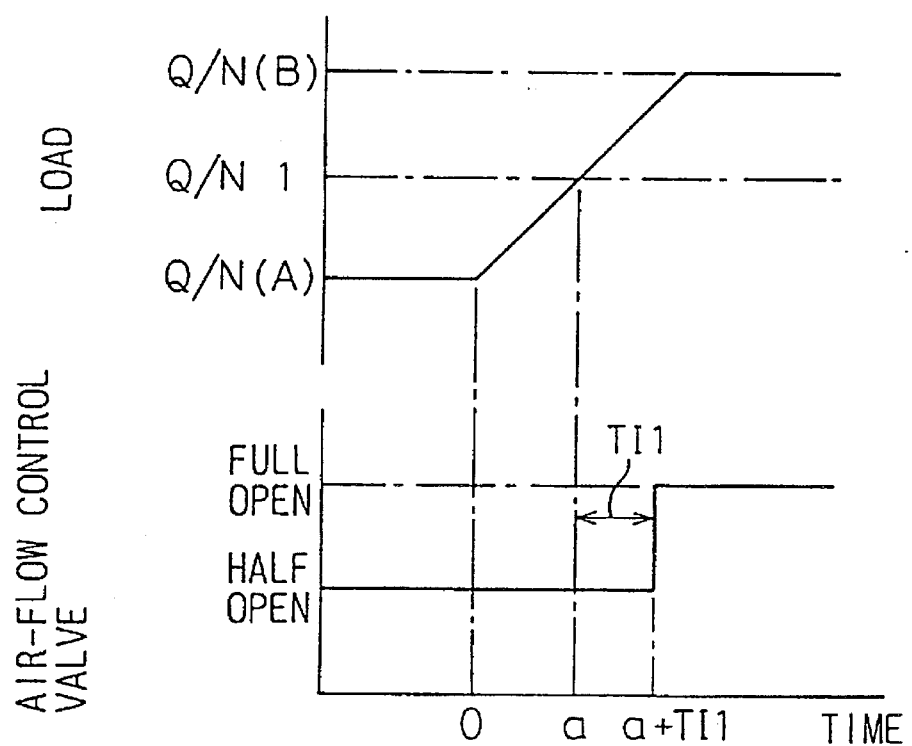
FIG. 10 is a time chart illustrating another embodiment of control of the air-flow control valve when the engine is rapidly accelerated.

FIG. 10 is a time chart illustrating an engine operating condition changing from A with an engine load of Q/N(A) to B with an engine load of Q/N(B) due to rapid acceleration. The rapid acceleration starts at time zero. At time a, the engine load Q/N exceeds the first reference load Q/N1. At this time, the air-flow control valve 17 is kept at the half open position. As the engine load Q/N increases, the negative pressure in the branch 10 upstream of the valve 17 and downstream of the throttle valve 15 weakens. If the valve 17 is kept at the half open position, the negative pressure in the intake ports 6a and 6b gradually weakens. After the period TI1 from the time a, the valve 17 is changed to the full open position. As a result, the negative pressure in the intake ports 6a and 6b will not suddenly weaken even during rapid acceleration. As a result, fuel on the walls of the intake ports 6a and 6b will properly separate therefrom, to supply a proper amount of fuel into the combustion chamber 4. Accordingly, the air-fuel ratio in the combustion chamber 4 will not be lean during rapid acceleration.

If the engine is slowly accelerated, namely if the load change ΔQ/N is smaller than the reference change Δ1 when the engine load Q/N exceeds the first reference load Q/N1, the valve 17 is changed from the half open position to the full open position as soon as the engine load Q/N exceeds the first reference load Q/N1, similar to the routine shown in FIG. 8. The slow acceleration causes a relatively small change in the negative pressure in the branch 10, so that the amount of fuel supplied into the combustion chamber 4 is substantially correct. Accordingly, the valve 17 is quickly shifted to the full open position to secure a proper amount of air.

Changing the engine operating condition from B to C (FIG. 9) will be explained.

When the air-flow control valve 17 is at the full open position, the negative pressure in the intake ports 6a and 6b is weak. The negative pressure in the intake ports 6a and 6b will be suddenly further weakened if the engine is rapidly accelerated when the engine operating condition changes from B to C. Then, injected fuel will not be atomized and will adhere to the wall of the branch 10, to thereby make the air-fuel ratio lean. To solve this problem, in this embodiment, the valve 17 is temporarily maintained at the half open position for a second set period TI2 when rapid acceleration is detected with the valve 17 being at the full open position. Changing the valve 17 from the full open position to the half open position when rapid acceleration is detected momentarily enhances the negative pressure produced in the intake ports 6a and 6b to remove the fuel from the walls of the intake ports 6a and 6b, thereby maintaining a desired air-fuel ratio during the rapid acceleration. After the period TI2, the valve 17 is again set to the full open position to secure a proper amount of air.

Figure 11:
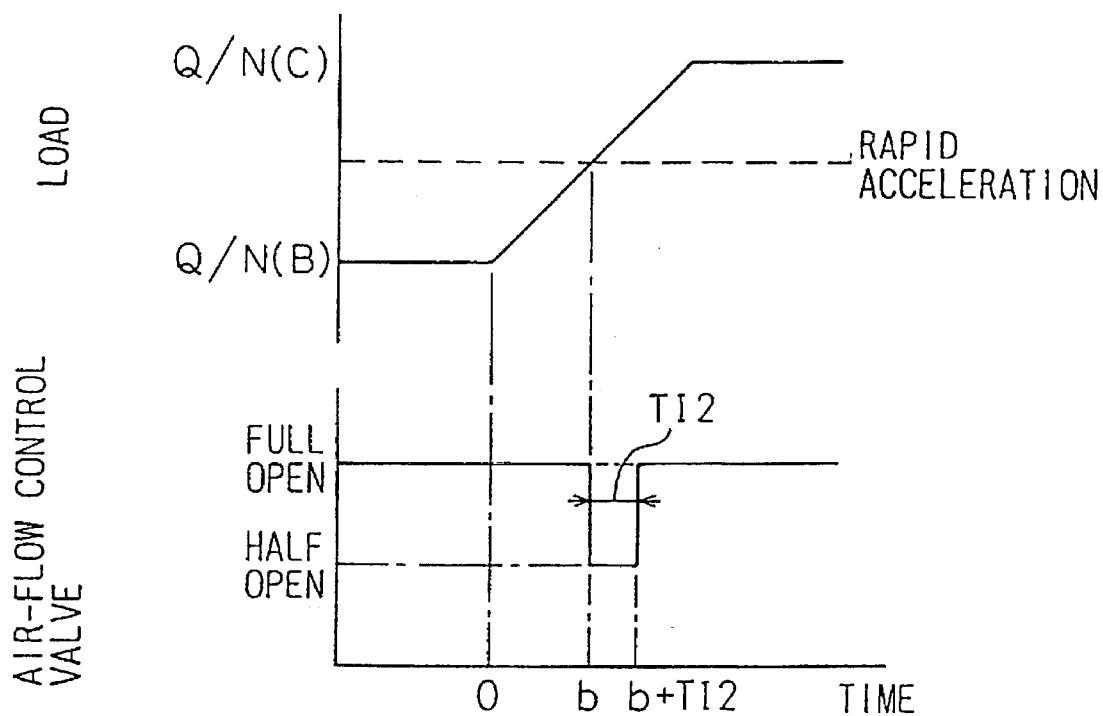
FIG. 11 is a time chart illustrating another embodiment of control of the air-flow control valve when the engine is rapidly accelerated.

FIG. 11 is a time chart showing the operating condition of the engine changing from B with a load of Q/N(B) to C with a load of Q/N(C) due to rapid acceleration. The rapid acceleration starts at time zero and is detected at time b. At the time b, the air-flow control valve 17 is changed from the full open position to the half open position, which is maintained for the period TI2 from the time b, Thereafter, the valve 17 is again changed to the full open position.

If the engine is slowly accelerated when the operating condition is changed from B to C, the load change ΔQ/N is small. In this case, a change in the amount of injected fuel is relatively small, so that the amount of fuel supplied into the combustion chamber 4 is substantially normal. Accordingly, the valve 17 is continuously kept at the full open position.

If the engine is accelerated when the engine operating condition changes from D to A, the valve 17 is kept at the half open position.

Changing the engine operating condition from B to A will be explained.

If the engine is rapidly decelerated when the operating condition is changed from B to A in which the air-flow control valve 17 is changed from the full open position to the half open position, the negative pressure in the intake ports 6a and 6b suddenly strengthens to excessively remove fuel from the walls of the intake ports 6a and 6b. This results in increasing the amount of fuel supplied into the combustion chamber 4 greater than a normal level, to make the air-fuel ratio in the combustion chamber 4 rich. The air-fuel ratio becomes richer as the deceleration increases. To solve this problem, the valve 17 is maintained at the full open position for a third set period TI3 after the engine load Q/N drops below the first reference load Q/N1, if the engine is rapidly decelerated at this moment. After the period TI3, the valve 17 is controlled to the half open position. This prevents a sudden increase in the negative pressure in the intake ports 6a and 6b due to the rapid deceleration of the engine. The rapid deceleration is detected when a load change ΔQ/N representing the degree of the deceleration is smaller than a reference change Δ2 (negative), The deceleration may be detected according to a change in the degree of opening of the throttle valve 15, or a change in the engine speed N.

Figure 12:
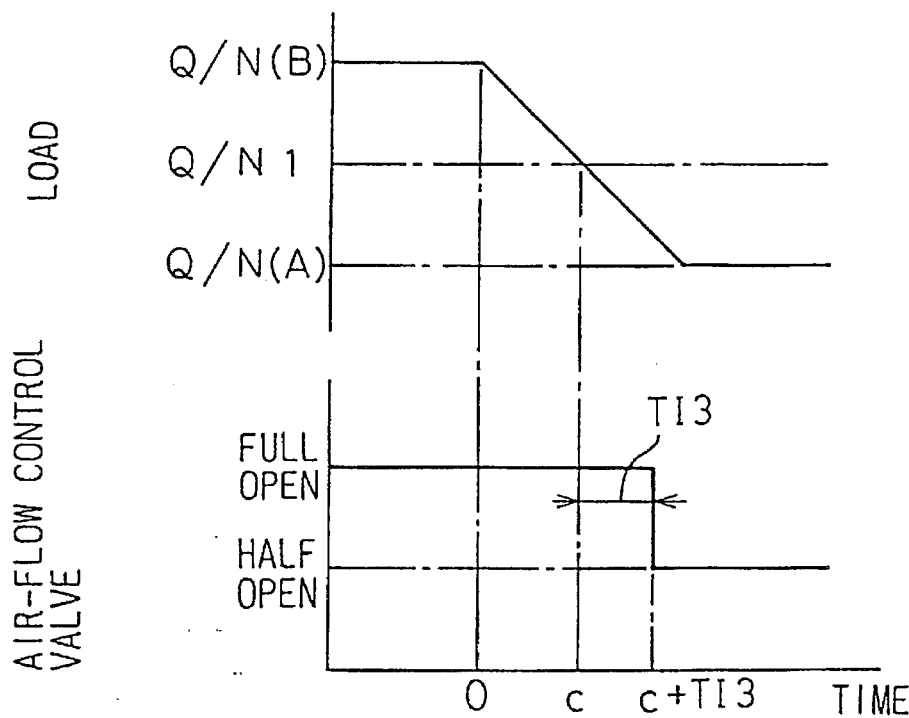
FIG. 12 is a time chart illustrating another embodiment of control of the air-flow control valve when the engine is rapidly decelerated.

FIG. 12 is a time chart showing the engine operating condition changing from B with a load of Q/N(B) to A with a load of Q/N(A) in FIG. 9 due to rapid deceleration. The rapid deceleration starts at time zero. The engine load decreases from Q/N(B) to Q/N1 at time c. At this time, the air-flow control valve 17 is kept at the full open position. When the period TI3 passes after the time c, the valve 17 is changed to the half open position. This prevents the negative pressure in the intake ports 6a and 6b from being suddenly enhanced due to the rapid deceleration. Fuel on the walls of the intake ports 6a and 6b is properly removed during the rapid deceleration, to provide a proper amount of fuel to the combustion chamber 4 and maintain a desired air-fuel ratio.

If the engine is slowly decelerated with the load change ΔQ/N being larger than the reference change Δ2, the valve 17 is changed from the full open position to the half open position as soon as the engine load drops below the first reference load Q/N1, similar to the routine of FIG. 8.

Changing the engine operating condition from A to D in FIG. 9 will be explained.

If the engine is rapidly decelerated to change the engine operating condition from A to D with the air-flow control valve 17 being at the half open position, the negative pressure in the intake ports 6a and 6b suddenly strengthens to momentarily make the air-fuel ratio rich, similar to the engine operating condition changing from B to A. In this case, in this embodiment, the valve 17 is temporarily changed to the full open position for a fourth set period TI4 after the rapid deceleration is detected. This results in momentarily weakening the negative pressure in the intake ports 6a and 6b, properly removing fuel from the walls of the intake ports 6a and 6b, and maintaining a proper air-fuel ratio during the rapid deceleration. After the period TI4, the valve 17 is returned to the half open position.

Figure 13:
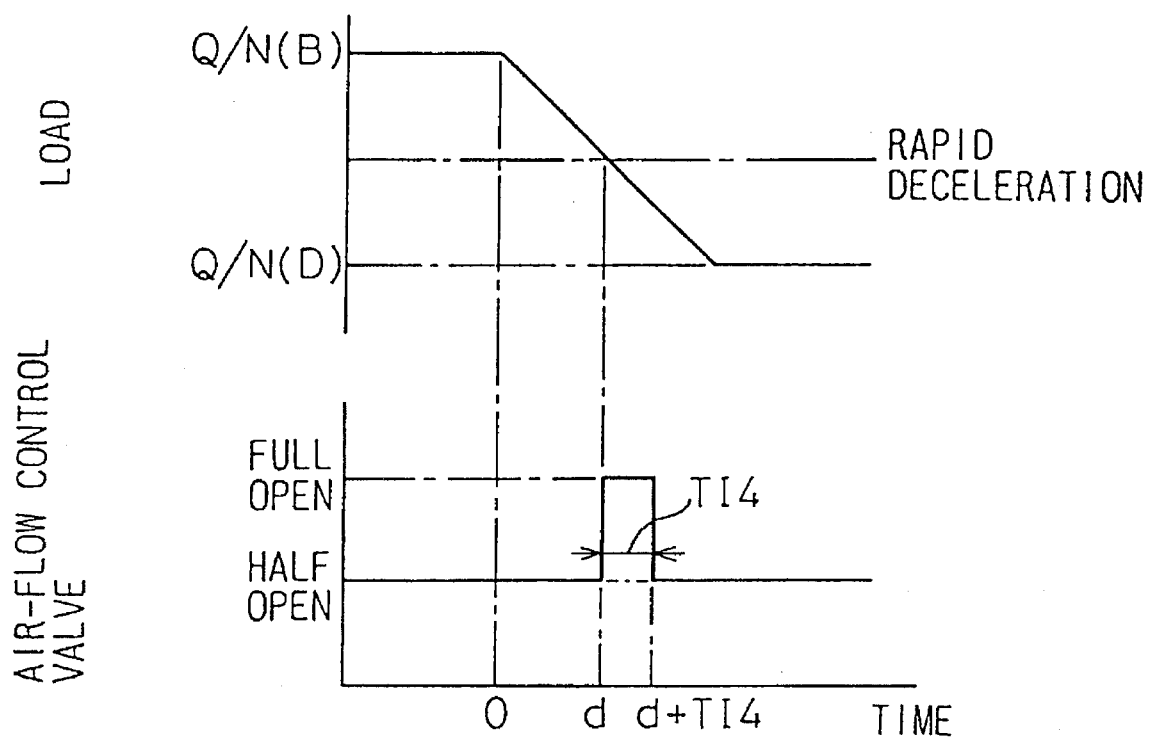
FIG. 13 is a time chart illustrating another embodiment of control of the air-flow control valve when the engine is rapidly decelerated.

FIG. 13 is a time chart showing the engine operating condition changing from A with a load of Q/N(A) to D with a load of Q/N(D) of FIG. 9 due to rapid deceleration of the engine. The rapid deceleration starts at time zero. The rapid deceleration is detected at time d, and the valve 17 is changed from the half open position to the full open position. The valve 17 is maintained at the full open position for the period TI4 after the time d. Thereafter, the valve 17 is returned to the half open position.

If the engine is slowly decelerated to change the engine operating condition from A to D, the load change $\Delta Q/N$ is small. In this case, a change in the negative pressure in the intake ports 6a and 6b is relatively small, so that the amount of fuel supplied into the combustion chamber 4 is substantially correct. Accordingly, the valve 17 is continuously kept at the half open position.

If the engine is decelerated to change the engine operating condition from C to B, the valve 17 is maintained at the full open position.

Routines for achieving the techniques of FIGS. 9 to 13 for controlling the air-flow control valve 17 will be explained with reference to FIGS. 14 to 21.

Figure 14:
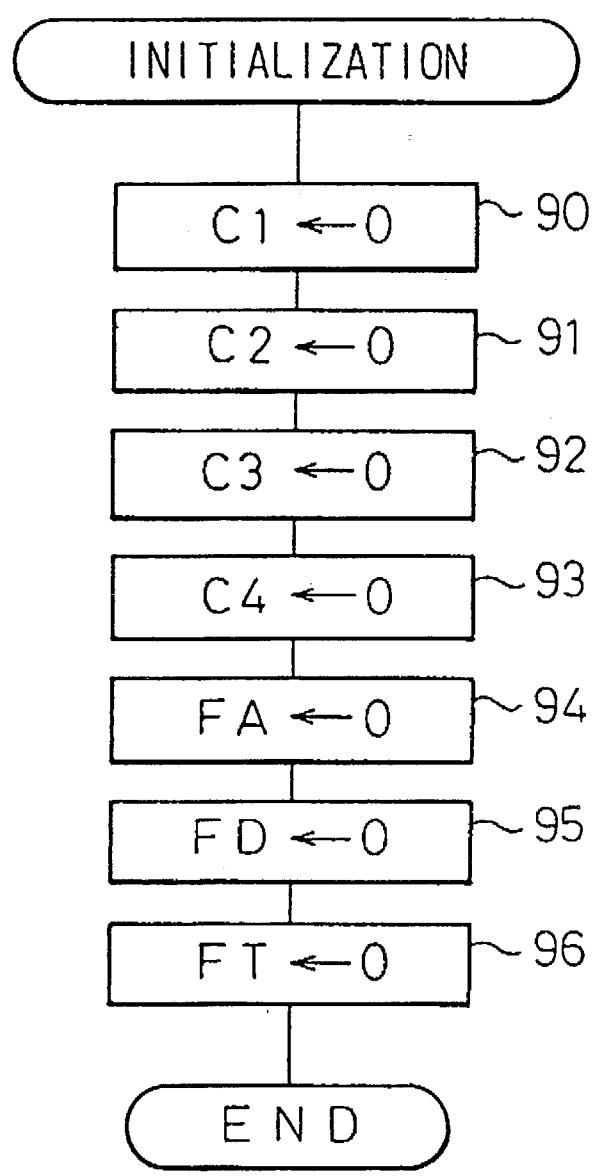
FIG. 14 is a flowchart for executing an initialization.

FIG. 14 is an initialization routine executed once when the ignition switch 35 is turned ON. At step 90, the count C1 of a first timer is cleared, which the timer is for counting a time for which the valve 17 is kept at the half open position after the engine load Q/N exceeds the first reference load Q/N1 as shown in FIG. 10. At step 91, the count C2 of a second timer is cleared, which the timer is for counting a time for which the valve 17 is kept at the half open position when the engine load Q/N is higher than the first reference load Q/N1 as shown in FIG. 11. At step 92, the count C3 of a third timer is cleared, which the timer is for counting a time for which the valve 17 is kept at the full open position after the engine load Q/N drops below the first reference load Q/N1 as shown in FIG. 12. At step the count C4 of a fourth timer is cleared, which the timer is for counting a time for which the valve 17 is kept at the full open position when %he engine load Q/N is below the first reference load Q/N1 as shown in FIG. 13. At step 94, a rapid acceleration flag FA that is set when the engine is rapidly accelerated is reset. At step 95, a rapid deceleration flag FD that is set when the engine is rapidly decelerated is reset. At step 96, an opening change flag FT that is set when the second or fourth timer is activated is reset. Then, the processing cycle is ended.

Figure 15:
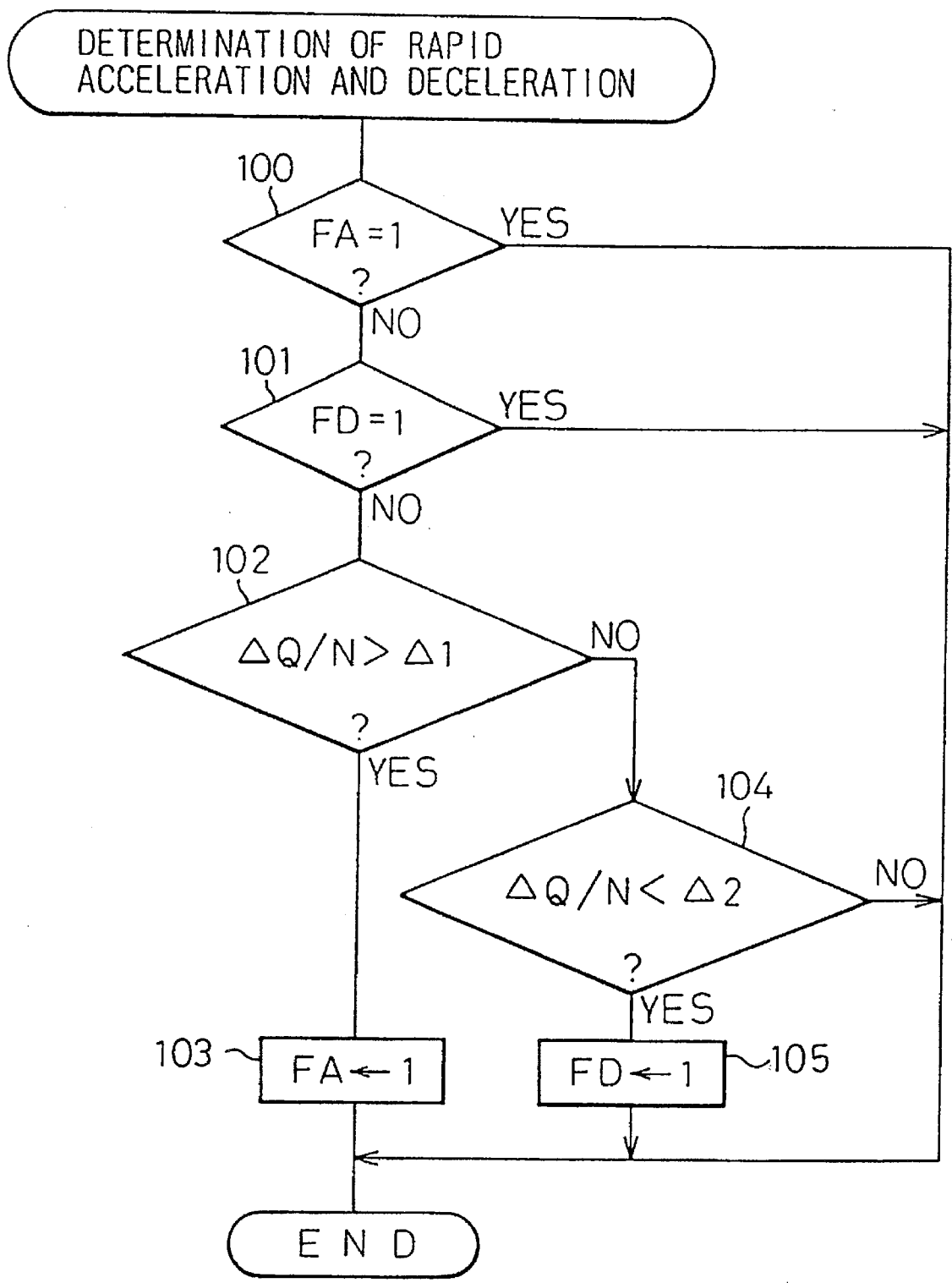
FIG. 15 is a flowchart for executing determination of rapid acceleration or rapid deceleration.

FIG. 15 shows a routine for detecting rapid acceleration or rapid deceleration. This routine is executed by interruption every predetermined time.

Referring to FIG. 15, at step 100, it is determined whether the rapid acceleration flag FA is set. If the flag FA is set, i.e., FA=1, the processing cycle is ended. If the flag FA is reset, i.e., FA=0, the routine goes to step 101, where it is determined whether the rapid deceleration flag FD is set. If the flag FD is set, i.e., FD=1, the processing cycle is ended. If FD is reset, i.e., FD=0, the routine goes to step 102 where it is determined whether a load change $\Delta Q/N$ is larger than the reference load $\Delta 1$ (>0). The load change $\Delta Q/N$ is the difference between the present engine load and the preceding engine load. If $\Delta Q/N > \Delta 1$, the routine goes to step 103, where the flag FA is set, and the processing cycle is ended.

If $\Delta Q/N < \Delta 1$ at step 102, the routine goes to step 104 where it is determined if the load change $\Delta Q/N$ is smaller than the reference change $\Delta 2$ (<0). If $\Delta Q/N < \Delta 2$, the routine goes to step 105 where the flag FD is set, and the processing cycle is ended. If $\Delta Q/N \geq \Delta 2$, the processing cycle is ended. The rapid acceleration flag FA and rapid deceleration flag FD that are set in the routine shown in FIG. 15 are reset in the routine shown in FIGS. 16 to 21.

FIGS. 16 to 21 show a routine for controlling the opening of the air-flow control valve 17. This routine is executed by interruption every predetermined time.

Figure 16:
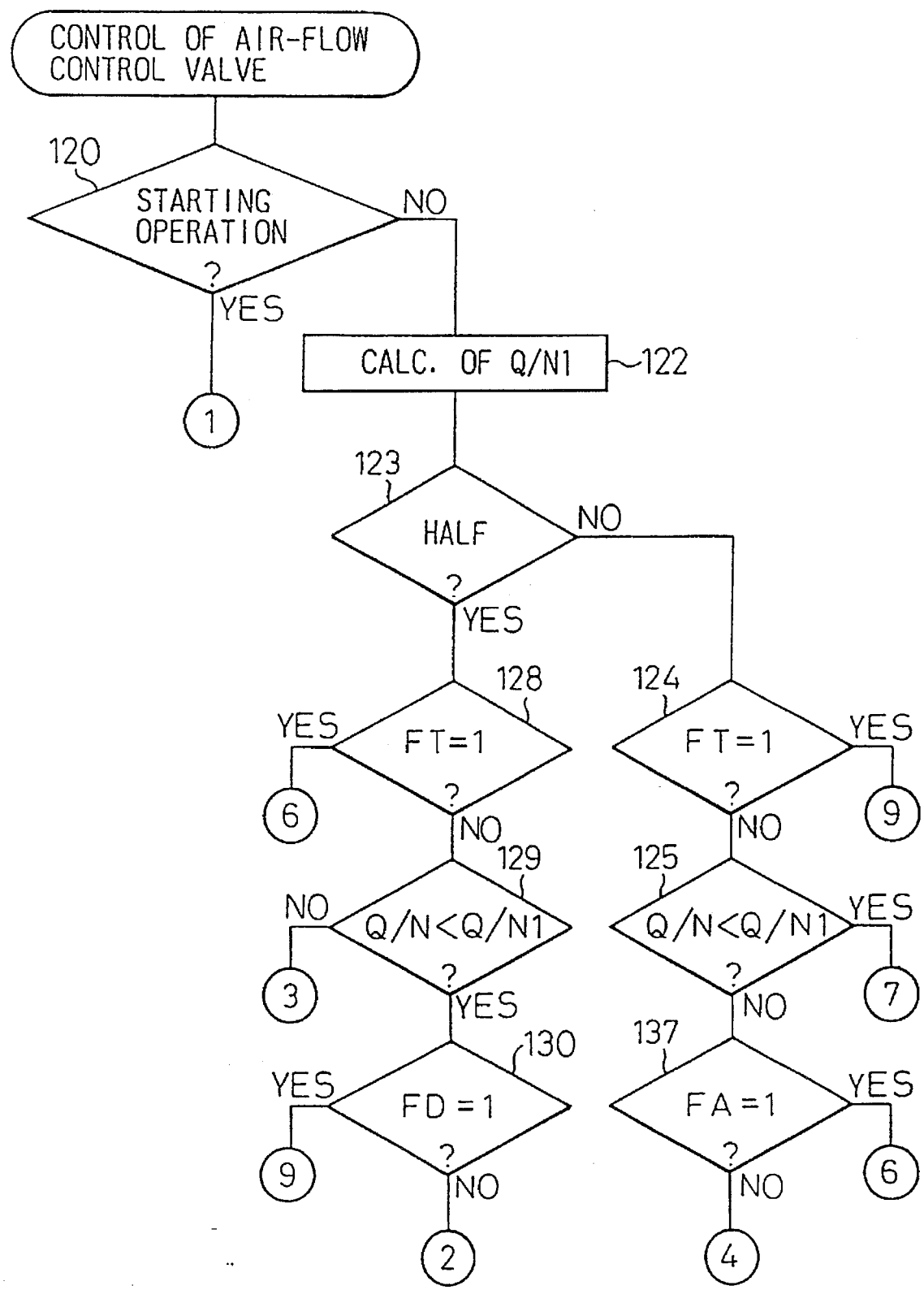
FIGS. 16 through 21 show a flowchart for executing another embodiment of control of the air-flow control valve.
Figure 17:
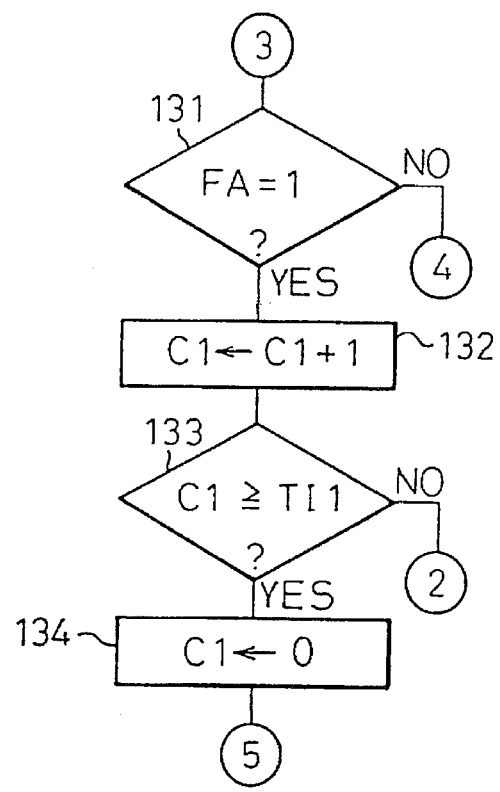
Figure 18:
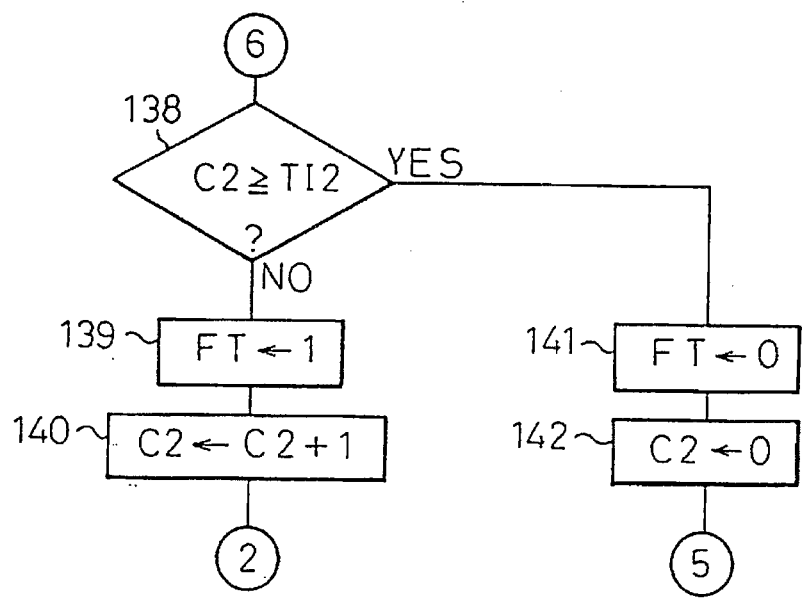
Figure 19:
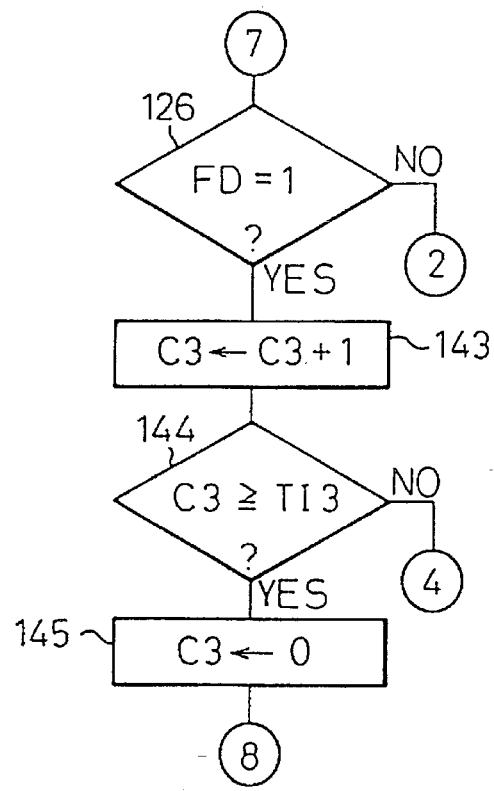
Figure 20:
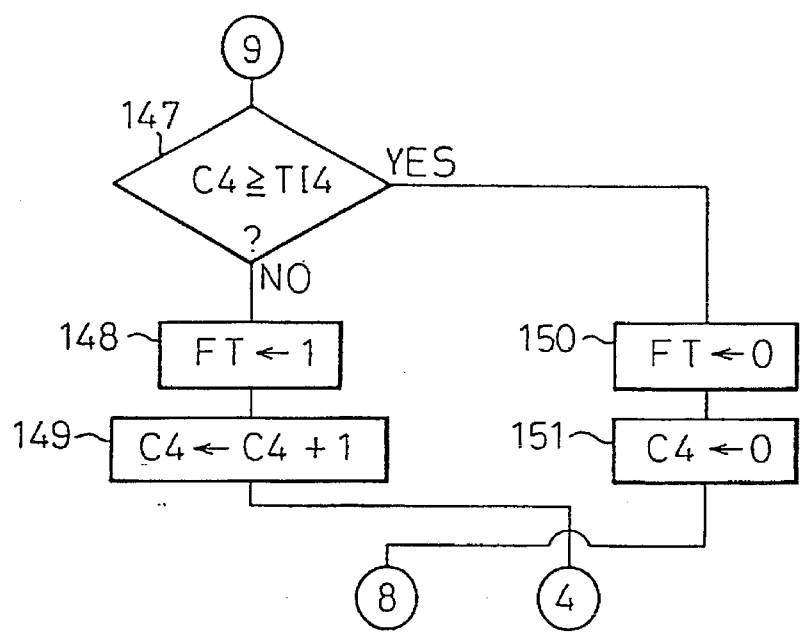
Figure 21:
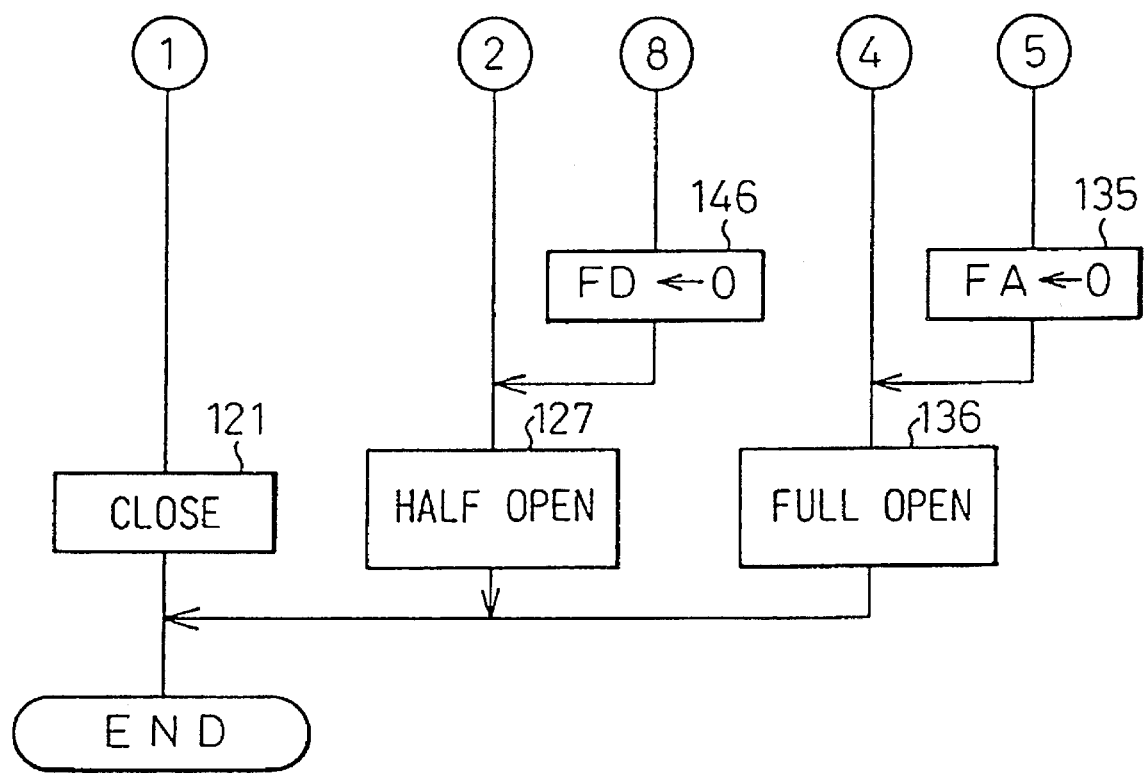

Referring to FIG. 16, at step 120, it is determined whether an engine starting operation is in process. If the engine starting operation is in process, the routine goes to step 121 shown in FIG. 21, where the air-flow control valve 17 is closed, and the processing cycle is ended. The definition of the engine starting operation is the same as that explained with reference to FIG. 1.

After the engine starting operation is completed, the routine goes to step 122, where a first reference load Q/N1 is calculated using the map shown in FIG. 4. Then, the routine goes to step 123, where it is determined whether the valve 17 is at the half open position. When it is the first time for the routine to go to step 123 after the completion of the engine starting operation, the valve 17 is still closed, and the routine goes to step 124 where it is determined whether the opening change flag FT is set. If the engine operating condition is, for example, A as shown in FIG. 9, FT=0, and thus the routine goes to step 125, where it is determined whether the engine load Q/N is below the first reference load Q/N1. If Q/N<Q/N1, the routine goes to step 126 shown in FIG. 19 where it is determined whether the rapid deceleration flag FD is set. If FD=0, the routine goes to step 127 shown in FIG. 21 where the valve 17 is controlled to the half open position, and the processing cycle is ended.

In the next cycle, the valve 17 is at the half open position. Accordingly, the routine goes to, in turn, steps 120, 122, and 123, and then goes to step 128 where it is determined if FT=1. Since FT=0 in this case, the routine goes to step 129 where it is determined if Q/N<Q/N1. If the engine operating condition is steady around A as shown in FIG. 9, Q/N<Q/N1. In this case, the routine goes to step 130 where it is determined if FD=1. When the engine operating condition is kept around A shown in FIG. 9, FD=0. Accordingly, the routine goes to step 127 shown in FIG. 21 where the valve 17 is kept at the half open position.

If the engine operating condition is changed from A to B shown in FIG. 9, Q/N $\geq$ Q/N1 in step 129. Then, the routine goes to step 131 shown in FIG. 17 where it is determined whether the rapid acceleration flag FA is set. If FA=1, the routine goes to step 132 where the count C1 of the first timer is incremented by one. Next, the routine goes to step 133 where it is determined whether the count C1 is above the first set period TI1. If it is first time for the routine to go to step 133 after the clearance of the count C1, C1<TI1. Accordingly, the routine goes to step 127 shown in FIG. 21 where the valve 17 is kept at the half open position. Namely, when the engine is rapidly accelerated, the valve 17 is kept at the half open position even if the engine load Q/N exceeds the first reference load Q/N1, as shown in FIG. 10.

In this case, the routine goes to, in turn, steps 120, 122, 123, 128, 129, 131, 132, 133, and 127 in each cycle. If C1$\geq$TI1 in step 133, i.e., if the period TI1 passes after the engine load Q/N exceeds the first reference load Q/N1, the routine goes to step 134 where the count C1 of the first timer is cleared. Then, the routine goes to step 135 shown in FIG. 21 where the rapid acceleration flag FA is reset. Next, the routine goes to step 136 where the valve 17 is changed to the full open position, and the processing cycle is ended. In this way, if the engine operating condition is changed from A to B due to the rapid acceleration of the engine, the valve 17 is kept at the half open position for the period TI1 after the engine load Q/N exceeds the first reference load Q/N1. Thereafter, the valve 17 is changed to the full open position.

If FA=0 at the step 131 when the engine operating condition is changed from A to B, the engine is slowly accelerated. In this case, the routine goes to step 136 where the valve 17 is changed to the full open position, and the processing cycle is ended. Namely, if the engine operating condition is changed from A to B due to slow acceleration, the valve 17 is changed to the full open position as soon as the engine load Q/N exceeds the first reference load Q/N1.

After the valve 17 is changed to the full open position, the routine goes from step 123 to step 124, where it is determined if FT=1. If it is the first time for the routine to go to step 124 after the valve 17 is changed to the full open position, FT=0. Accordingly, the routine goes to step 125 where it is determined if Q/N<Q/N1. Since Q/N≧Q/N1 in this came, the routine goes to step 137 where it is determined if the rapid acceleration flag FA=1. If FA=1, the routine goes to step 138 shown in FIG. 18 where it is determined whether the count C2 of the second timer is above the second set period TI2. If it is first time for the routine to go to step 138 after the count C2 is cleared, C2<TI2. Accordingly, the routine goes to step 139 where the opening change flag FT is set. Then, the routine goes to step 140 where C the count C2 is incremented by one. Next, the routine goes to step 127 shown in FIG. 21 where the valve 17 is changed to the half open position. In this way, if the engine is rapidly accelerated when the engine load Q/N is higher than the first reference load Q/N1, the valve 17 is changed to the half open position as shown FIG. 11.

In this case, the routine goes to, in turn, steps 120, 122, 123, 128, 138, 139, 140, and 127 in each cycle. If C2≧TI2 in step 138, the valve 17 has been kept at the half open position for the period TI2 with the engine load Q/N being higher than the first reference load Q/N1. Then, the routine goes to step 141 where the opening change flag FT is reset, and, at following step 142, the count C2 of the second timer is cleared. Then, the routine goes to step 135 shown in FIG. 21 where the rapid acceleration flag FA is reset, and, at the following step 136, the valve 17 is changed to the full open position, and the processing cycle is ended. In this way, if the engine is rapidly accelerated when the engine load Q/N is higher than the first reference load Q/N1, the valve 17 is changed from the full open position to the half open position after the rapid acceleration is detected. The valve 17 is kept at the half open position for the second set period TI2, and thereafter, is again changed to the full open position.

If FA=0 at step 137, the routine goes to step 136 where the valve 17 is maintained at the full open position, and the processing cycle is ended. Namely, the valve 17 is maintained at the full open position if the engine operating condition is substantially unchanged from, for example, B shown in FIG. 9.

If the valve 17 is at the full open position, the routine goes from step 123 to step 124. If FT=0 at step 124, the routine goes to step 125. If Q/N<Q/N1 when the engine operating condition is changed from B to A, the routine goes to step 126 shown in FIG. 19 where it is determined whether the rapid deceleration flag FD is set. If FD=1, the routine goes to step 143 where the count C3 of the third timer is incremented by one. Then, the routine goes to step 144 where it is determined whether the count C3 is above the third set period TI3. If it is first time for the routine to go step 144 after the count C3 is cleared, C3<TI3. Accordingly, the routine goes to step 136 shown in FIG. 21 where the valve 17 is maintained at the full open position. Namely, the valve 17 is kept at the full open position even if the engine load Q/N drops below the first reference load Q/N1 due to rapid deceleration as shown in FIG. 12.

In this case, the routine goes to, in turn, steps 120, 122, 123, 124, 125, 126, 143, 144, and 136 in each cycle. If C3≧TI3 in step 144, the period TI3 has passed since the engine load Q/N dropped below the first reference load Q/N1. Then, the routine goes to step 145 where the count C3 of the third timer is cleared, and, at proceeding step 146 shown in FIG. 21 the rapid deceleration flag FD is reset. Then, the routine goes to step 127, where the valve 17 is changed to the half open position, and the processing cycle is ended. In this way, if the engine operating condition is changed from B to A due to rapid deceleration of the engine, the valve 17 is kept at the full open position for the third set period TI3 after the engine lead Q/N drops below the first reference lead Q/N1. Thereafter, the valve 17 is changed to the half open position.

If FD=0 at step 126, i.e., if the engine is slowly decelerated when the engine operating condition is changed from B to A, the routine goes to step 127 where the valve 17 is changed to the half open position, and the processing cycle is ended. Namely, if the deceleration is gradual when the engine operating condition is changed from B to A, the valve 17 is changed to the half open position as soon as the engine lead Q/N drops below the first reference lead Q/N1.

After the air-flow control valve 17 is changed to the half open position, the routine goes from step 123 to step 128, where it is determined whether the opening change flag FT is set. If it is the first time for the routine to go to step 128 after the valve 17 is changed to the half open position, FT=0. Then, the routine goes to step 129 where it is determined whether Q/N<Q/N1. Since Q/N<Q/N1 in this case, the routine goes to step 130 where it is determined whether the rapid deceleration flag FD is set. If FD=1, the routine goes to step 147 shown in FIG. 20 where it is determined whether the count C4 of the fourth counter is above the fourth set period TI4. If it is the first time for the routine to go to step 147 after the count C4 is cleared, C4<TI4. Accordingly, the routine goes to step 148 where the opening change flag FT is set and, at following step 149, the count C4 is incremented by one. Then, the routine goes to step 136 shown in FIG. 21 where the valve 17 is changed to the full open position. Namely, if the engine is rapidly decelerated when the engine lead Q/N is below the first reference lead Q/N1, the valve 17 is changed from the half open position to the full open position as shown in FIG. 13.

In this case, the routine goes to, in turn, steps 120, 122, 123, 124, 147, 148, 149, and 136 in each cycle. If C4≧TI4 in step 147, the period TI4 has passed since the valve 17 was changed to the full open position with the engine load Q/N being below the first reference load Q/N1. Then, the routine goes to step 150 where the opening change flag FT is reset. Then, the routine goes to step 151 where the count C4 is cleared and, at following step 146 shown in FIG. 21, the rapid deceleration flag FD is reset. Then, the routine goes to step 127 where the valve 17 is changed to the half open position, and the processing cycle is ended. In this way, if the engine is rapidly decelerated when the engine load Q/N is below the first reference load Q/N1, the valve 17 changed from the half open position to the full open position after the rapid deceleration of the engine is detected. The valve 17 is kept at the full open position for the fourth period TI4, and thereafter, is again changed to the half open position.

In the embodiment shown in FIGS. 9 to 13, the air-flow control valve 17 is kept at the half open position for the first set period TI1 if the engine is rapidly accelerated and if the engine load Q/N exceeds the first reference load Q/N1 as shown in FIG. 10. If the acceleration is very strong, the amount of air will be too little while the valve 17 is being kept at the half open position for the period TI1. Accordingly, when the acceleration of the engine is very strong, the period for which the valve 17 is kept at the half open position may be shortened. Namely, each load change ΔQ/N is integrated since the engine is accelerated. When the integrated value exceeds reference value S1, the valve 17 is changed to the full open position. The time when the integrated value of ΔQ/N exceeds the reference value S1 becomes earlier as the acceleration becomes stronger. Namely, the valve 17 is quickly changed to the full open position if the engine acceleration is strong. This prevents a shortage of air even when the engine is rapidly accelerated.

Figure 22:
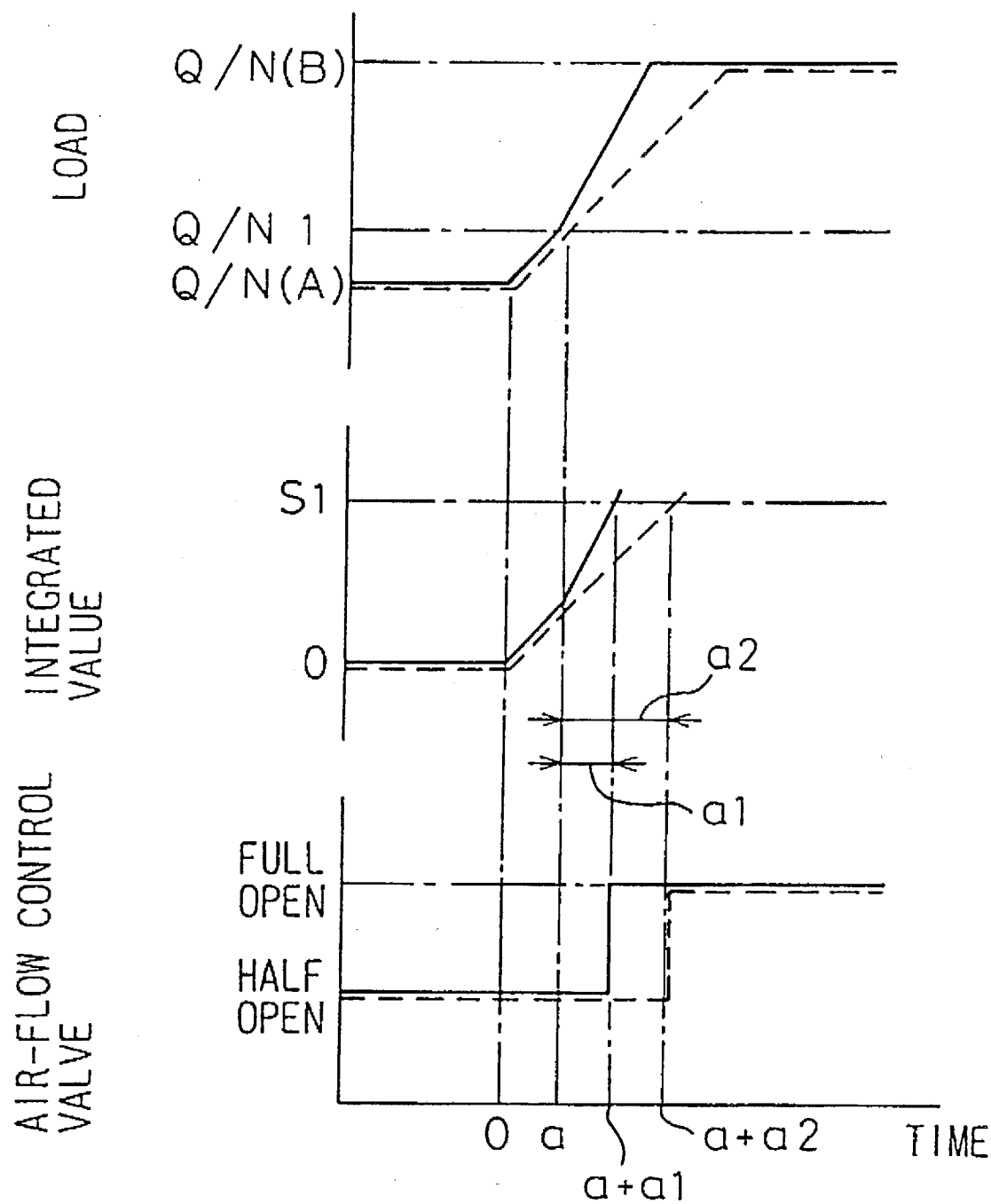
FIG. 22 is a time chart illustrating still another embodiment of control the air-flow control valve when the engine is rapidly accelerated.

FIG. 22 is a time chart showing the engine operating condition changing from A to B due to rapid acceleration. Continuous lines represent rapid acceleration, and dotted lines represent gradual acceleration.

Acceleration starts at time zero where the engine load is Q/N(A)- At time a, the engine load exceeds the first reference load Q/N1. At this time, the air-flow control valve 17 is maintained at the half open position. The integrated load change ΔQ/N, represented by the continuous line, reaches the reference value S1 when a period a1 passes after the time a. At time a+a1, the valve 17 is changed to the full open position. As indicated with the continuous line, the valve 17 is maintained at the half open position for the period a1 after the engine load Q/N exceeds the first reference load Q/N1, and, thereafter, it is changed to the full open position.

The integrated load change ΔQ/N represented with the dotted line reaches the reference value S1 when a period a2 passes after the time a. The period a2 is longer than the period a1. At time a+a2, the valve 17 is changed to the full open position. As indicated with the dotted line, the valve 17 is maintained at the half open position for the period a2 after the engine load Q/N exceeds the first reference load Q/N1, and thereafter, the valve 17 is changed to the full open position. As the engine acceleration becomes strong, the period for which the valve 17 is kept at the half open position after the engine load Q/N exceeds the first reference load Q/N1 becomes shorter. This prevents a shortage of air even when the engine is rapidly accelerated.

In the embodiment shown in FIG. 11, the air-flow control valve 17 is temporarily maintained at the half open position if the engine is rapidly accelerated when the engine load Q/N is above the first reference load Q/N1. In this case, the period for which the valve 17 is maintained at the half open position may be shortened as the acceleration of the engine becomes stronger.

In the embodiment shown in FIG. 12, the valve 17 is maintained at the full open position if the engine is rapidly decelerated to drop the engine load Q/N below the first reference load Q/N1. In this case, the period for which the valve 17 is held at the full open position before it is changed to the half open position may be shortened as the deceleration of the engine becomes more rapid. This prevents an excess of air when the engine is rapidly decelerated.

In the embodiment shown in FIG. 13, the valve 17 is temporarily maintained at the full open position if the engine is rapidly decelerated when the engine load Q/N is below the first reference load Q/N1. In this case, the period for which the valve 17 is maintained at the full open position may be shortened as the deceleration becomes more rapid.

Figure 23:
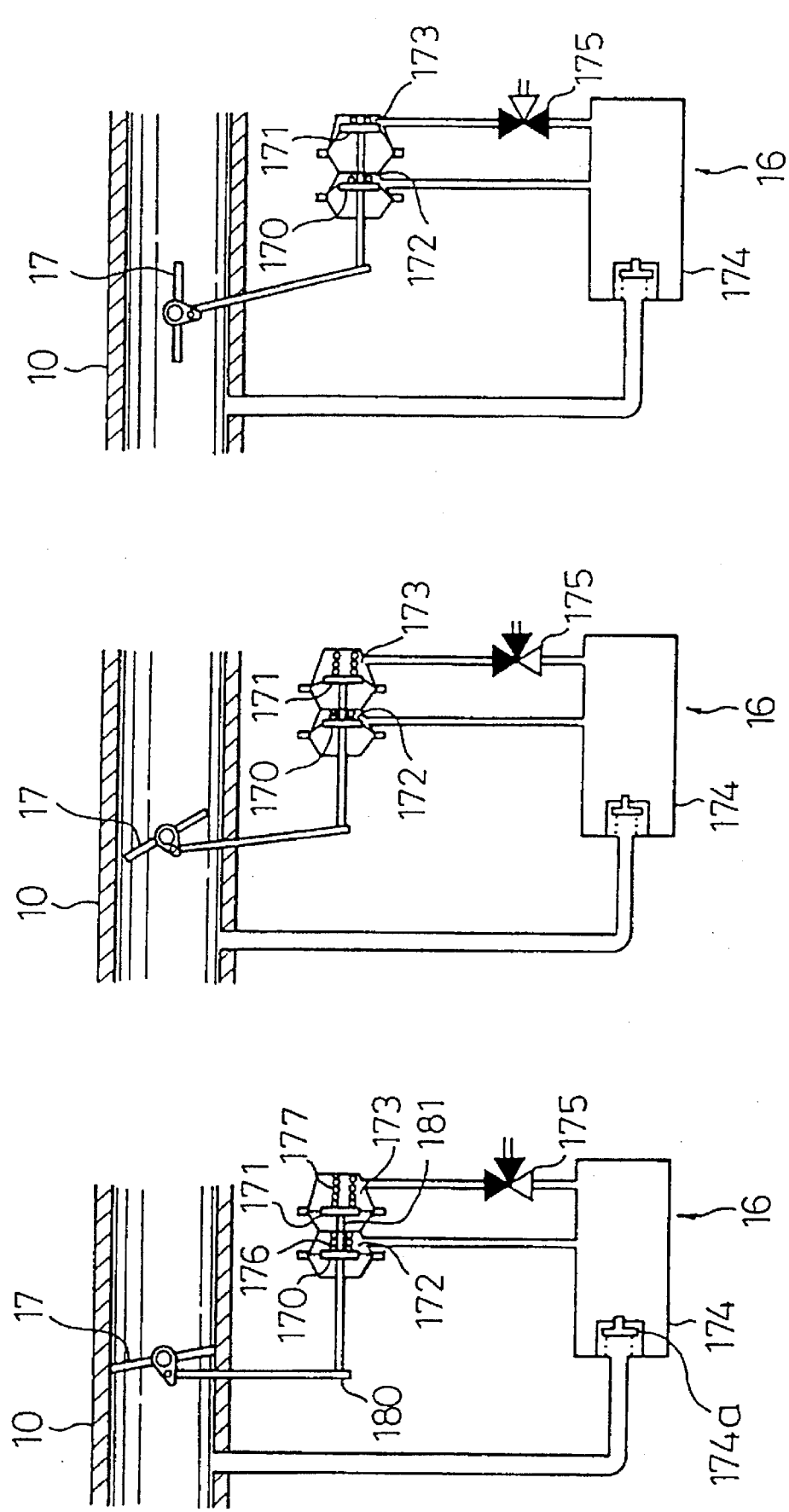
FIGS. 23A through 23C are enlarged views illustrating an embodiment of a driving apparatus for driving the air-flow control valve.

FIGS. 23A to 23C show an embodiment of the driving apparatus 16 for driving the air-flow control valve 17.

Referring to FIGS. 23A to 23C, the driving apparatus 16 has a first diaphragm 170 that defines a first vacuum chamber 172, and a second diaphragm 171 that defines a second vacuum chamber 173. The first diaphragm 170 is connected to the air-flow control valve 17 through a connection rod 180. The second diaphragm 171 is connected to the first diaphragm 170 through a connection rod 181. The first vacuum chamber 172 is connected to the branch 10 downstream of the valve 17 through a vacuum tank 174 for keeping a negative pressure. The second vacuum chamber 173 is connected to the branch 10 through, in turn, a 3-way valve 175 and the vacuum tank 174, or to the atmosphere through the 3-way valve 175, The vacuum tank 174 serves as a vacuum source for storing the negative pressure in the branch 10, The vacuum tank includes a check valve 174a to pass the negative pressure in the branch 10 only toward the vacuum tank 174. The 3-way valve 175 is a vacuum control valve which connects, when de-energized, the second vacuum chamber 173 to the atmosphere, and when energized, to the vacuum tank 174. When the second vacuum chamber 173 is connected to the atmosphere through the 3-way valve 175, the vacuum tank 174 is not connected to the atmosphere, The 3-way valve 175 is controlled by signals output from the electronic control unit 50.

The first vacuum chamber 172 incorporates a spring 175 to zero the displacement of the first diaphragm 170. The second vacuum chamber 173 incorporates a spring 177 to zero the displacement of the second diaphragm 171. As the displacements of the first and second diaphragms 170 and 171 increase, the degree of opening of the valve 17 expands. As the negative pressures of the first and second vacuum chambers 172 and 173 increase, the displacements of the first and second diaphragms 170 and 171 increase to enlarge the degree of opening of the valve 17.

In FIG. 23A, the engine is stopped or under an engine starting operation. When the engine is stopped, there is no negative pressure in the branch 10 downstream of the air-flow control valve 17. At this time, the 3-way valve 175 connects the second vacuum chamber 173 to the atmosphere, so that there is no negative pressure in the first and second vacuum chambers 172 and 173. As a result, no displacement occurs on the first and second diaphragms 170 and 171, and therefore, the valve 17 is closed.

Just after the engine is started, the negative pressure in the branch 10 downstream of the air-flow control valve 17 is small, so that the valve 17 is still closed. Once the engine starting operation to bring the engine speed above N0 (for example, 400 rpm) is completed, the negative pressure produced in the branch 10 is sufficient to displace the first diaphragm 170. Namely, the negative pressure in the branch 10 is introduced into the first vacuum chamber 172 through the vacuum tank 174, to slightly displace the first and second diaphragms 170 and 171. As a result, the valve 17 is moved to the half open position as shown in FIG. 23B. At this time, the second vacuum chamber 173 is connected to the atmosphere through the 3-way valve 175.

To move the air-flow control valve 17 from the half open position to the full open position, the 3-way valve 175 is controlled to connect the second vacuum chamber 173 to the vacuum tank 174. As a result, the negative pressure in the vacuum tank 174 is introduced into the second vacuum chamber 173, to largely displace the first and second diaphragms 170 and 171, to thereby move the valve 17 to the full open position as shown in FIG. 23C.

To change the valve 17 from the full open position to the half open position, the 3-way valve 175 is controlled to connect the second vacuum chamber 173 to the atmosphere. As a result, the displacements of the first and second diaphragms 170 and 171 are released to move the valve 17 to the half open position.

In this way, the degree of opening of the air-flow control valve is controlled to the three positions by controlling a single valve. This arrangement reduces the cost and power consumption of the driving apparatus 16. When the engine is stopped, the valve 17 is closed, and the closed state is maintained until the next engine starting operation is completed without special control.

In FIGS. 23A to 23C, the 3-way valve 175 is controlled to connect the second vacuum chamber 173 to the atmosphere when the engine is stopped. At this time, the air-flow control valve 17 will quickly be closed if the negative pressure in the first vacuum chamber 172 is quickly weakened. However, if the valve 17 is quickly closed when the engine is stopped, condensed water on the inner wall of the branch 10 may attach to the valve 17. If the condensed water freezes during the stoppage of the engine, the valve 17 will be fixed to the inner wall of the branch 10. Then, the valve 17 will be immobile when the engine is started. To avoid this problem, the vacuum tank 174 provides the first vacuum chamber 172 with a proper negative pressure to keep the valve 17 open after the engine is stopped, thereby preventing the icing. Piping between the first vacuum chamber 172 and the vacuum tank 174 will leak the negative pressure after the engine is stopped, to gradually close the valve 17. Before the valve 17 is fully closed due to the leakage, the condensed water on the inner wall of the branch 10 will disappear, to cause no icing.

Figure 24:
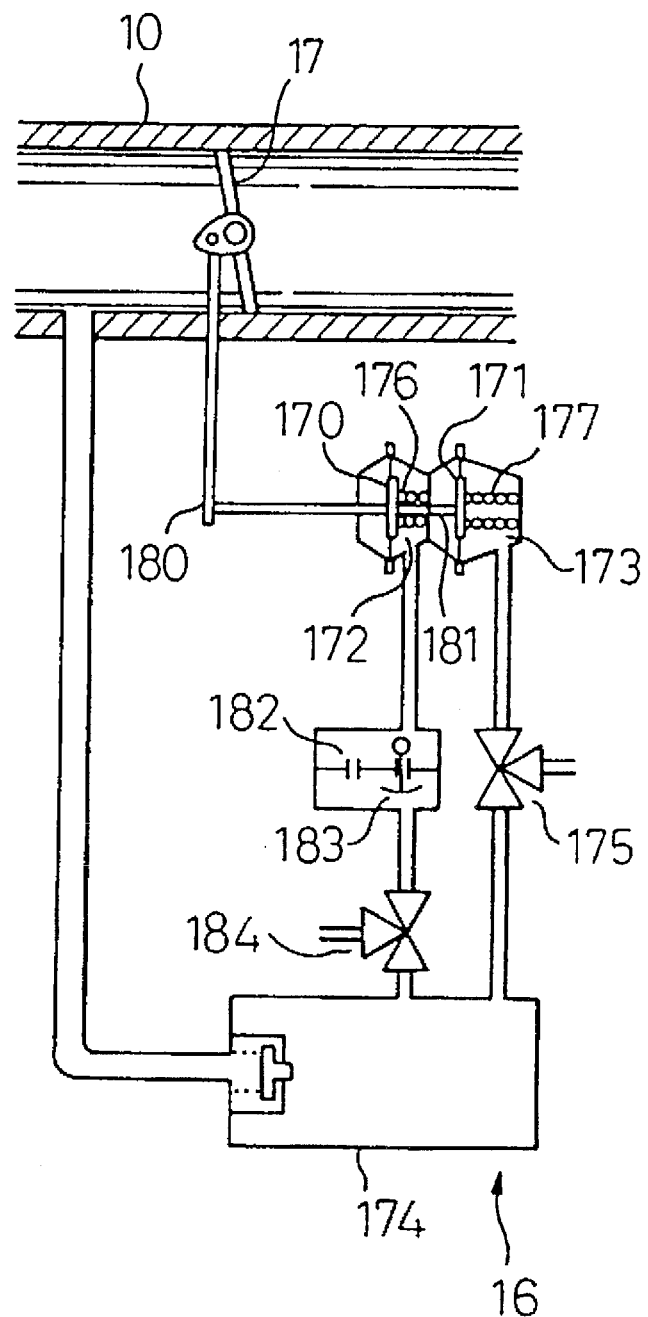
FIG. 24 is an enlarged view illustrating another embodiment of a driving apparatus for driving the air-flow control valve.

FIG. 24 shows another embodiment of the driving apparatus 16.

A first vacuum chamber 172 is connected to a vacuum tank 174 through a choke 182 and a check valve 183. The choke 182 and check valve 183 are arranged in parallel with each other and form a pressure keeper for keeping a negative pressure. The check valve 183 allows the negative pressure in the vacuum tank 174 to pass only toward the first vacuum chamber 172. The check valve 183 prevents a leakage of the negative pressure in the first vacuum chamber 172. The choke 182 also prevents the leakage of the negative pressure in the first vacuum chamber 172 better than the embodiment shown in FIGS. 23A to 23C. Accordingly, the air-flow control valve 17 is slowly closed after the engine is stopped, to surely prevent the icing. The pressure keeper may be arranged to restrict the leakage of the negative pressure in a second vacuum chamber 173, or the negative pressures in both of the first and second vacuum chambers 172 and 173.

An additional 3-way valve 184 is arranged between the keeper and the vacuum tank 174. When the engine is started, the 3-way valve 184 continuously connects the first vacuum chamber 172 to the vacuum tank 174. When the engine is stopped, the 3-way valve 184 connects the first vacuum chamber 172 to the atmosphere and disconnects the vacuum tank 174 from the atmosphere. The 3-way valve 184 is controlled by signals output from the electronic control unit 50.

The embodiment shown in FIGS. 23A to 23C uses a leakage from the piping between the first vacuum chamber 172 and the vacuum tank 174 to gradually close the air-flow control valve 17 after the engine is stopped. The piping, however, is usually designed and installed to minimize a leakage. If the piping shown in FIGS. 23A to 23C is formed to have very little leakage, it will take a long tame to close the valve 17 after the engine is stopped. In this came, the valve 17 will not have completely closed when the engine is restarted within a short time after the stoppage of the engine. To solve this problem, in the embodiment shown in FIG. 24, the 3-way valve 184 is controlled to connect the first vacuum chamber 172 to the atmosphere after the engine is stopped, so that it will not take a very long time to close the valve 17. Even if the engine is shortly restarted, the valve 17 will have been closed, while the icing problem is avoided.

When an engine starting operation is completed, the air-flow control valve 17 must be brought to the half open position to secure a proper amount of air. The embodiments shown in FIGS. 23A to 23C and 24 introduce the negative pressure produced in the branch 10 into the first vacuum chamber 172 to open the valve 17. This negative pressure in the branch 10 increases as the engine speed N increases, to gradually open the air-flow control valve 17. When the valve 17 is gradually opened, the negative pressure in the branch 10 decreases, so that, when the engine starting operation is completed, the negative pressure in the first vacuum chamber 172 may be insufficient to hold the valve 17 at the half open position. To solve this problem, the 3-way valve 175 is controlled to connect the second vacuum chamber 173 to the vacuum tank 174 during a transition condition just before the completion of the engine starting operation. The transitional condition is from when the engine speed N exceeds, for example, 300 rpm until the engine speed exceeds 400 rpm. The negative pressure in the vacuum tank 174 is introduced also into the second vacuum chamber 173, to quickly open the valve 17 during the transition condition, This results in increasing the amount of air during the transition condition, to quickly increase the engine speed N and speedily complete the engine starting operation. This also results in quickly securing the negative pressure in the first vacuum chamber 172, so that the valve 17 may be held at the half open position with the negative pressure in the first vacuum chamber 172 without the negative pressure in the second vacuum chamber 173 after the completion of the engine starting operation. When the engine starting operation is completed, i.e., when the engine speed N exceeds 400 rpm, the valve 17 is controlled according to the technique explained with reference to FIG. 1.

Figure 25:
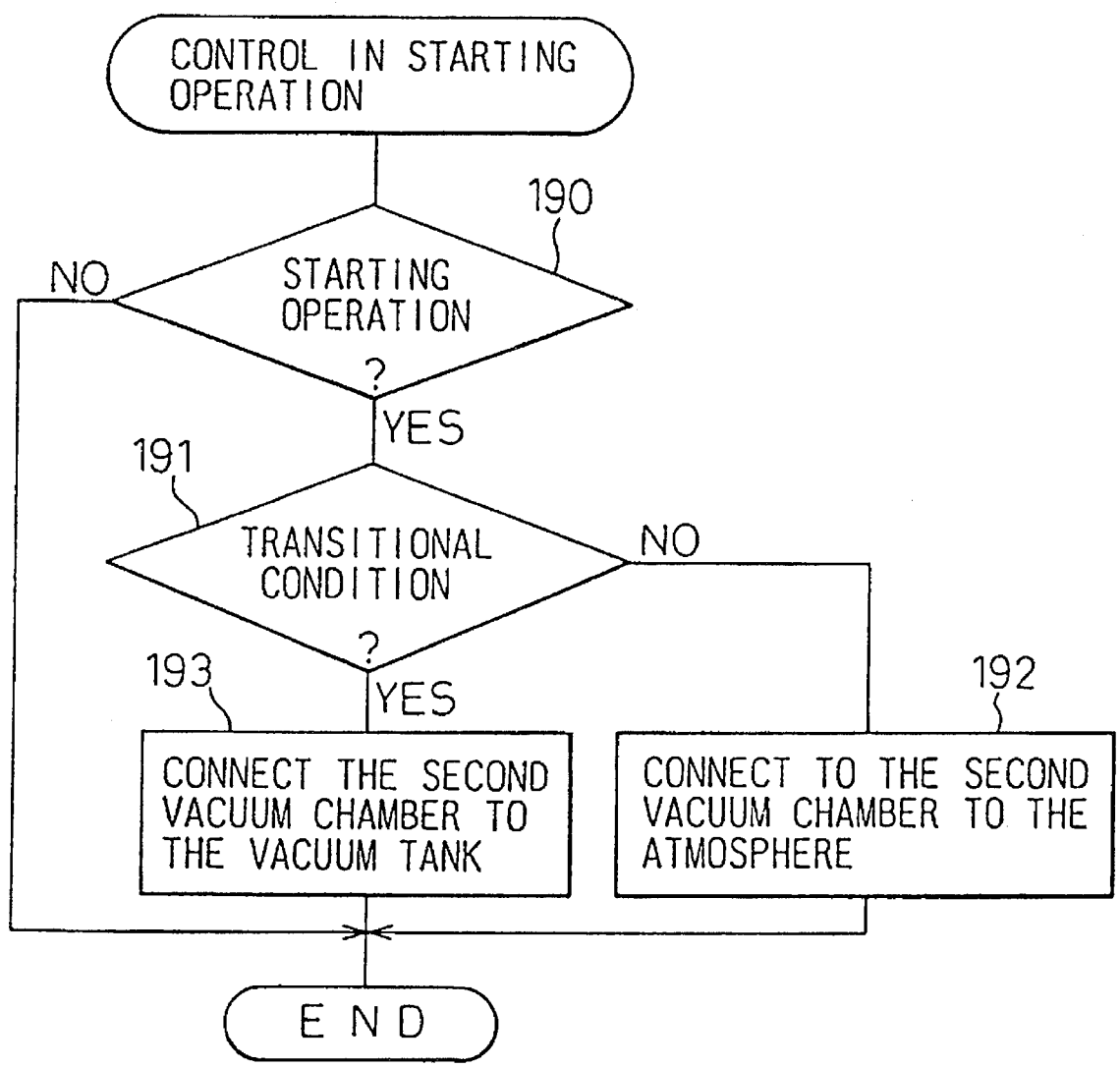
FIG. 25 is a flowchart for executing control of the air-flow control valve in a transitional condition.

FIG. 25 is a flowchart showing a routine for executing control of the air-flow control valve 17 during the transition condition just before the completion of an engine starting operation. This routine is executed by interruption every predetermined time.

Referring to FIG. 25, at step 190, it determined whether an engine starting operation is in process. If the engine starting operation has been completed, the processing cycle is ended. If the engine starting operation is in process, the routine goes to step 191 where it is determined whether a transition condition is in process. Namely, at step 191, it is determined whether the engine speed N is higher than 300 rpm. If the transition condition is not in process, the routine goes to step 192 where the 3-way valve 175 is controlled to connect the second vacuum chamber 173 to the atmosphere, and the processing cycle is ended. If the transition condition is in process, the routine goes to step 193 where the 3-way valve 175 is controlled to connect the second vacuum chamber 173 to the vacuum tank 174, and the processing cycle is ended.

Figure 26A:
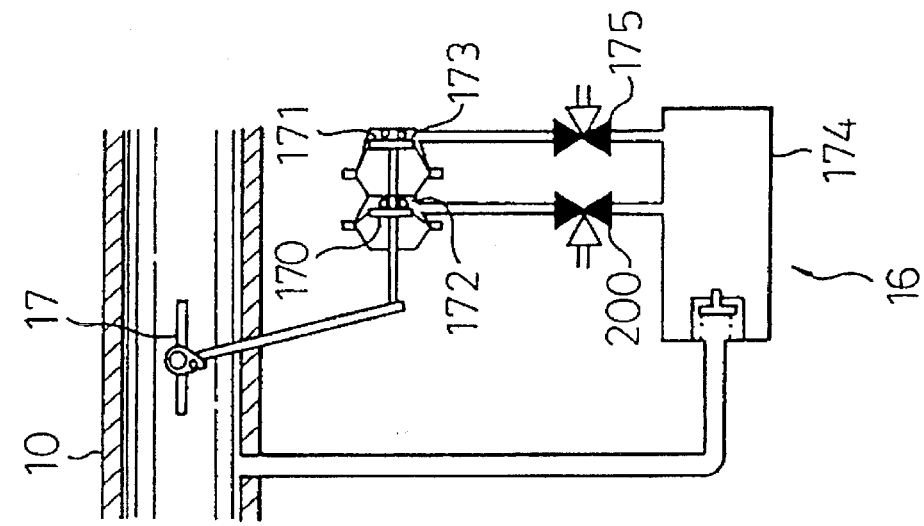
FIGS. 26A through 26C are enlarged views illustrating still another embodiment of a driving apparatus for driving the air-flow control valve.
Figure 26B:
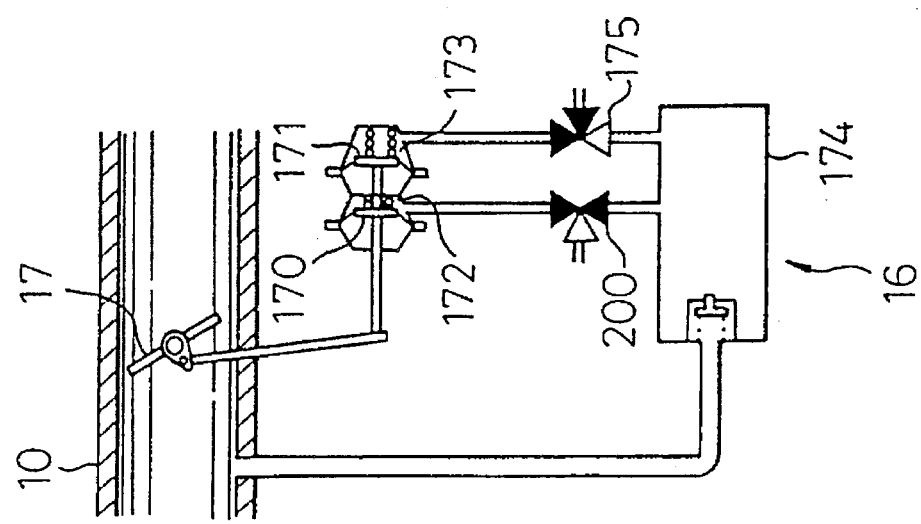
Figure 26C:
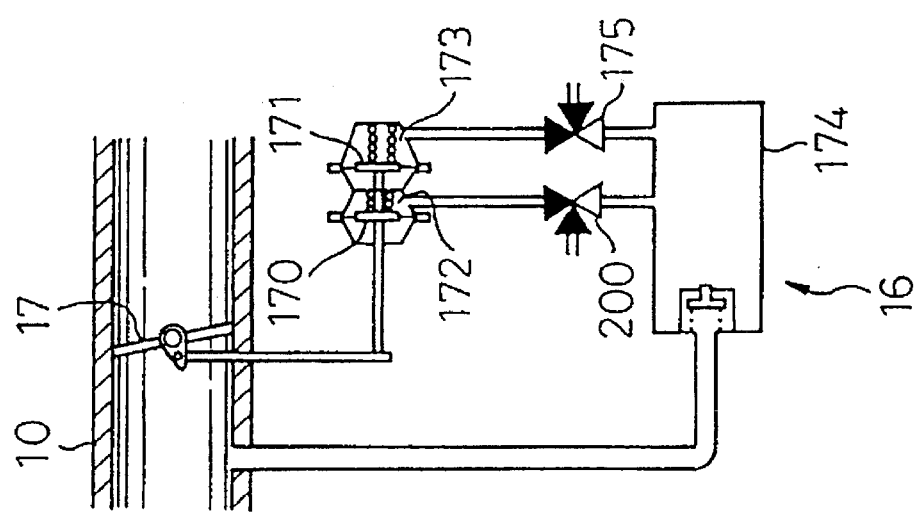

FIGS. 26A to 26C show still another embodiment of the driving apparatus

In addition to the driving apparatus shown in FIGS. 23A to 23C, the driving apparatus 16 of this embodiment has a 3-way valve 200 arranged between a first vacuum chamber 172 and a vacuum tank 174. The 3-way valve 200 is controlled by signals output from the electronic control unit 50, to connect the first vacuum chamber 175 to the vacuum tank 174 or to the atmosphere. When the first vacuum chamber 172 is connected to the atmosphere, the vacuum tank 174 is disconnected from the atmosphere.

FIG. 26A, the engine is stopped or in an engine starting operation. At this time, the 3-way valve 200 connects the first vacuum chamber 172 to the atmosphere, and a 3-way valve 175 connects a second vacuum chamber 173 to the atmosphere, to close the air-flow control valve 17. The driving apparatus 16 is capable of easily closing the valve 17 during the engine starting operation.

To change the valve 17 to the half open position, the 3-way valve 200 is controlled to connect the first vacuum chamber 172 to the vacuum tank 174, and the 3-way valve 175 is controlled to connect the second vacuum chamber 173 to the atmosphere. As a result, first and second diaphragms 170 and 171 are slightly displaced to change the valve 17 to the half open position as shown in FIG. 26B. To drive the valve 17 to the full open position, the 3-way valve 200 connects the first vacuum chamber 172 to the vacuum tank 174, and the 3-way valve 175 connects the second vacuum chamber 173 to the vacuum tank 174. As a result, the first and second diaphragms 170 and 171 are fully displaced, to fully open the valve 17 as shown in FIG. 26C. After the completion of the engine starting operation, the 3-way valve 200 always connects the first vacuum chamber 172 to the vacuum tank 174.

Figure 27A:
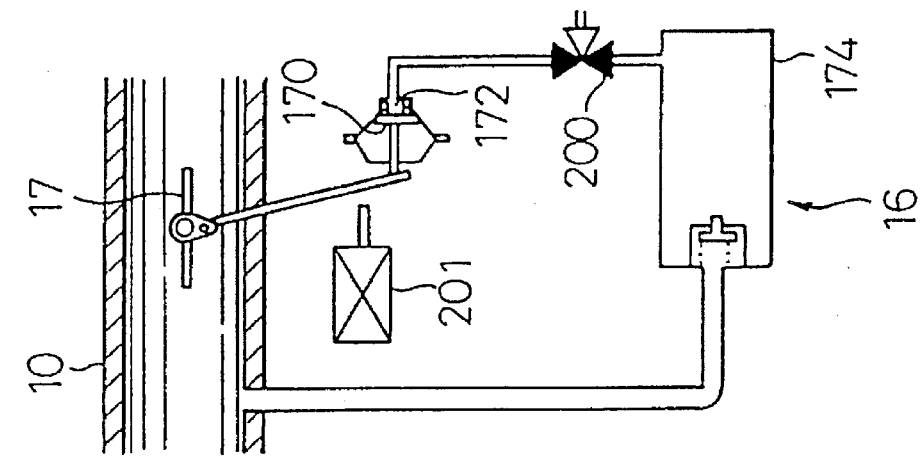
FIGS. 27A through 27C are enlarged views illustrating still another embodiment of a driving apparatus for driving the air-flow control valve.
Figure 27B:
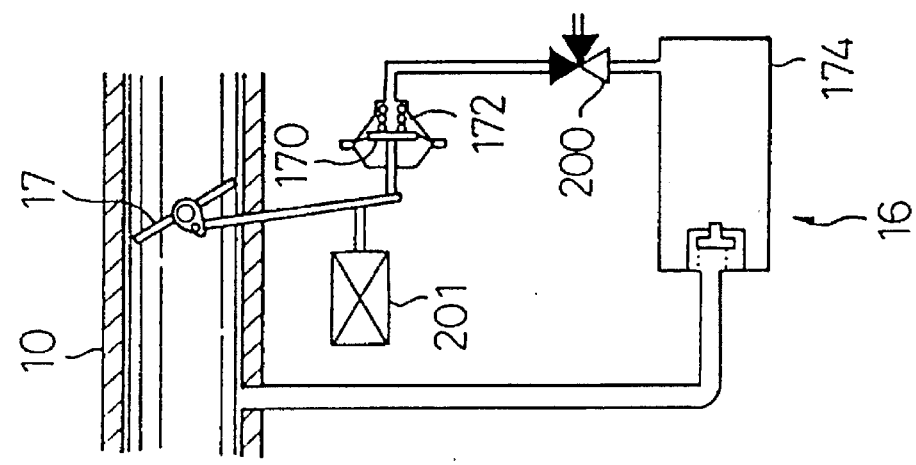
Figure 27C:
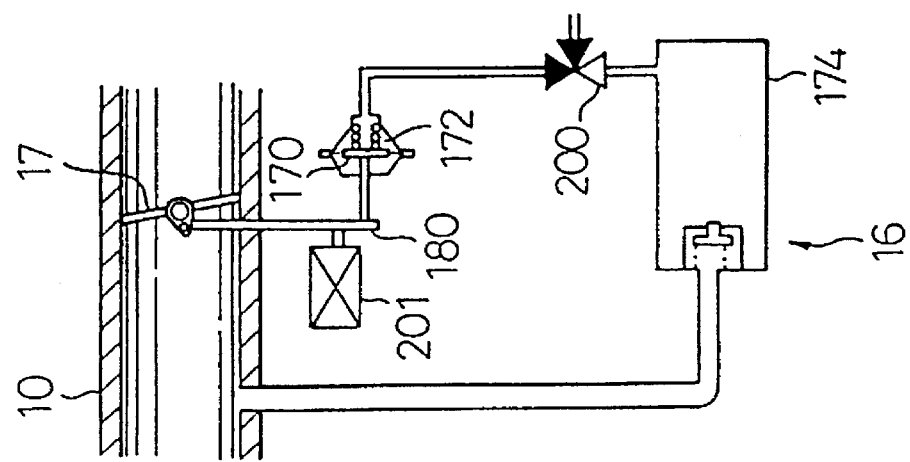

FIGS. 27A to 27C show still another embodiment of the driving apparatus 16.

The driving apparatus 16 has a diaphragm 170 that defines a vacuum chamber 172. A 3-way valve 200 connects the vacuum chamber 172 to a vacuum tank 174 or to the atmosphere. A solenoid actuator 201 is controlled by signals output from the electronic control unit 50. When energized, the solenoid actuator 201 pushes a connection rod 180.

In FIG. 27A, the engine is stopped or in an engine starting operation. At this time, the solenoid actuator 201 is de-energized, and the 3-way valve 200 connects the vacuum chamber 175 to the atmosphere, to close the air-flow control valve 17. Since the valve 17 is closed when the engine is stopped, the valve 17 is closed when the engine starting operation is to be carried out without special control.

To change the valve to the half open position, the solenoid actuator 201 is energized to push the connection rod 180 while the 3-way valve 200 connects the vacuum chamber 172 to the atmosphere. As a result, the valve 17 is changed to the half open position as shown in FIG. 27B. The solenoid actuator 201 speedily moves the valve 17 to the half open position after the engine starting operation is completed.

To change the valve 17 to the full open position, the 3-way valve 200 is controlled to connect the vacuum chamber 172 to the vacuum tank 174, to largely displace the diaphragm 170. As a result, the valve 17 is controlled to the full open position as shown in FIG. 27C. When the valve 17 is at the full open position, the solenoid actuator 201 is away from the connection rod 180.

FIGS. 28A to 28C show still another embodiment the driving apparatus 16.

This driving apparatus is based on the driving apparatus shown in FIGS. 26A to 26C. The opening operation of the valve 17, however, differs from that shown in FIGS. 26A to 26C.

In FIG. 28A, the engine is stopped. At this time, a first vacuum chamber 172 is connected to the atmosphere through a 3-way valve 200, and a second vacuum chamber 173 is connected to the atmosphere through a 3-way valve 175, to maintain the valve 17 at the full open position. The valve 17 is kept at the full open position after the engine is stopped, to prevent icing.

When the engine is started, the valve 17 must be closed. For this purpose, the 3-way valve 200 is controlled to connect the first vacuum chamber 172 to a vacuum tank 174, and the 3-way valve 175 is controlled to connect the second vacuum chamber 173 to a vacuum tank 174, to largely displace the first and second diaphragms 170 and 171. As a result, the valve 17 is closed as shown in FIG. 28B.

To move the valve 17 to the half open position, the 3-way valve 200 is controlled to connect the first vacuum chamber 172 to the vacuum tank 174, and the 3-way valve 175 is controlled to connect the second vacuum chamber 173 to the atmosphere, to slightly displace the first and second diaphragms 170 and 171. As a result, the valve 17 is changed to the half open position as shown in FIG. 28C.

To change the valve 17 from the half open position to the full open position, the second vacuum chamber 173 is connected to the atmosphere, and the 3-way control valve 200 is controlled to connect the first vacuum chamber 172 to the atmosphere. As a result, the valve 17 is changed to the full open position as shown in FIG. 28A. After the completion of the engine starting operation, the second vacuum chamber 173 is always connected to the atmosphere.

Figure 29A:
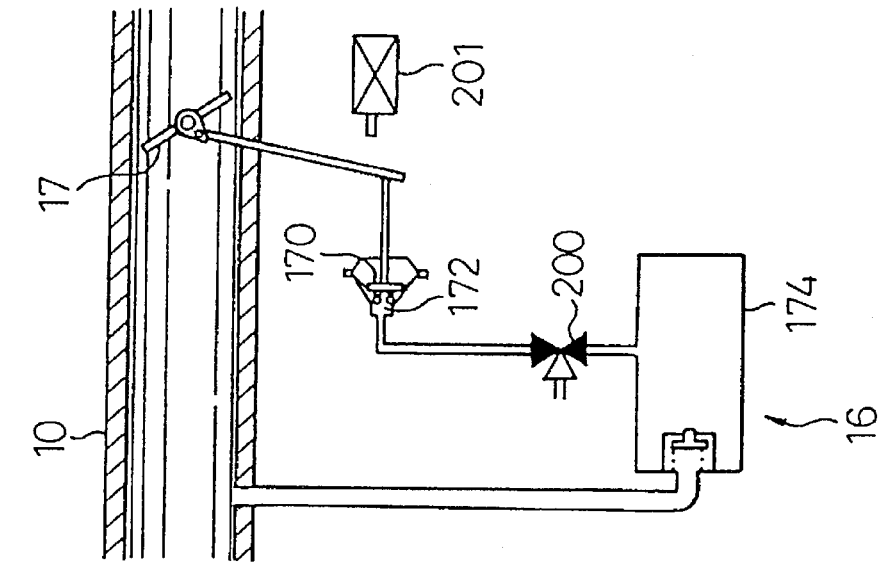
FIGS. 29A through 29C are enlarged views illustrating still another embodiment of a driving apparatus for driving the air-flow control valve.
Figure 29B:
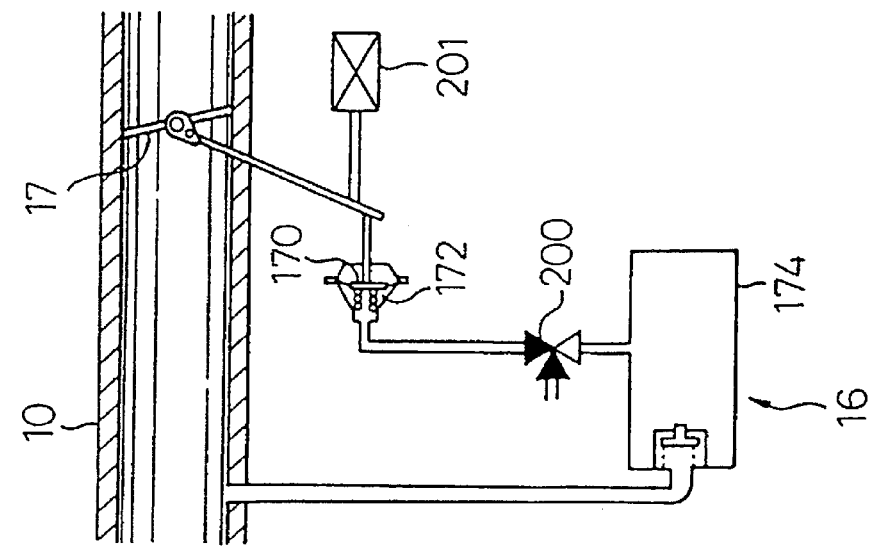
Figure 29C:
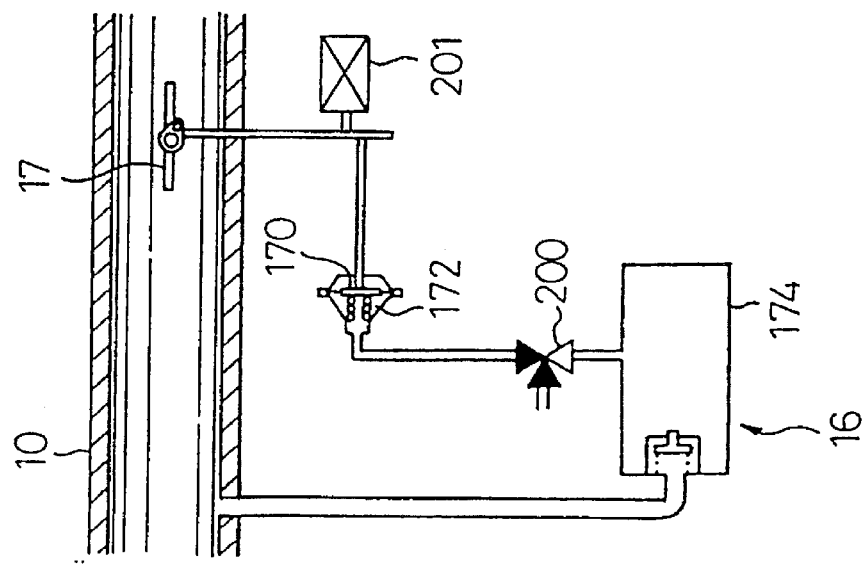

FIGS. 29A to 29C show still another embodiment of the driving apparatus 16.

This driving apparatus is based on the driving apparatus shown in FIGS. 27A to 27C. The opening operation of the valve 17, however, differs from that shown in FIGS. 27A to 27C.

In FIG. 29A, the engine is stopped. A vacuum chamber 172 is connected to the atmosphere through a 3-way valve 200, and a solenoid actuator 201 is de-energized to keep the valve 17 at the full open position. Similar to the embodiment shown in FIGS. 28A to 28C, the valve 17 is kept at the full open position after the engine is stopped, to prevent icing.

When the engine is started, the valve 17 must be closed. To achieve this, the vacuum chamber 172 is connected to the atmosphere, and the solenoid actuator 201 is energized to close the valve 17, as shown in FIG. 29B. In this way, the solenoid actuator 201 is used to close the valve 17 when the engine is started. Thereafter, the valve 17 may quickly be moved to the half open position.

To change the valve 17 from the full open position to the half open position, the solenoid actuator 201 is de-energized, and the 3-way valve 200 is controlled to connect the vacuum chamber 172 to a vacuum tank 174, to change the valve 17 to the half open position as shown in FIG. 29C. At this time, the solenoid actuator 201 is away from a connection rod 180.

To change the valve 17 from the half open position to the full open position, the solenoid actuator 201 is de-energized, and the 3-way valve 200 is controlled to connect the vacuum chamber 172 to the atmosphere, to change the valve 17 to the full open position as shown in FIG. 29A. After the completion of the engine starting operation, the solenoid actuator 201 is continuously de-energized.

Figure 30A:
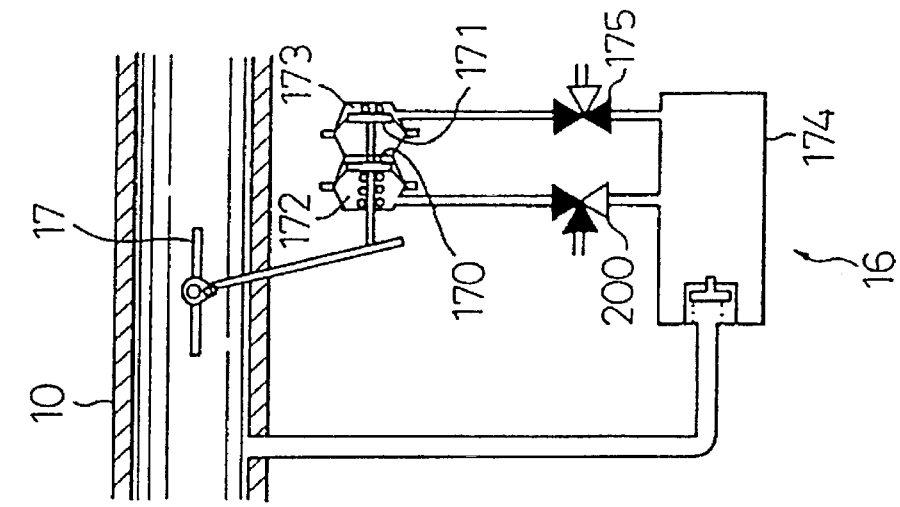
FIGS. 30A through 30C are enlarged views illustrating still another embodiment of a driving apparatus for driving the air-flow control valve.
Figure 30B:
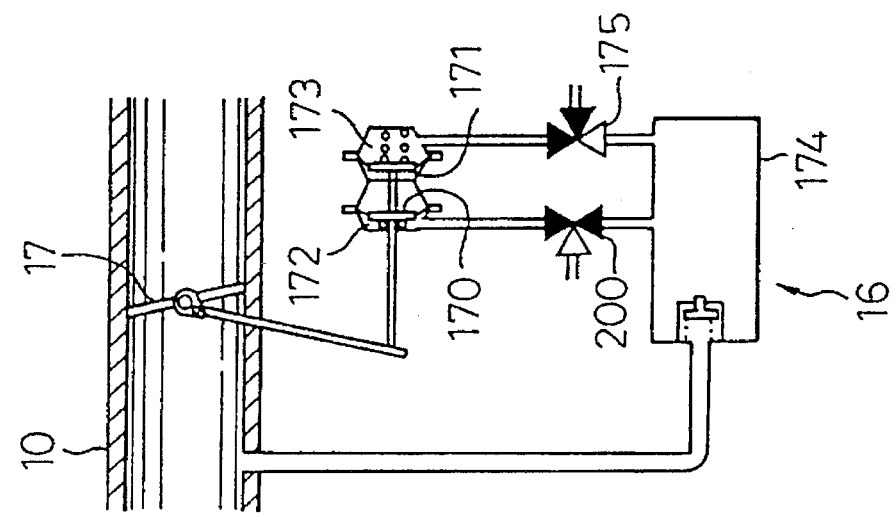
Figure 30C:
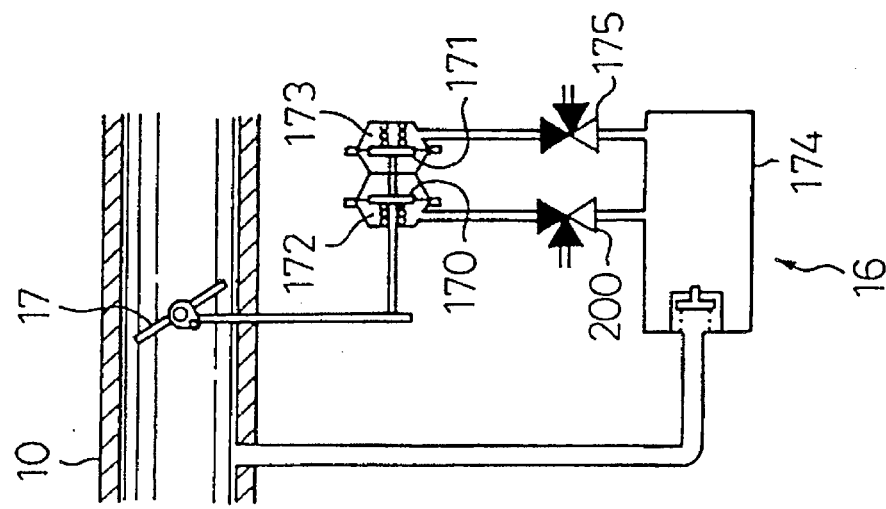

FIGS. 30A to 30C show still another embodiment of the driving apparatus 16.

This driving apparatus is substantially the same as that shown in FIGS. 26A to 26C. The direction in which a first diaphragm 170 is displaced when a negative pressure is introduced into a first vacuum chamber 172, however, is opposite to a direction in which a second diaphragm 171 is displaced when a negative pressure is introduced into a second vacuum chamber 173. Further, a direction in which the valve 17 is rotated about the axis thereof when a negative pressure is introduced into the first vacuum chamber 172 is opposite to the direction in which the valve 17 is rotated about the axis thereof when a negative pressure is introduced into the second vacuum chamber 173.

In FIG. 30A, the engine is stopped. The first vacuum chamber 172 is connected to the atmosphere through a 3-way valve 200, and the second vacuum chamber 173 is connected to the atmosphere through a 3-way valve 175, to keep the valve 17 at the half open position. Keeping the valve 17 at the half open position when the engine is stopped prevents icing.

When the engine is started, the valve 17 must be closed. To achieve this, the second vacuum chamber 173 is connected to the atmosphere, and the 3-way valve 200 is controlled to connect the first vacuum chamber 172 to a vacuum tank 174. As a result, the first and second diaphragms 170 and 171 are displaced toward the first vacuum chamber 172, to close the valve 17 as shown in FIG. 30B.

To fully open the valve 17, the 3-way valve 200 is controlled to connect the first vacuum chamber 172 to the atmosphere, and the 3-way valve 175 controlled to connect the second vacuum chamber 173 to the vacuum tank 174. As a result, the first and second diaphragms 170 and 171 are displaced toward the second vacuum chamber 173, to fully open the valve 17 as shown in FIG. 30C.

The first and second vacuum chambers 172 and 173 never simultaneously receive a negative pressure through all operating conditions, so that the negative pressure supplied to one of the vacuum chambers 172 and 173 is always secured.

FIGS. 31A to 31C show still another embodiment of the driving apparatus 16.

This driving apparatus 16 is based on the driving apparatus shown in FIGS. 27A to 27C. A solenoid actuator 201 of this embodiment, however, pulls back a connection rod 180 when energized.

In FIG. 31A, the engine is stopped. A vacuum chamber 172 is connected to the atmosphere through a 3-way valve 200, and the solenoid actuator 201 is de-energized to maintain the valve 17 at the half open position to prevent icing.

When the engine is started, the valve 17 must be closed. To achieve this, the vacuum chamber 172 is connected to the atmosphere, and the solenoid actuator 201 is energized to close the valve 17 as shown in FIG. 31B.

To change the valve 17 from the half open position to the full open position, the solenoid actuator 201 is de-energized, and the 3-way valve 200 is controlled to connect the vacuum chamber 172 to the vacuum tank 174. As a result, the valve 17 is changed to the full open position as shown in FIG. 31C. At this time, the solenoid actuator 201 is away from the connection rod 180.

Each of the driving apparatuses 16 shown in FIGS. 23 through 31 arranges the 3-way valves 200 and 175 between the first and second vacuum chambers 172 and 173 and the vacuum tank 174, to control a negative pressure or the atmosphere to be introduced into the vacuum chambers 172 and 173. Duty-controlled solenoid valves may be arranged between the vacuum chambers 172 end 173 and the vacuum tank 174, to control a negative pressure or the atmosphere introduced into the vacuum chambers 172 and 173. Controlling the duty factor of each of the solenoid valves may continuously control the opening of the air-flow control valve 17.

Next, a method of detecting the amount of air fed into the engine in the engine shown in FIG. 1 will be explained.

The engine shown in FIG. 1 is not provided with a vane type air-flow meter that is usually employed to detect the amount of air fed into the engine Q. This is to minimize an engine pumping loss. Instead of the vane type air-flow meter, the engine shown in FIG. 1 employs the pressure sensor 57 for detecting the negative pressure in the branch 10. According to the output of the pressure sensor 57, the amount of air Q is calculated.

The position where the pressure sensor 57 is installed will be explained with reference to FIG. 32.

FIG. 32 shows changes in the output of the pressure sensor 57 depending on installation positions. A line A indicates the output of the pressure sensor 57 arranged in the branch 10 downstream of the air-flow control valve 17. A line B indicates the output of the pressure sensor 57 arranged in the branch 10 between the valve 17 and the surge tank 11. A line C indicates the output of the pressure sensor 57 arranged in the surge tank 11. As the position of the pressure sensor 57 approaches the combustion chamber 4, the dynamic range of the pressure sensor 57 expands, and the response thereof during the acceleration or deceleration of the engine improves. It is preferable, therefore, to arrange the pressure sensor 57 to the branch 10 downstream of the surge tank 11, more preferably, downstream of the valve 17. Accordingly, the pressure sensor 57 shown in FIG. 1 is downstream of the valve 17.

When the pressure sensor 57 is arranged downstream of the air-flow control valve 17, the output P of the pressure sensor 57 greatly varies during an intake stroke of the engine. Generally, the pressure sensor 57 detects the negative pressure in the branch 10 at intervals of, for example, 1 ms through all strokes of the engine, averages the output P for, for example, every 10 ms, calculates a mean negative pressure PMAVE, and calculates the amount of air fed into the engine Q using PMAVE. If the output P is detected in every stroke of the engine as in the case shown in FIG. 1, i.e., if the output P detected during an intake stroke is also used to calculate PMAVE, it will greatly differ from a mean negative pressure calculated without the output during the intake stroke. This results in incorrectly calculating Q. To avoid this problem, in the embodiment shown in FIG. 1, the output P of the pressure sensor 57 measured during the intake stroke is excluded to calculate PMAVE, and using this PMAVE, Q is calculated. Namely, during the intake stroke, the output P of the pressure sensor 57 is substituted with that just before the intake stroke, and the mean negative pressure PMAVE is correctly calculated accordingly. Then, the amount of air Q is correctly calculated using PMAVE thus obtained.

Figure 33A:
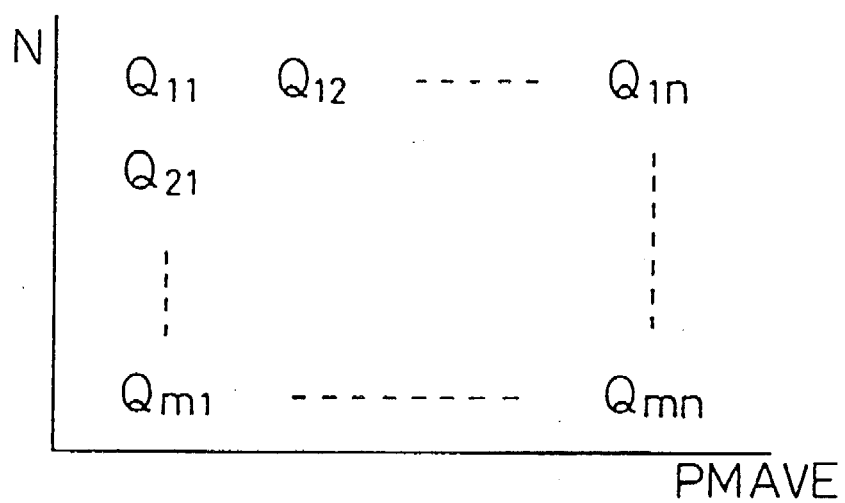
FIGS. 33A and 33B are diagrams illustrating an amount of air.
Figure 33B:
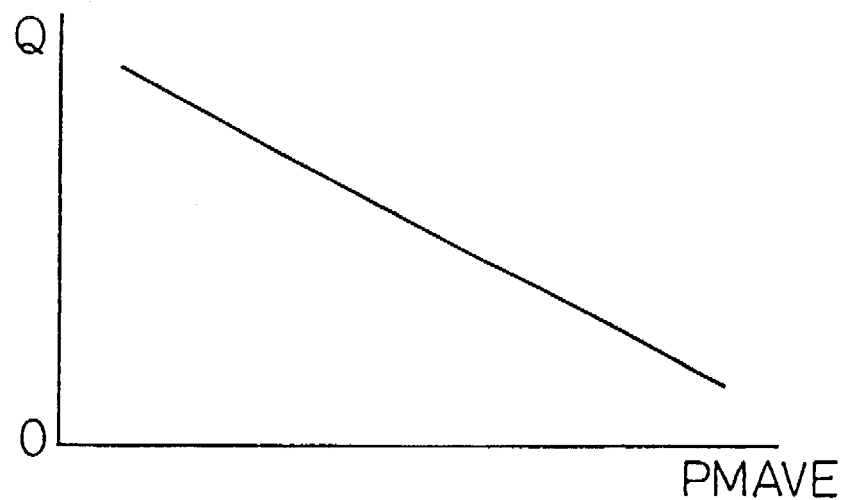

More precisely, the amount of air Q fed into the engine is found in a map shown in FIG. 33A using the mean negative pressure PMAVE and an engine speed N. The map shown in FIG. 33A is experimentally obtained in advance and is stored in the ROM 52. The map shown in FIG. 33A is prepared such that Q decreases as PMAVE increases, as shown in FIG. 33B. Alternatively, the pressure sensor 57 may be an absolute pressure sensor for detecting the absolute pressure in the branch 10. In this case, the map shown in FIG. 33A is prepared such that the amount of air Q increases as an average of the output of the absolute pressure sensor increases.

Figure 34:
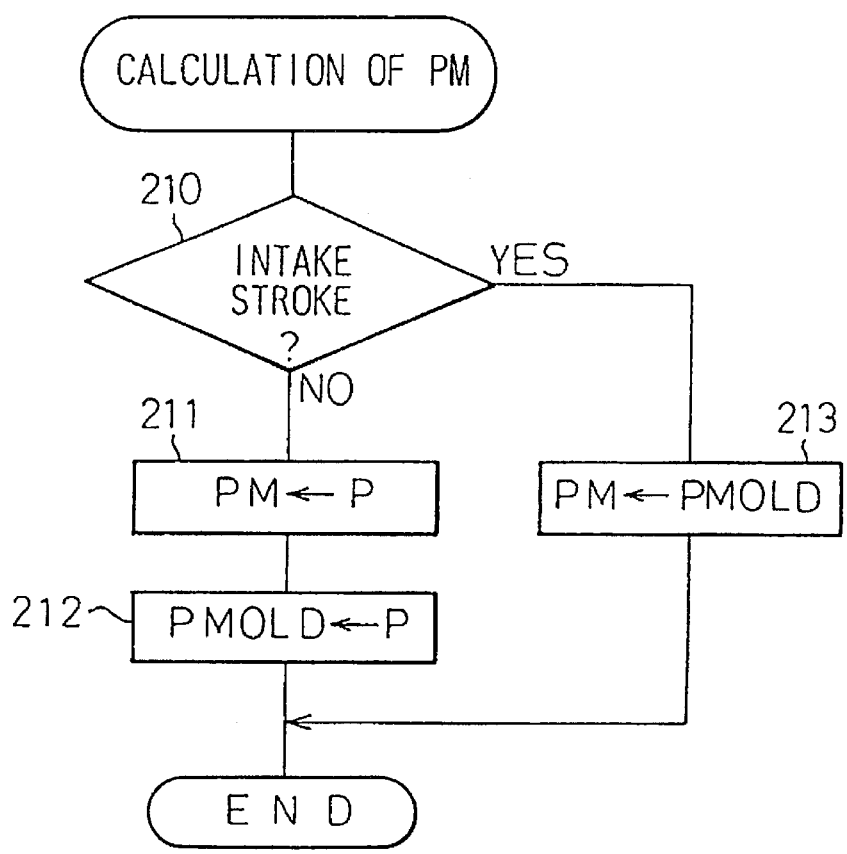
FIG. 34 is a flowchart for executing measurement of the output of the pressure sensor.

FIG. 34 shows a routine for executing reaching of the output of the pressure sensor 57. This routine is executed by interruption every predetermined time, such as 1 ms.

Referring to FIG. 34, at step 210, it is determined whether an intake stroke is in process. If an other stroke is in process, the routine goes to step 211 where the output P of the pressure sensor 57 is substituted for PM. The pressure PM is used to calculate a mean negative pressure PMAVE in the routine shown in FIG. 35. Next, the routine goes to step 212, where the output P of the pressure sensor 57 is substituted for PMOLD, and the processing cycle is ended.

If the intake stroke is in process, the routine goes from step 210 to step 213 where PMOLD is substituted for PM. This PMOLD is that obtained just before the intake stroke. Namely, PMOLD always substitutes for a PM during the intake stroke. Then, the processing cycle is ended.

Figure 35:
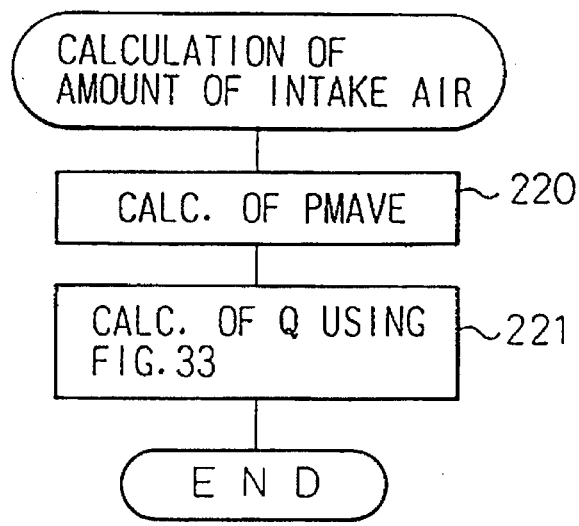
FIG. 35 is a flowchart for executing calculation of the amount of air.

FIG. 35 shows a routine for executing calculation of the amount of air Q fed into the engine. This routine is executed by interruption every predetermined time, such as 10 ms.

Referring to FIG. 35, at step 220, a mean negative pressure PMAVE is calculated using the negative value of each PM provided by the routine shown in FIG. 34. When the value of the PMAVE is large, the absolute pressure in the branch 10 is low. At the following step 221, the amount of air Q is calculated using the map shown in FIG. 33A based on PMAVE and an engine speed N, and the processing cycle is ended.

This embodiment of reading the output of the pressure sensor 57 mentioned above is also applicable when the pressure sensor 57 is attached to the branch 10 upstream of the air-flow control valve 17 (the curve B shown in FIG. 32).

Another embodiment of calculating the amount of air Q fed into the engine will be explained with reference to FIGS. 36 and 37A to 37C.

Figure 36:
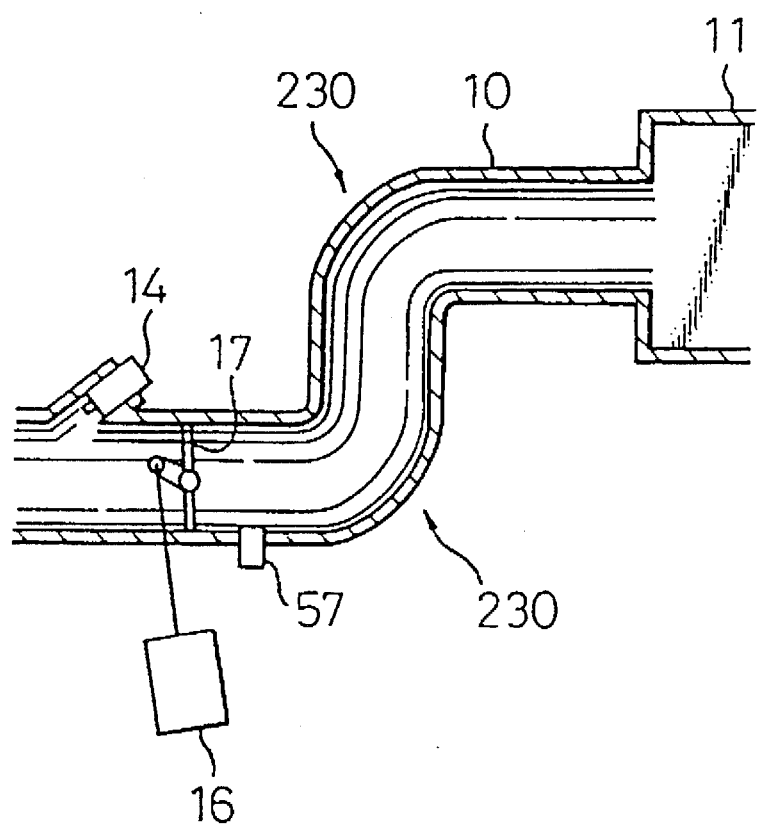
FIG. 36 shows a partial view of the engine illustrating another embodiment of arrangement of the pressure sensor.

In FIG. 36, the pressure sensor 57 is arranged in the branch 10 upstream of the air-flow control valve 17. The branch 10 has a pair of bent portions 230. The pressure sensor 57 is arranged the straight portion downstream of the bends 230. The bends 230 cause a pressure loss, so that the pressure sensor 57 is arranged on the straight portion downstream of the bent portions 230, to secure a dynamic range and correctly detect the negative pressure that is used to calculate Q.

Figure 37A:
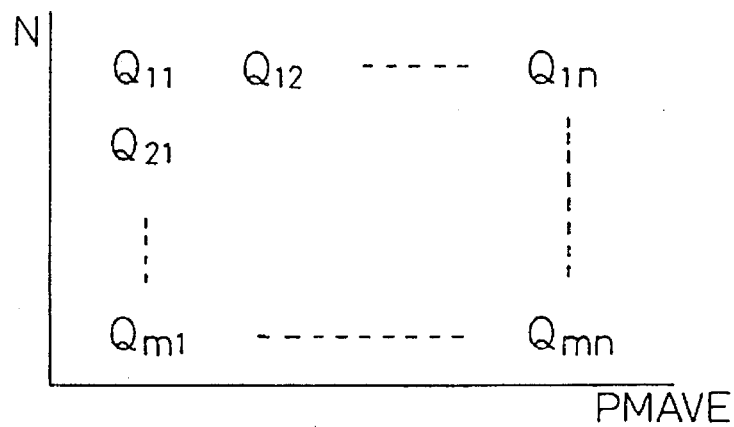
FIGS. 37A through 37C are diagrams illustrating the amount of air, according to the embodiment shown in FIG. 36.
Figure 37B:
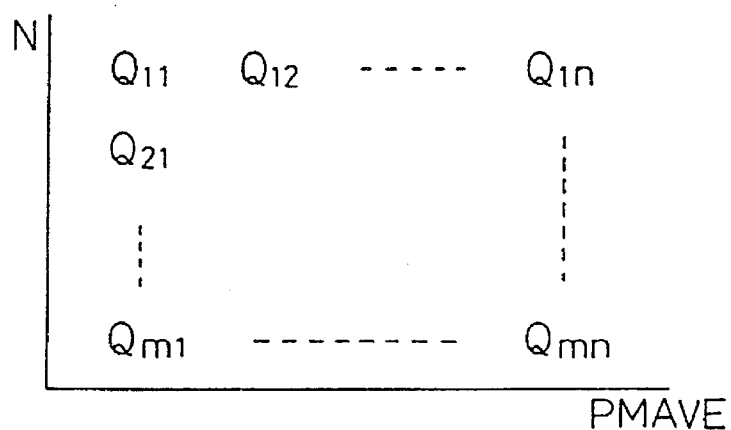
Figure 37C:
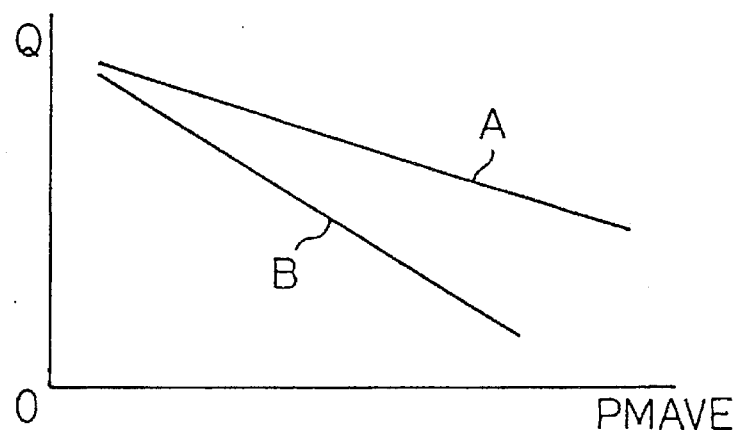

When the pressure sensor 57 is attached to the branch 10 upstream of the air-flow control valve 17, the output p of the pressure sensor 57 fluctuates only slightly even during an intake stroke as indicated with the curve B in FIG. 32. Accordingly, the output P of the pressure sensor 57 is read in every stroke. According to the output P of the pressure sensor 57, a mean negative pressure PMAVE is calculated, and Q is calculated, based on PMAVE and an engine speed N, using the map shown in FIG. 37A or 37B. When the pressure sensor 57 is upstream of the valve 17, the amount of air Q with the valve 17 being at the full open position is greater than that with the valve 17 being at the half open position even if the output P of the pressure sensor 57 is unchanged. Therefore, the map shown in FIG. 37A is used to calculate Q when the valve 17 is at the full open position, and the map of 37B is used when the valve 17 is at the half open position. The maps shown in FIGS. 37A and 37B are experimentally obtained in advance and are stored in the ROM 52. A curve A shown in FIG. 37C corresponds to the map shown in FIG. 37A, and a curve B thereof corresponds to the map shown in FIG. 37B. The maps shown in FIGS. 37A and 37B are prepared such that the amount of air Q decreases as PMAVE increases as shown in FIG. 37C. In addition, the amount of air Q fed into the engine with the valve 17 being at the full open position is larger than that with the valve 17 being at the half open position with respect to the same PMAVE. When the pressure sensor 57 is an absolute pressure sensor, the relationship between the mean pressure and the amount of air Q fed into the engine will be opposite to that shown in FIG. 37C.

Figure 38:
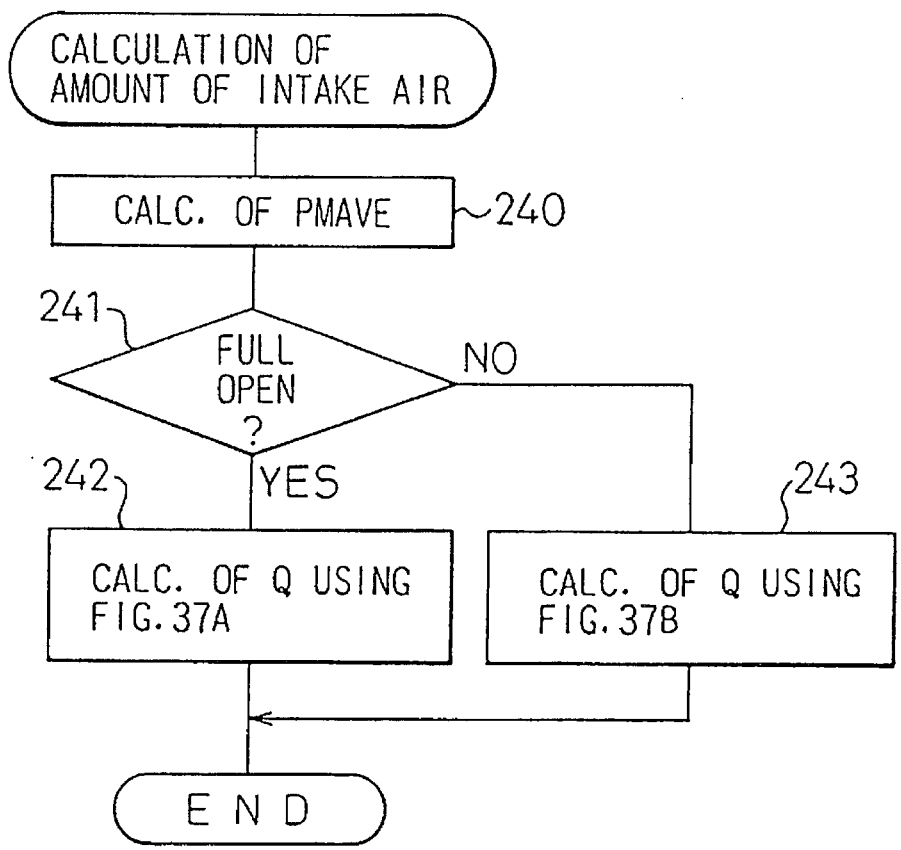
FIG. 38 is a flowchart for executing calculation of the amount of air, according to the embodiment shown in FIG. 36.

FIG. 38 shows a routine for calculating the amount of air Q fed into the engine as mentioned above. This routine is executed by interruption every predetermined time, such as 10 ms.

Referring to FIG. 38, at step 240, a mean negative pressure PMAVE is calculated using the output P of the pressure sensor 57. The output P of the pressure sensor 57 during an intake stroke is also used to calculate PMAVE. At the following step 241, it is determined whether the air-flow control valve 17 is at the full open position. If the valve 17 is at the full open position, the routine goes to step 242 where the amount of air Q fed into the engine is calculated using the map shown in FIG. 37A (corresponding to the curve A shown in FIG. 37C) based on PMAVE obtained in step 240 and an engine speed N, and the processing cycle is ended. If the valve 17 is at the half open position in step 241, the routine goes to step 243 where the amount of air Q is calculated using the map shown in FIG. 37B (corresponding to the curve B shown in FIG. 37C) based on PMAVE obtained in step 240 and the engine speed N, and the processing cycle is ended.

Another embodiment of calculation of the amount of air Q fed into the engine will be explained with reference to FIG. 39. In this embodiment, the pressure sensor 57 is arranged in the branch 10 upstream of the air-flow control valve 17.

While the embodiment shown in FIGS. 36 and 37A to 37C employs two maps for calculating the amount of air Q, that is, the map shown in FIG. 37A for the valve 17 being at the full open position, and the map shown in FIG. 37B for the valve 17 being at the half open position. The embodiment shown in FIG. 39 employs only the map for calculating the amount of air Q for the valve 17 being at the full open position.

As explained above, the amount of air Q fed into the engine when the valve 17 is at the half open position is smaller than that when the valve 17 is at the full open position with respect to the same mean negative pressure PMAVE. The ratio of amount of air Q with the valve 17 being at the half open position to that with the valve 17 being at the full open position is substantially constant. Accordingly, when the valve 17 is at the half open position, the mean negative pressure PMAVE is multiplied by a conversion coefficient KK (>1) to provide PMAVE-KK. According to the PMAVE.KK, the map shown in FIG. 37A is referred to, to find the amount of air Q when the valve 17 is at the half open position. In this way, only the one map shown in FIG. 37A is sufficient to calculate the amount of air Q. When the valve 17 is at the full open position, Q is found in the map shown in FIG. 37A using PMAVE. When the valve 17 is at the half open position, Q is found in the map shown in FIG. 37A using PMAVE.KK. This results in reducing the numbers of maps stored in the ROM 52.

Figure 39:
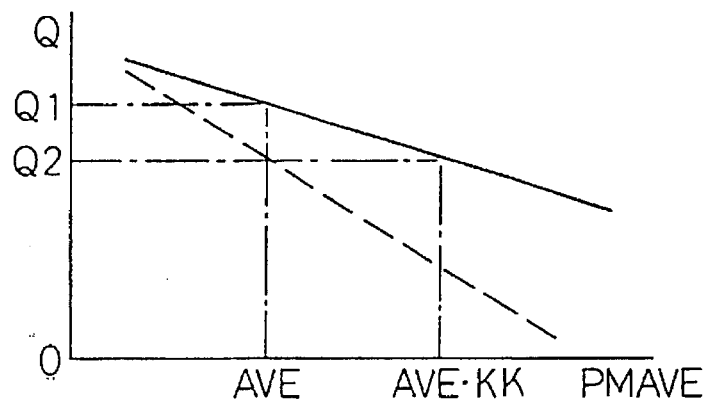
FIG. 39 is a diagram illustrating another embodiment of calculation of the amount of air.

Referring to FIG. 39, when the mean negative pressure PMAVE calculated according to the output P of the pressure sensor 57 is AVE, the amount of air Q fed into the engine is found using a continuous line in FIG. 39 is the valve 17 is at the full open position, and thus, Q is Q1. If the valve 17 is at the half open position, AVE-KK is used to find Q on the continuous line shown in FIG. 39, and thus, Q is Q2.

Figure 40:
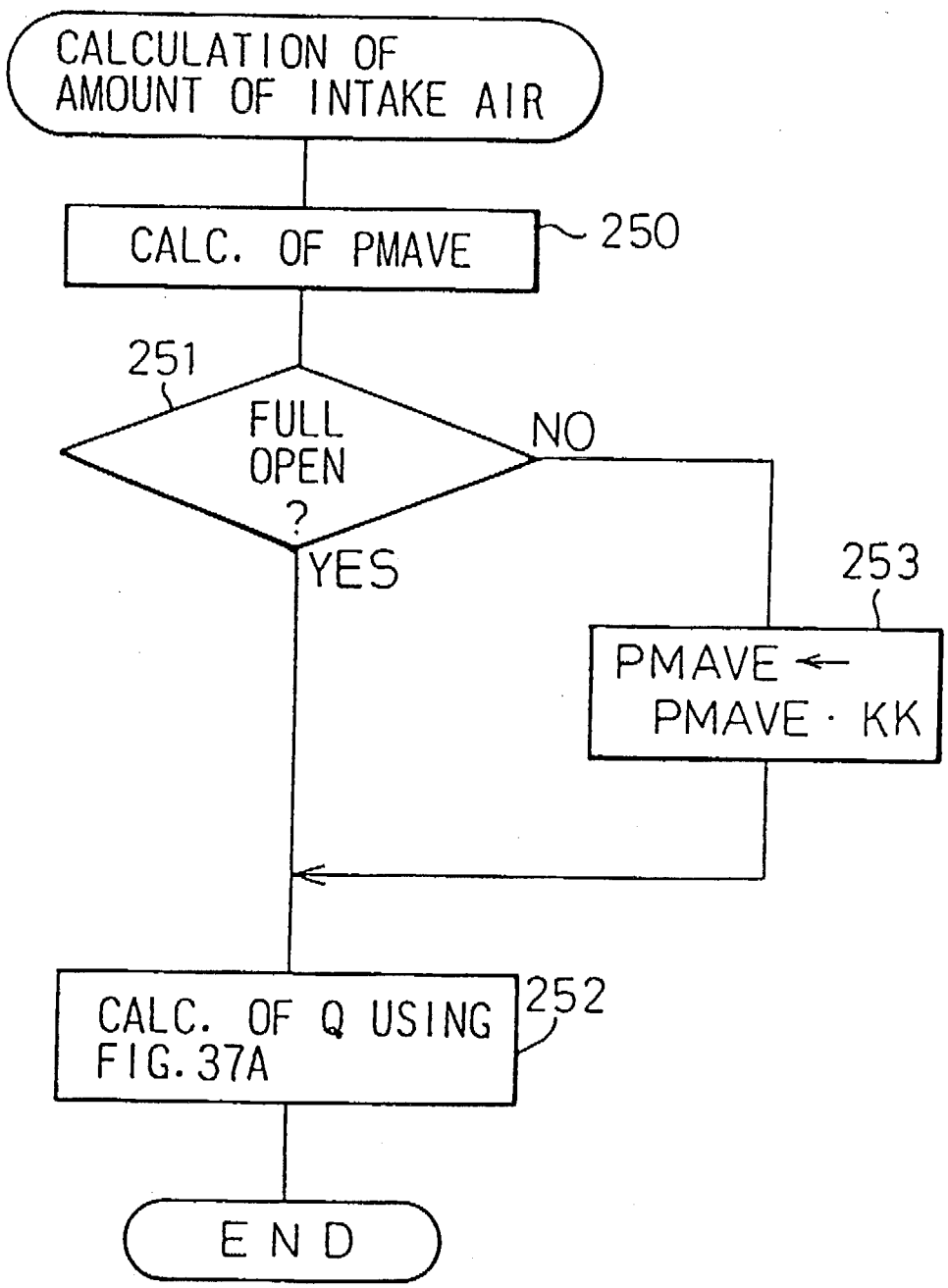
FIG. 40 is a flowchart for executing calculation of the amount of air, according to the embodiment shown in FIG. 39.

FIG. 40 shows a routine for calculating the amount of air Q fed into the engine mentioned above. This routine is executed by interruption every predetermined time, such as 10 ms.

Referring to FIG. 40, at step 250, a mean negative pressure PMAVE is calculated using the output P of the pressure sensor 57. At following step 251, it is determined whether the air-flow control valve 17 is at the full open position. If the valve 17 is at the full open position, the routine goes to step 252 where the amount of air Q is calculated using the map shown in FIG. 37A (corresponding to the curve A shown in FIG. 37C) based on PMAVE obtained in step 250 and an engine speed N, and the processing cycle is ended. If the valve 17 is at the half open position in step 251, the routine goes to step 253 where PMAVE is multiplied by the coefficient KK. Then, the routine goes to step 252 where Q is calculated using the map shown in FIG. 37A (corresponding to the curve A shown in FIG. 37C) based on the corrected PMAVE and the engine speed N, and the processing cycle is ended.

It is possible to employ the map only for providing the amount of air Q fed into the engine with the valve 17 being at the half open position. In this case, if the valve 17 is at the full open position, a mean negative pressure is multiplied by a conversion coefficient, and the map is referred to accordingly, to find the amount of air Q fed into the engine with the valve 17 being at the full open position.

As explained above, the output of the pressure sensor 57 is read as PM, the PM is averaged to provide a mean negative pressure PMAVE. According to the PMAVE, the amount of air Q fed into the engine is calculated. Instead, the output of the pressure sensor 57 may be read as PM, which is used to calculate the amount of air fed into the engine, and the amounts of air fed into the engine are averaged to calculate the amount of air Q fed into the engine.

Next, a method of controlling the ignition timing of the engine shown in FIG. 1 will be explained with reference to FIGS. 41 to 43.

The ignition timing θ is calculated as follows:

$$\theta = \theta B - \theta C + \theta K$$

where the θB is a basic ignition advance that agrees with an MBT, the θC is a warming-up retardance for retarding the ignition timing θ when the engine is warmed up, the θC being zero after the warming-up of the engine is completed, and the θK is a representative of a correction advance and retardance such as a high-temperature correction advance and knocking correction retardance. If no correction is required, θK=0.

Figure 6:
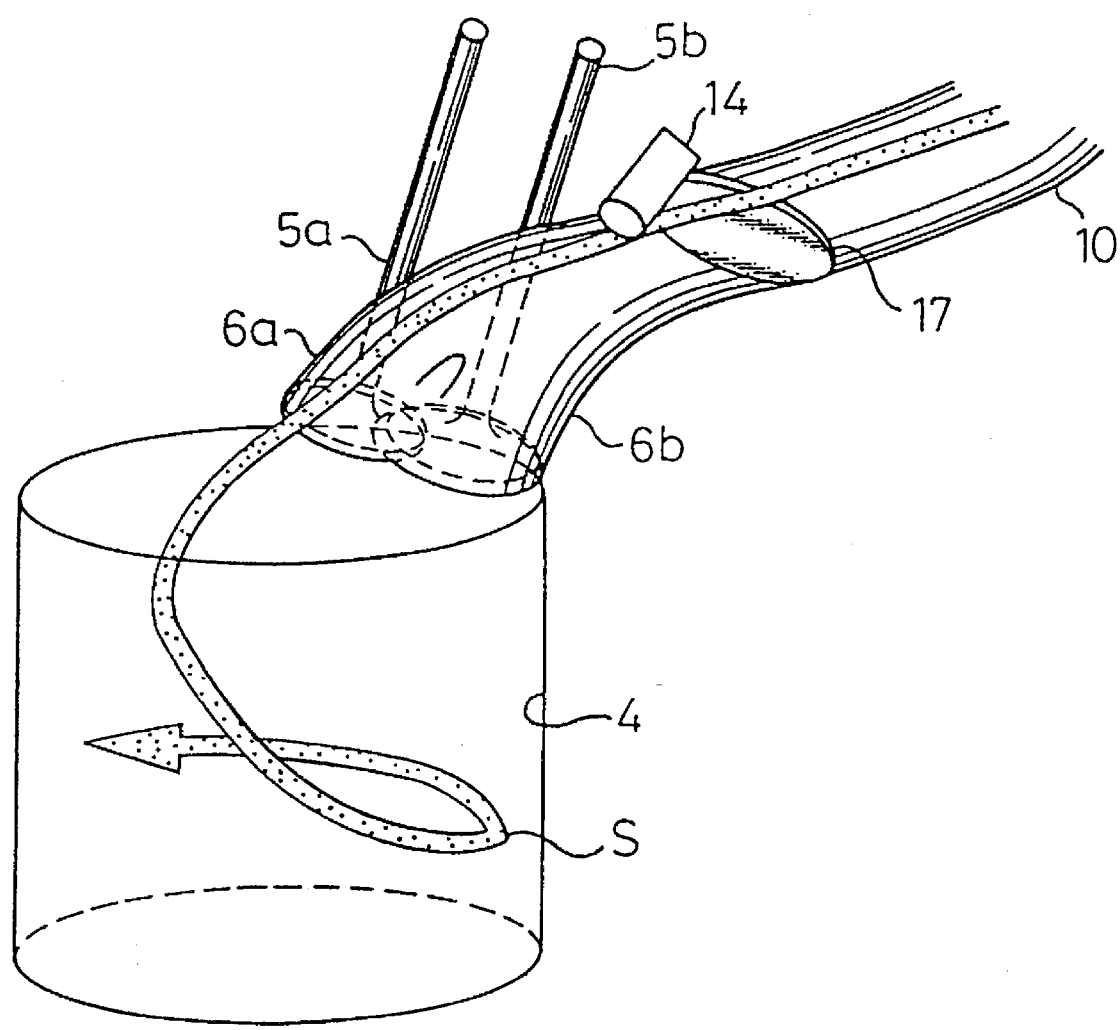
FIG. 6 is a perspective view illustrating the engine.
Figure 41:
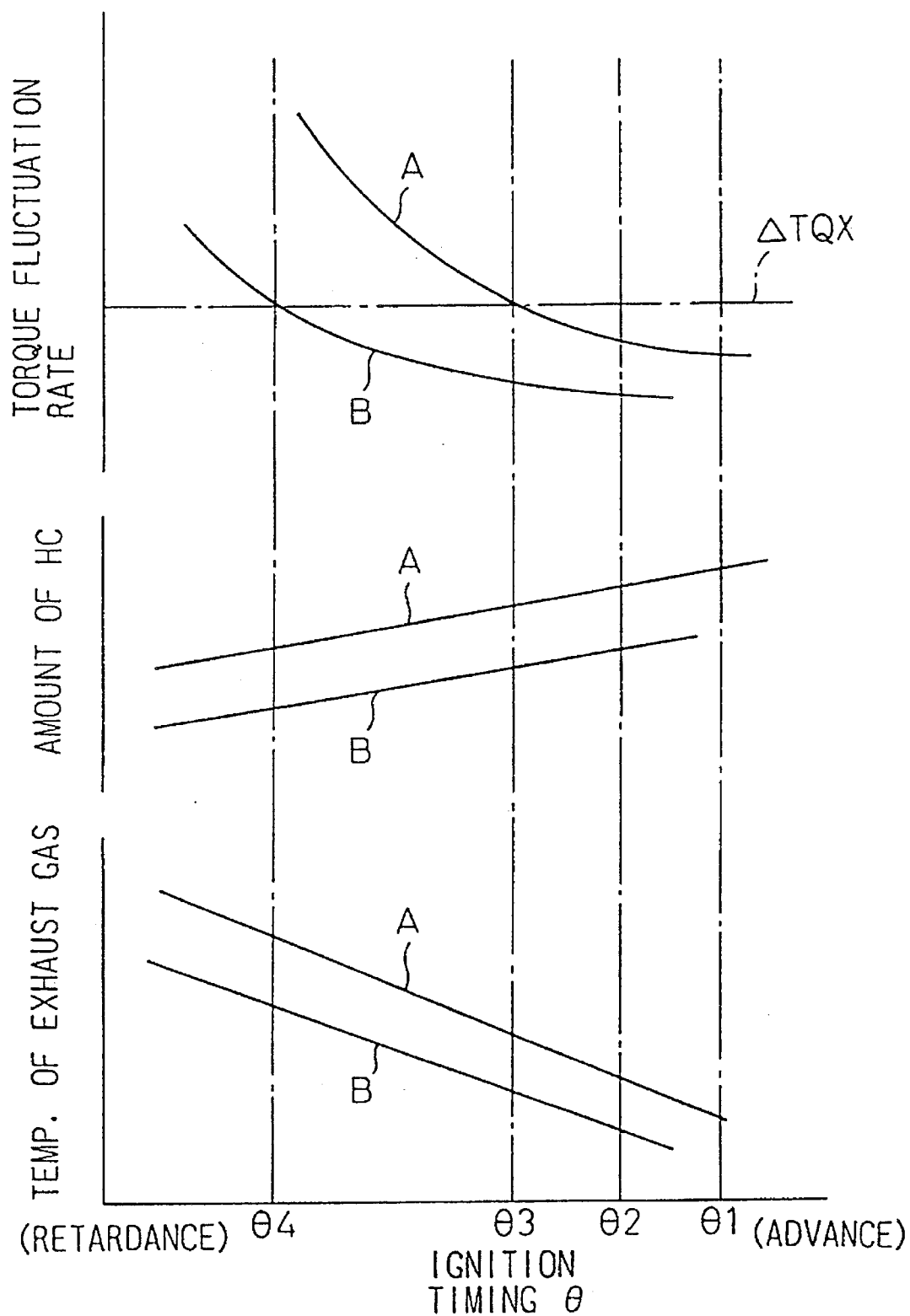
FIG. 41 is a diagram illustrating changes in a torque fluctuation rate, the amount of unburned HC, and the temperature of an exhaust gas with respect to a change in ignition timing.
Figure 42A:
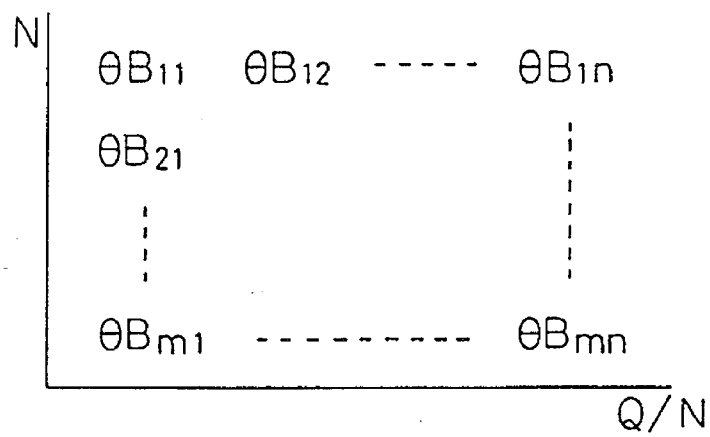
FIGS. 42A through 42C are diagrams illustrating a basic ignition advance.
Figure 42B:
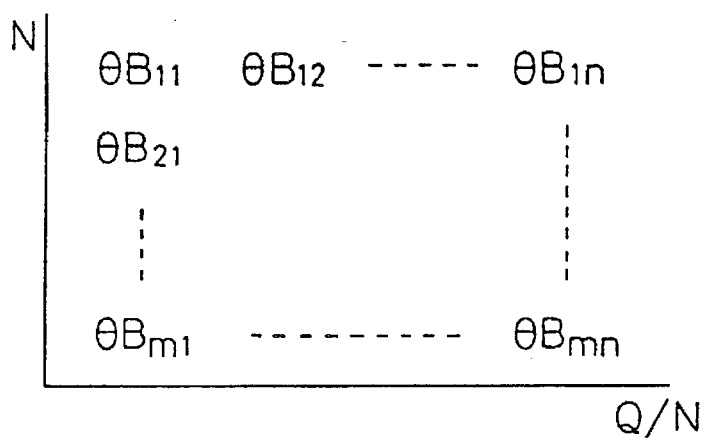

FIG. 41 is a graph showing test results of changes in an output torque fluctuation rate, the amount of unburned HC in the exhaust gas, and the temperature of an exhaust gas with respect to a change in ignition timing. Curves A are obtained when the air-flow control valve 17 is at the full open position, and curves B are obtained when the valve 17 is at the half open position. When the valve 17 is at the half open position, the basic ignition advance θB is θ2, and when the valve 17 is at the full open position, the basic ignition advance θB is θ1, where θ2 is retarded from θ1. When the valve 17 is at the half open position, an air flow is deflected by the valve 17 and hits injected fuel, to atomize the injected fuel as shown in FIG. 5. At the same timer a swirl S is formed in the combustion chamber 4 as shown in FIG. 6. As a result, the combustion speed of an air-fuel mixture in the combustion chamber 4 with the valve 17 being at the half open position is faster than that with the valve 17 being at the full open position. Namely, the combustion of an air-fuel mixture is stable when the valve 17 is at the half open position. This is the reason why 82 is retarded from 81. FIG. 42A shows a map used to calculate the basic ignition advance θB when the valve 17 is at the full open position. FIG. 42B shows a map used to calculate the basic ignition advance θB when the valve 17 is at the half open position. These maps are stored in advance in the ROM 52.

Figure 42C:
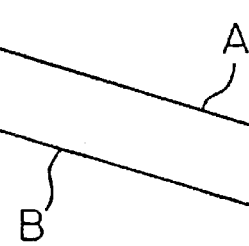

As shown in FIGS. 42A and 42B, the basic ignition advance θB is calculated based on an engine load Q/N and an engine speed N. As shown in FIG. 42C, θB becomes larger as the engine load Q/N becomes smaller. The θB with the valve 17 being at the full open position (a line A shown in FIG. 42C) is on the advance side of the basic ignition advance θB with the valve 17 being at the half open position (a line B shown in FIG. 42C). In this embodiment, an optimum ignition timing is calculated according to the position of the valve 17, to stabilize the torque of the engine under any operating condition and reduce the amount of unburned HC. During the engine starting operation, the ignition timing θ is fixed at a predetermined value.

While the engine is being warmed up, the temperature of engine cooling water detected by the temperature sensor 63 is below, for example, 80 degrees centigrade. During the warming-up period, it is preferable to increase the temperature of an exhaust gas as quickly as possible, so that the catalytic converter is quickly heated to an activation temperature. To increase the temperature of the exhaust gas, it is necessary to retard the ignition timing θ as shown in FIG. 41. If the ignition timing θ is retarded, however, the torque fluctuation rate increases, This is unpreferable. To solve this problem, in this embodiment, the ignition timing θ is retarded while keeping the torque fluctuation rate below an upper allowance ΔTQX. Namely, when the valve 17 is at the full open position, θ is retarded from θ1, which is the MBT, to θ3. This results in suppressing a fluctuation in the torque, while increasing the temperature of an exhaust gas and quickly heating the catalytic converter to the activation temperature. As shown in FIG. 41, retarding the ignition timing θ reduces the amount of unburned HC. In this case, the warming-up correction retardance θC is θ1–θ3.

When the valve 17 is at the half open position, the combustion of the air-fuel mixture is stable as mentioned above. Accordingly, the torque fluctuation ratio will not be so large even if the ignition thing θ is retarded, compared with the case of the valve 17 being at the full open position. When the valve 17 is at the half open position, the ignition timing θ is retarded from θ2 to θ4 that is further retarded from θ3. This results in further increasing the temperature of an exhaust gas, more quickly heating the catalytic converter to the activation temperature, and further reducing the amount of unburned HC while suppressing in a fluctuation in the torque- In this case, the warming-up correction retardance θC is θ2–θ4, which is larger than θ1–θ3 with the valve 17 being at the full open position.

Figure 43:
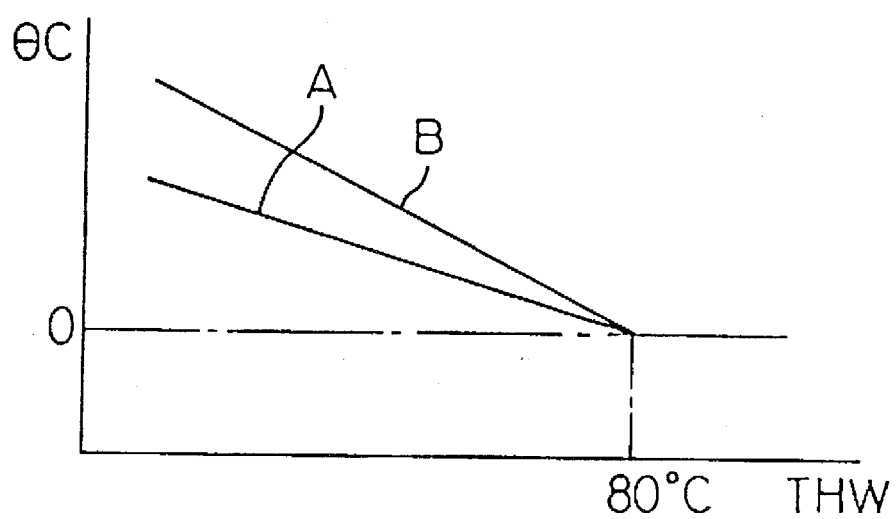
FIG. 43 is a diagram illustrating a warming-up correction retardance.

The warming-up correction retardance θC is stored in the ROM 52 as the map shown in FIG. 43, in advance. In FIG. 43, a curve A represents the air-flow control valve 17 being at the full open position, and a curve B represents the valve 17 being at the half open position. The warming-up correction retardance θC becomes smaller as the temperature THW of the engine tooling water increases. If THW≧80 degrees centigrade, then θC=0. The warming-up correction retardante θC with the valve 17 being at the half open position is larger than that with the valve 17 being at the full open position.

Figure 44:
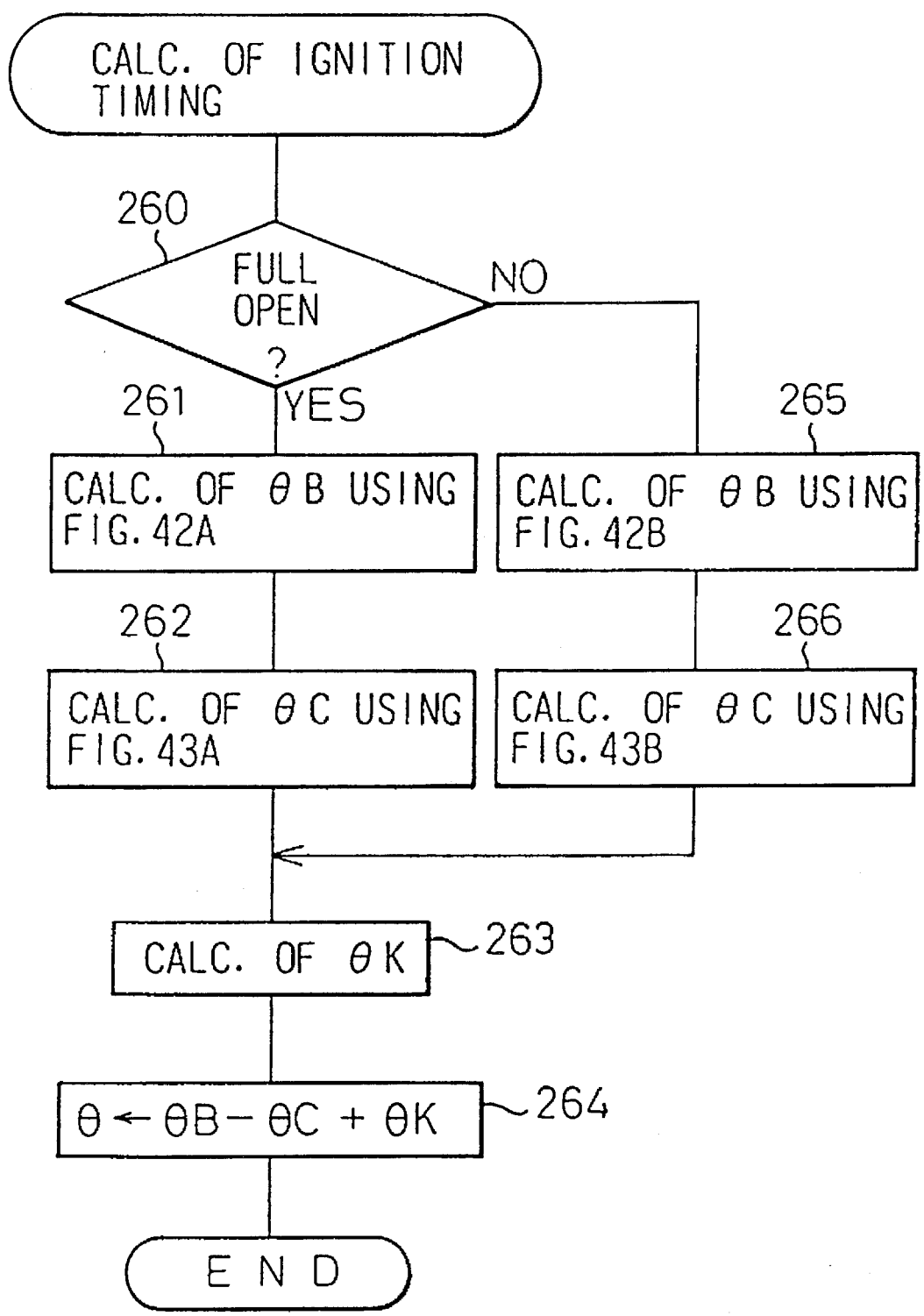
FIG. 44 is a flowchart for executing calculation of ignition timing.

FIG. 44 shows a routine for calculating the ignition timing θ. This routine is executed by interruption every predetermined crank angle.

Referring to FIG. 44, at step 260, it is determined whether the air-flow control valve 17 is at the full open position. If the valve 17 is at the full open position, the routine goes to step 261 where a basic ignition advance θB is calculated using the map shown in FIG. 42A based on an engine load Q/N and engine speed N. At following step 262, a warming-up correction retardance θC is calculated using the line A shown in FIG. 43 according to the temperature THW of engine cooling water. At following step 263, is calculated. Then, the routine goes to step 264 where the ignition timing θ is calculated as follows:

$$\theta = \theta B - \theta C + \theta K$$

Then, the processing cycle is ended.

If the valve 17 is at the half open position in step 260, the routine goes to step 255, where a basic ignition advance θB is calculated using the map shown in FIG. 42B according to the engine load Q/N and engine speed N. At following step 266, a warming-up correction retardance θC is calculated using the line B shown in FIG. 43 according to the cooling water temperature THW. At following step 263, θK is calculated. Then, the routine goes to step 264, where the ignition timing θ is calculated, and the processing cycle is ended.

Next, a method of controlling the fuel injection timing of the engine shown in FIG. 1 will be explained.

As explained above, the synchronous fuel injection is basically carried out when the air-flow control valve 17 is at the half open position, and the asynchronous fuel injection is basically carried out when the valve 17 is at the full open position. During the synchronous fuel injection, an air flow positively hits injected fuel to thereby atomize the injected fuel. In this case, the fuel directly flows into the combustion chamber 4, so that the amount of fuel that attaches to the walls of the intake ports 5a and 6b is small. Accordingly, a proper amount of fuel is supplied into the combustion chamber 4, When the valve 17 is at the half open position, an air-fuel mixture formed in the combustion chamber 4 forms a swirl S to equalize the mixture. Consequently, proper combustion is secured when the valve 17 is at the half open position.

If the asynchronous fuel injection is carried out with the valve 17 being at the full open position, injected fuel hits the walls of the intake ports 6a and 6b as well as the backs of the heads of the intake valves 5a and 5b and is properly atomized, to secure good combustion.

A method of controlling the fuel injection timing when the engine is accelerated to change the air-flow control valve 17 from the half open position to the full open position will be explained with reference to FIGS. 45A and 45B.

Figure 45A:
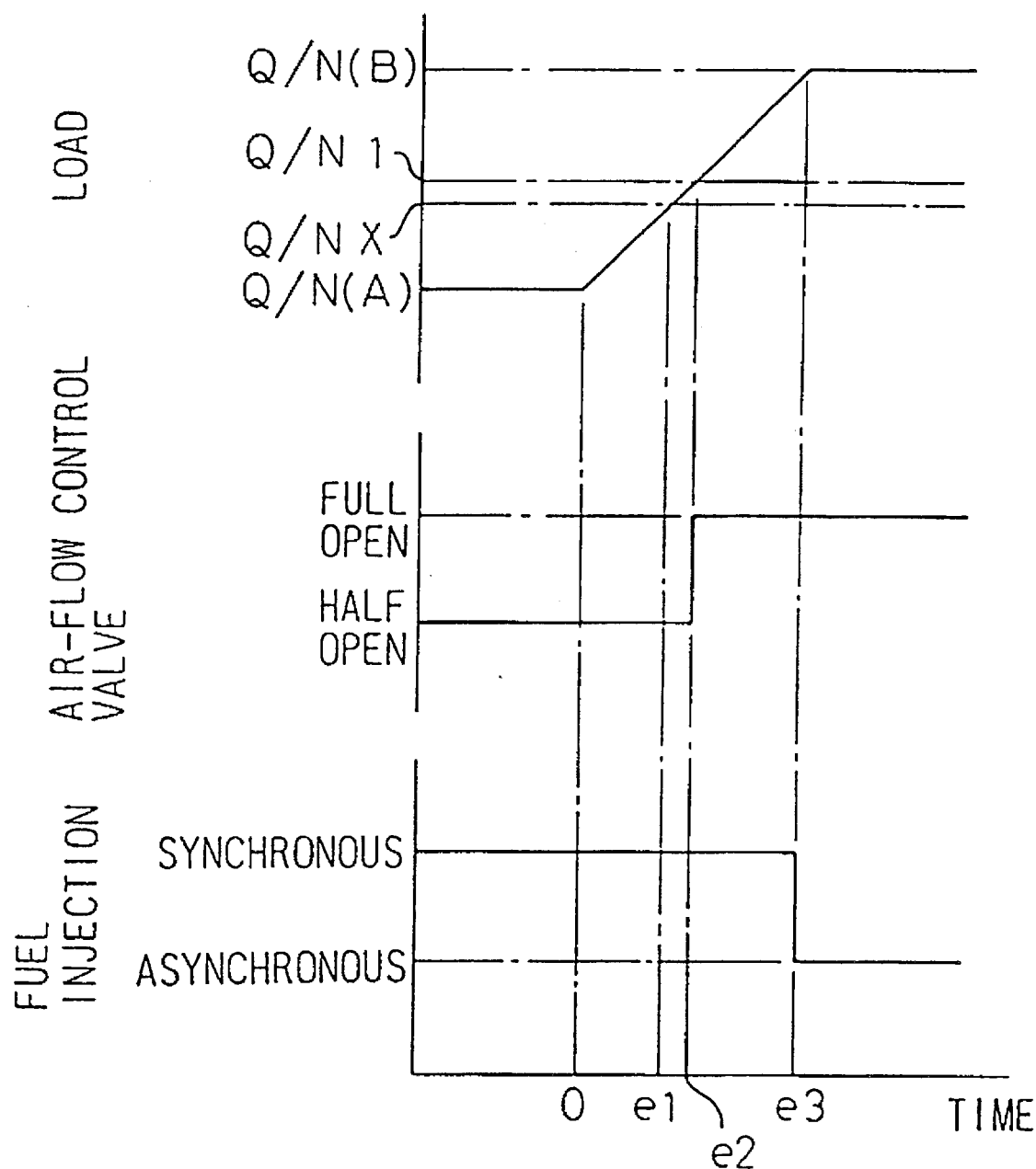
FIG. 45A is a time chart illustrating a fuel injection type when the engine is rapidly accelerated.

FIG. 45A is a time chart of when the engine is rapidly accelerated to change the engine operating condition from A to B, as shown in FIG. 9, and the valve 17 from the half open position to the full open position. The engine is accelerated at time zero. At this time, an engine load Q/N is below the first reference load Q/N1. Accordingly, the valve 17 is kept at the half open position, and the synchronous fuel injection is carried out. At time e1, the engine load Q/N exceeds an upper threshold Q/NX. The upper threshold Q/NX is slightly below the reference load Q/N1. After the engine load Q/N exceeds the upper threshold Q/NX, it will exceed the reference load Q/N1. When the engine load Q/N exceeds the upper threshold Q/NX, it is determined whether the engine is rapidly accelerated. At time e2, the engine load Q/N exceeds the reference load Q/N1. At this time, the valve 17 is changed from the half open position to the full open position.

When the engine is rapidly accelerated, the synchronous fuel injection is continued even at the time e2 when the valve 17 is changed from the half open position to the full open position. If the asynchronous fuel injection is carried out at this point, the negative pressure in the intake ports 6a and 6b suddenly weakens, to allow injected fuel to become attached to the walls of the intake ports 6a and 6b. This results in temporarily making the air-fuel ratio too lean. To avoid this problem, the present invention continues the synchronous injection even after the valve 17 is changed from the half open position to the full open position, if the engine is rapidly accelerated. This results in directly C supplying injected fuel into the combustion chamber 4 without the fuel being attached to the walls of the intake ports 6a and 6b. As a result, a proper amount of fuel is supplied into the combustion chamber 4, and the air-fuel ratio will never be lean during the rapid acceleration of the engine.

While the engine is being accelerated after the valve 17 is changed to the full open position, the synchronous fuel injection is continued. At time e3, the acceleration ends and the asynchronous fuel injection is started.

Figure 45B:
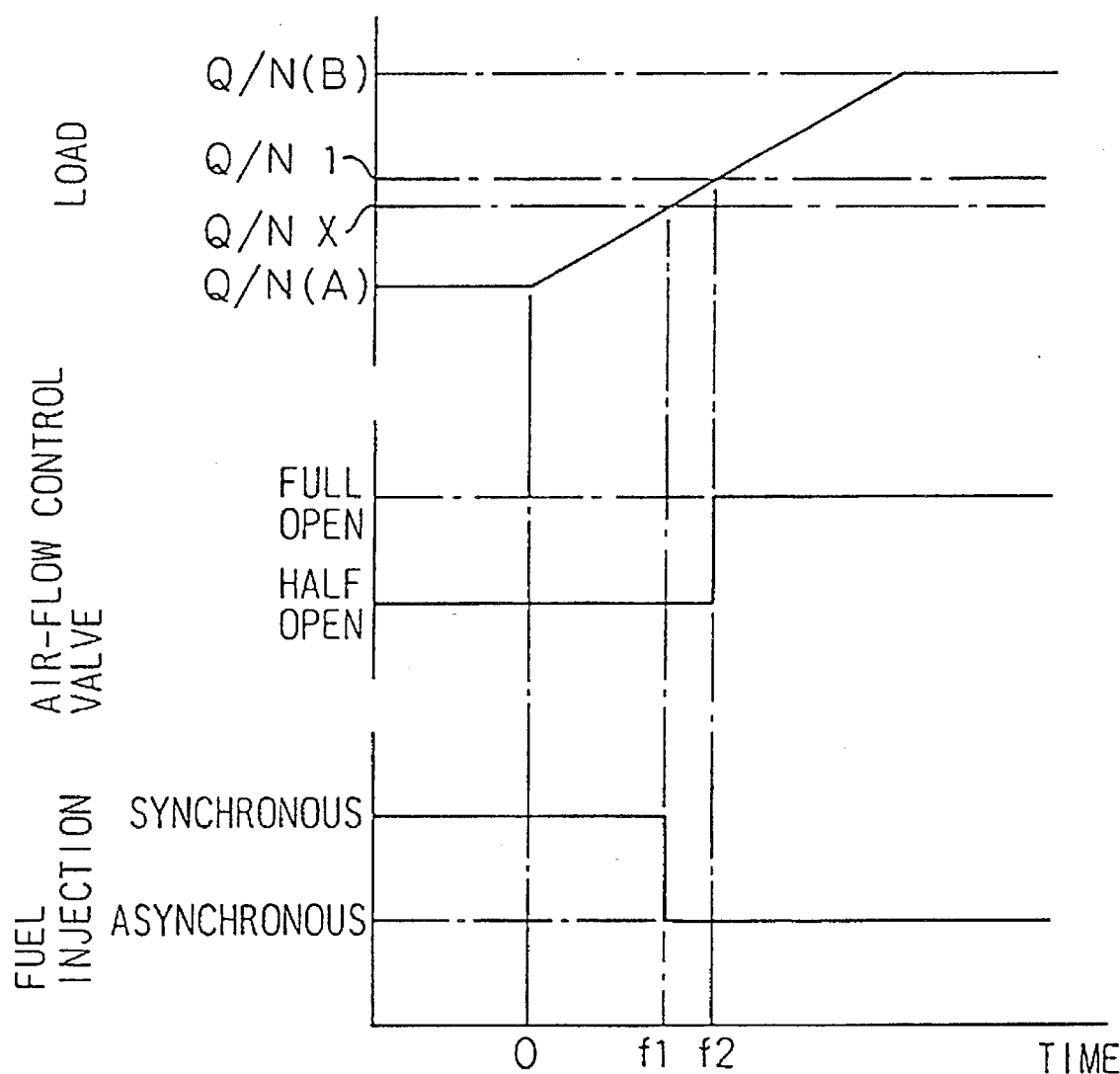
FIG. 45B is a time chart illustrating a fuel injection type when the engine is slowly accelerated.

FIG. 45B is a time chart when the engine is slowly accelerated with a small change in the engine load Q/N. The acceleration starts at time zero. At this time, the engine load Q/N is below the reference load Q/N1, so that the air-flow control valve 17 is kept at the half open position, end the synchronous fuel injection is carried out. At time f1, the engine load Q/N exceeds the upper threshold Q/NX. At this time, it is determined whether the engine is rapidly accelerated. If the engine is slowly accelerated, the asynchronous fuel injection is started at the time f1 with the valve 17 being at the half open position.

When the engine is steadily driven with the synchronous fuel injection being carried out, injected fuel hits the walls of the intake ports 6a and 6b and the heads of the intake valves 5a and 5b and adheres thereto. The fuel is then removed from the walls of the intake ports 6a and 6b by a backwardly flowing gas or air drawn into the combustion chamber 4 and enters the combustion chamber 4. Just after the start of the asynchronous fuel injection, the amount of fuel adhering to the walls of the intake ports 6a and 6b is small, so that the air-fuel ratio may momentarily be too lean. To avoid this problem, the asynchronous fuel injection is started before the valve 17 is changed from the half open position to the full open position as shown in FIG. 46. This results in increasing the amount of fuel adhering to the walls of the intake ports 6a and 6b. At this time, the valve 17 is at the half open position, so that the negative pressure in the intake ports 6a and 6b is relatively large. This negative pressure properly removes the fuel from the walls of the intake ports 6a and 6b. At time f2, the engine load Q/N exceeds the first reference load Q/N1, and the valve 17 is changed from the half open position to the full open position. Consequently, the amount of fuel adhering to the walls of the intake ports 6a and 6b is stabilized during the acceleration of the engine.

Figure 47:
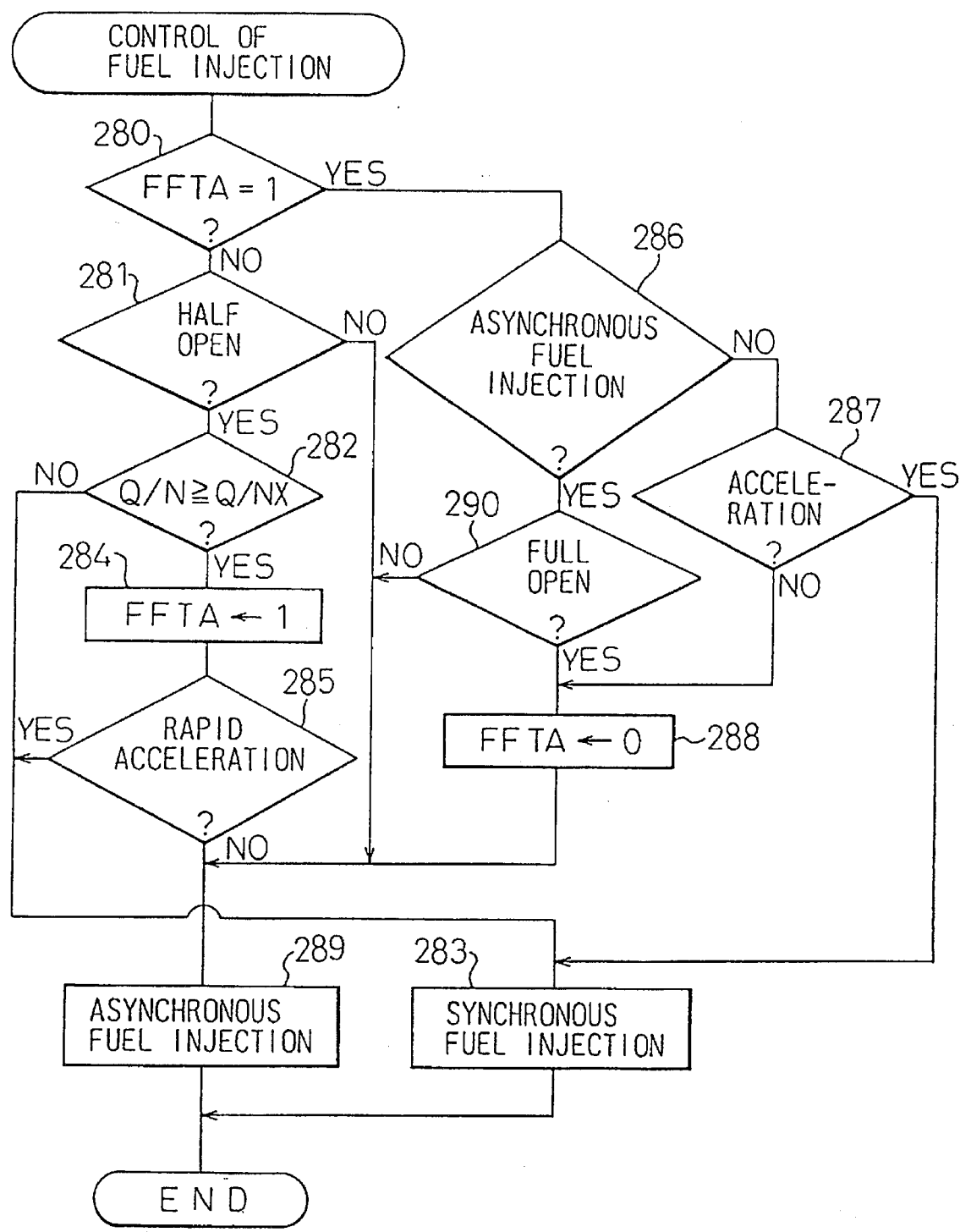
FIG. 47 is a flowchart for executing control of fuel injection.

FIG. 47 is a routine for executing control of the timing of fuel injection mentioned above. This routine is executed by interruption every predetermined time.

Referring to FIG. 47, at step 280, it is determined whether an injection timing control flag FFTA is set. This flag is set when asynchronous fuel injection is to be carried out with the air-flow control valve 17 being at the half open position, or when synchronous fuel injection is to be carried out with the valve 17 being at the full open position. If FFTA is reset, i.e., FFTA=0, the routine goes to step 281 where it is determined whether the valve 17 is at the half open position. If it is at the half open position, the routine goes to step 282 where it is determined whether an engine load Q/N is above an upper threshold Q/NX that is determined according to an engine operating condition. If Q/N<Q/NX, the routine goes to step 283 where the synchronous fuel injection is carried out, and the processing cycle is ended. If Q/N≧Q/NX, the routine goes to step 284 where FFTA is set, i.e., FFTA=1 and, at the following step 285, it is determined whether the engine is being rapidly accelerated. If the engine is being rapidly accelerated, the routine goes to step 283 where synchronous fuel injection is carried out, and the processing cycle is ended.

In the next processing cycle, since FFTA=1, the routine goes from step 280 to step 286, where it is determined whether asynchronous fuel injection is being carried out. Since rapid acceleration involves synchronous fuel injection, the routine goes to step 287 where it is determined whether the engine is continuously accelerated. If it is accelerated, the routine goes to step 283 where synchronous fuel injection is continuously carried out, and the processing cycle is ended. If the acceleration has been terminated, the routine goes to step 288 where the flag FFTA is reset, that is FFTA=0 and, at following step 289, asynchronous fuel injection is carried out. Then, the processing cycle is ended.

In the next processing cycle, if FFTA=0, the routine goes from step 280 to step 281. Since the valve 17 is at the full open position at this time, the routine goes from step 281 to the step 289, where asynchronous fuel injection is carried out. Then, the processing cycle is ended.

If the engine is slowly accelerated in step 285, the routine goes to step 289 where the asynchronous fuel injection is carried out, and the processing cycle is ended.

In the next cycle, since FFTA=1, the routine goes from step 280 to the step 285. Since asynchronous fuel injection is carried out at this time, the routine goes from step 286 to step 290, where it is determined whether the valve 17 is at the full open position. If it is still at the half open position, the routine goes to step 289 where asynchronous fuel injection is carried out, and the processing cycle is ended. If the valve 17 is at the full open position in step 290, the routine goes to step 288 where the flag FFTA is reset and, at the following step 289, asynchronous fuel injection is carried out. Then, the processing cycle is ended.

A method of controlling fuel injection timing when the engine is decelerated to change the air-flow control valve 17 from the full open position to the half open position will be explained with reference to FIGS. 46A and 46B.

Figure 46A:
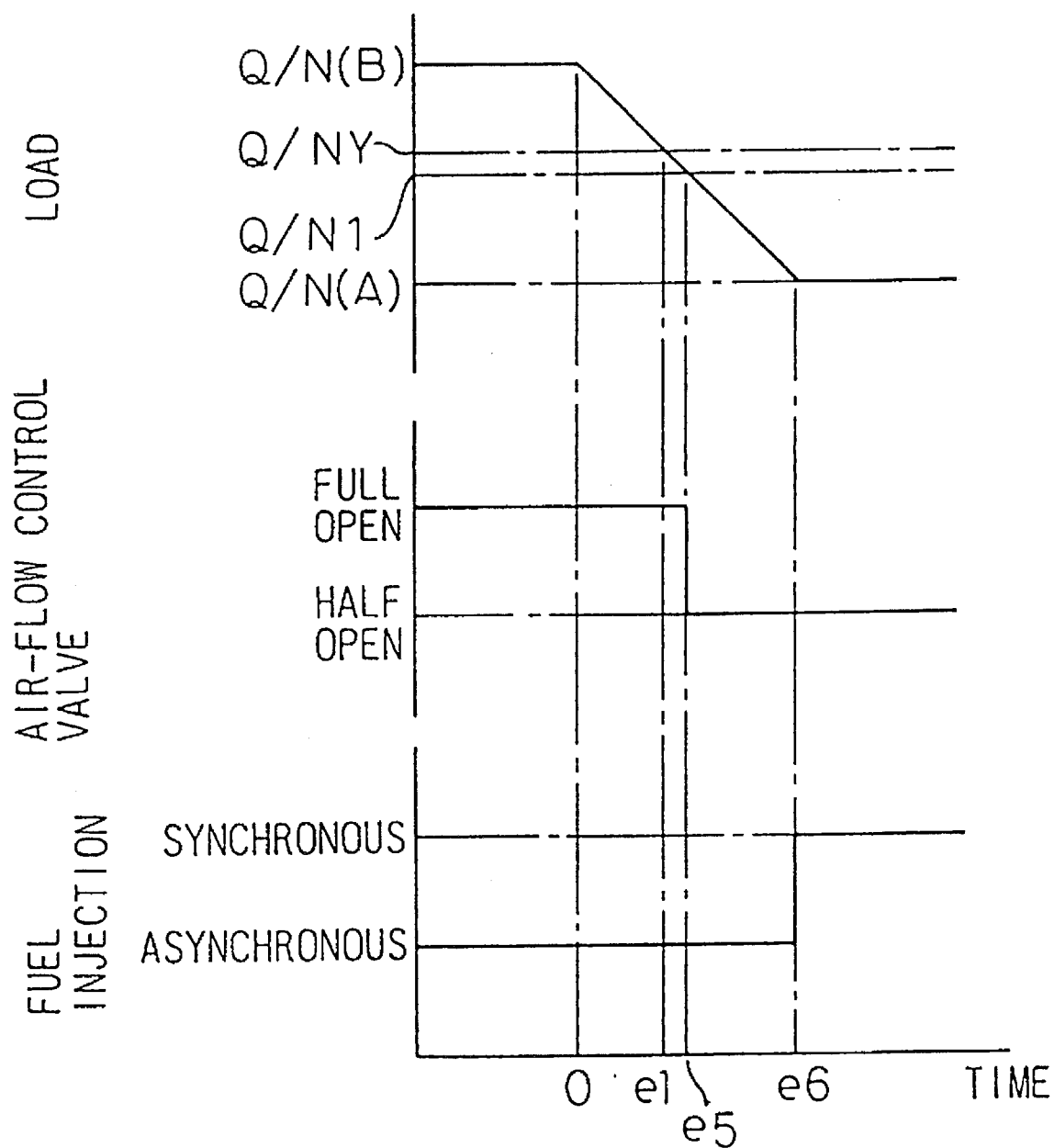
FIG. 46A is a time chart illustrating a fuel injection type when the engine is rapidly decelerated.

FIG. 46A is a time chart when the engine is rapidly decelerated to change the engine operating condition from B to A shown in FIG. 9 and the valve 17 from the full open position to the half open position. The engine operating condition changes at time zero. And, at time e4, the engine load decreases below a lower threshold Q/NY. This lower threshold Q/NY is set to be slightly higher than the first reference load Q/N1. The lower threshold Q/NY is determined according to an engine operating condition. After the engine load Q/N decreases below the lower threshold Q/NY, it may further decrease below the first reference load Q/N1. At time e4, it is determined whether the engine is being rapidly decelerated. At time e5, the engine load Q/N decreases below the first reference load Q/N1, and then, the valve 17 is changed from the full open position to the half open position. If the engine is being rapidly decelerated, asynchronous fuel injection is continued even after the air-flow control valve 17 is changed from the full open position to the half open position, so that injected fuel may temporarily adhere to the walls of the intake ports 6a and 6b and be supplied into the combustion chamber 4 thereafter. When the engine is rapidly decelerated, the amount of air Q suddenly decreases to suddenly increase the negative pressure produced in the intake ports 6a and 6b. Accordingly, if synchronous fuel injection is started when the engine load decreases below the reference load Q/N1, the walls of the intake ports 6a and 6b still hold fuel, and therefore, the fuel on the walls and newly injected fuel are both supplied into the combustion chamber 4 to temporarily make the air-fuel ratio too rich. To avoid this problem, in this embodiment, asynchronous fuel injection is continued even after the valve 17 is changed from the full open position to the half open position, if the engine is being rapidly decelerated at this moment. As a result, injected fuel adheres to the walls of the intake ports 5a and 6b but is then supplied into the combustion chamber 4, to maintain a proper air-fuel ratio even if the engine is rapidly decelerated.

After the air-flow control valve 17 is changed to the half open position, asynchronous fuel injection is continued during the deceleration of the engine. At time e6 when the deceleration of the engine ends, synchronous fuel injection is started.

FIG. 46B is a time chart when the engine is being slowly decelerated with a small change in the engine load Q/N. The deceleration starts at time zero. If the engine is slowly decelerated when the valve 17 is changed from the full open position to the half open position, synchronous fuel injection is started as soon as the engine load Q/N decreases below the lower threshold Q/NY, that is, at time f3. When the engine load Q/N further decreases below the reference load Q/N1, that is, at time f4, the valve 17 is changed from the full open position to the half open position, Once the valve 17 is changed to the half open position, the negative pressure in the branch 10 downstream of the valve 17 increases to properly remove fuel from the walls of the intake ports 6a and 6b. It is preferable to minimize the amount of fuel on the walls of the intake ports 6a and 5b just before the valve 17 is changed to the half open position. To achieve this, synchronous fuel injection is carried out before the valve 17 is changed from the full open C position to the half open position, to directly inject fuel into the combustion chamber 4. This results maintaining a proper air-fuel ratio when the engine is decelerated and stabilizes the amount of fuel attached to the walls of the intake ports 6a and 6b.

Next, a method of controlling the air-flow control valve 17 when the engine is warmed up will be explained with reference to FIGS. 48 and 49. This method is basically the same as that explained with reference to FIGS. 3 to 7. Namely, the valve 17 is maintained at the half open position when an engine load Q/N is below a first reference load Q/N1, and if the engine load Q/N is above the first reference load Q/N1, the valve 17 is maintained at the full open position.

Figure 48:
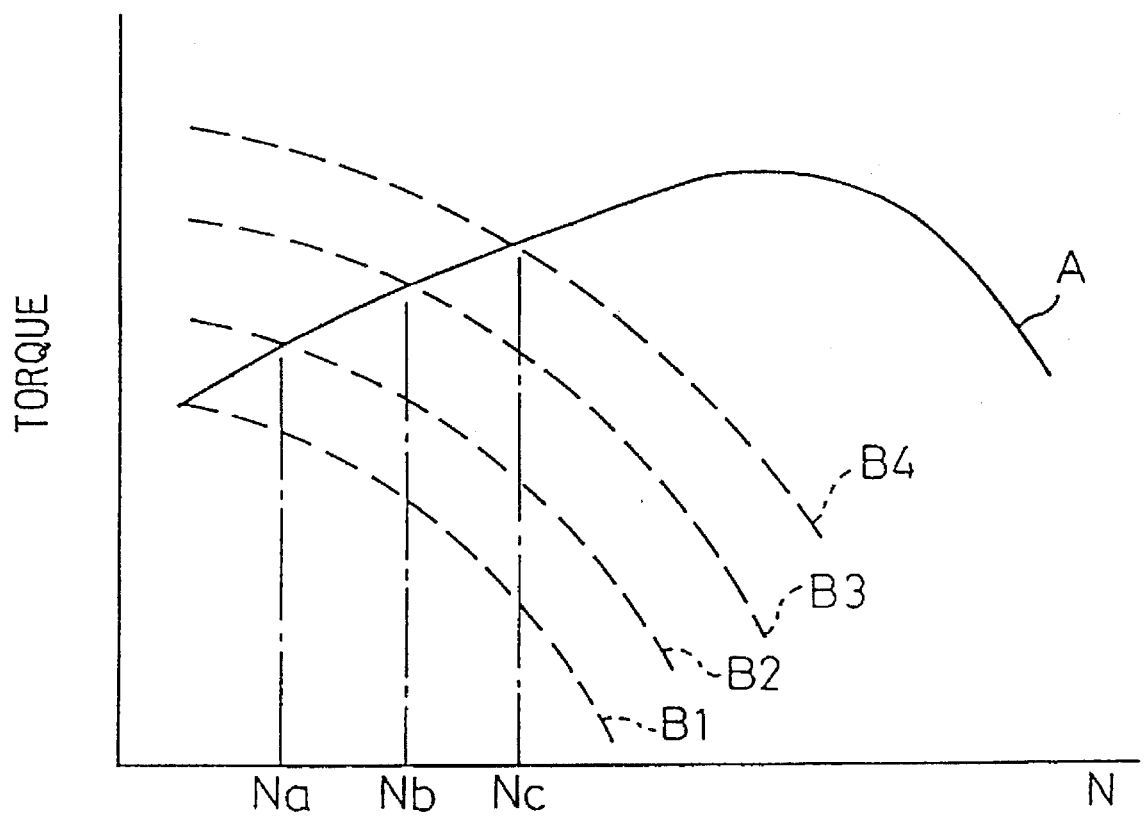
FIG. 48 is a diagram illustrating the relationship between an engine speed and an engine torque.

FIG. 48 shows the relationship between am engine speed N and an engine output torque. A curve A represents a reference torque and curves B1 to B4 represent an output torque obtained when the degree of the throttle valve opening TA is at the maximum and the valve 17 is at the half open position. More precisely, the torque curve B1 is obtained when the temperature THW of engine cooling water is 80 degrees centigrade, the torque curve B2 with THW=60 degrees centigrade, the torque curve B3 with THW=40 degrees centigrade, and the torque curve B4 with THW=20 degrees centigrade. The reference torque A is obtained when the warming-up is completed with the degree opening TA being at the maximum and the valve 17 being at the full open position.

The lower the temperature of air fed into the engine, the higher the filling efficiency of air rises to increase torque. When the engine is warmed up, namely when THW<80 degrees centigrade, the torque curves B2, B3, and B4 with the valve 17 being at the half open position are higher than the reference torque A as shown in FIG. 48. Although not shown in FIG. 48, the torque of the engine that is warmed up with the valve 17 being kept at the full open position is even larger than the reference torque A. The reference torque A is sufficient to operate the engine, and therefore, a torque higher than the reference torque A is not required. Accordingly, the valve 17 is maintained at the half open position if the torque with the valve 17 being at the half open position is higher than the reference torque A, even if it is the time to change the valve 17 from the half open position to the full open position. This avoids an unnecessarily large torque. When the valve 17 is kept at the half open position during the warming-up operation, the injected fuel is properly atomized to secure good combustion. This results in speedily completing the warming-up operation.

When the air-flow control valve 17 is at the half open position, the torque of the engine that is being warmed up exceeds the reference torque A if the engine speed N is below a limit speed N1. The limit speed N1 is Na if THW=60 degrees centigrade (B2), N1=Nb if THW=40 degrees centigrade (S3), and N1=Nc if THW=20 degrees centigrade (B4). The limit speed N1 becomes higher as the cooling water temperature THW decreases. Namely, as the cooling water temperature THW is lower, the engine operating range where the valve 17 is kept at the half open position expands.

Although not shown in FIG. 48, the torque drops as the degree of opening TA becomes smaller. Therefore, as the degree of opening TA becomes smaller in the warming-up operation, the limit speed N1 becomes smaller.

Figure 49A:
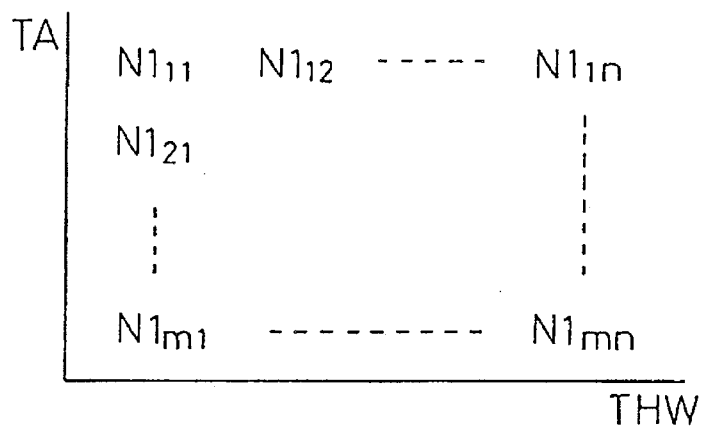
FIGS. 49A through 49C are diagrams illustrating a limit engine speed.
Figure 49B:
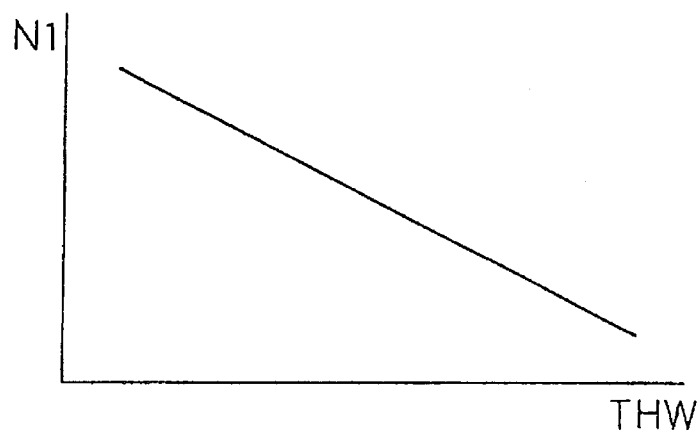
Figure 49C:
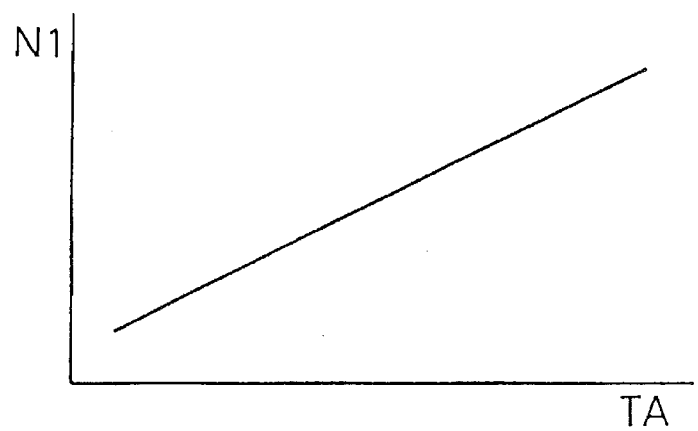

The limit speed N1 is a function of the cooling water temperature THW and the degree of the throttle valve opening TA and is stored as a map shown in FIG. 49A in the ROM 52. As shown in FIG. 49B, the limit speed N1 increases as the cooling water temperature TEW decreases. As shown in FIG. 49C, the limit speed N1 decreases as the degree of opening TA becomes smaller. Before changing the air-flow control valve 17 from the half open position to the full open position when the warming up operation is in process, it is determined whether the engine speed N is below the limit speed N1. If N<N1, the torque that is obtained when the valve 17 is at the full open position is higher than the reference torque A, and therefore, the valve 17 is kept at the half open position. This results in securing good combustion for the warming-up operation. If N≧N1, it is determined that the torque obtained when the valve 17 is kept at the half open position is lower than the reference torque A, and therefore, the valve 17 is changed to the full open position. This results in preventing a shortage of torque.

FIG. 50 shows a routine for executing control of the degree of opening of the air-flow control valve 17 in the warming-up operation of the engine mentioned above. This routine is executed by interruption every predetermined time.

Referring to FIG. 50, at step 300, it is determined whether the warming up operation of the engine is in process. When the warming-up completes, the processing cycle is ended. If the warming up operation of the engine is in process, the routine goes to step 301 where it is determined if Q/N≧Q/N1, namely if the valve 17 is to be changed to the full open position. If Q/N<Q/N1, the routine jumps to step 304. If Q/N≧Q/N1, the routine goes from step 301 to step 302, where a limit speed N1 is calculated using the map shown in FIG. 49A based on a cooling water temperature THW and the degree of throttle valve opening TA. At following step 303, it is determined whether an engine speed N is below the limit speed N1. If N<N1, the routine goes to step 304 where the valve 17 is maintained at the half open position, and the processing cycle is ended. If N ≧N1, the routine goes to step 305 where the valve 17 is changed to the full open position, and the processing cycle is ended.

Figure 51A:
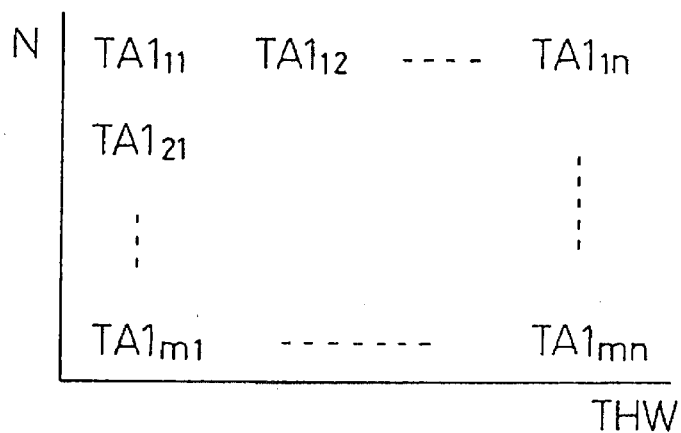
FIGS. 51A through 51C are diagrams illustrating a limit degree of opening of a throttle valve.
Figure 51B:
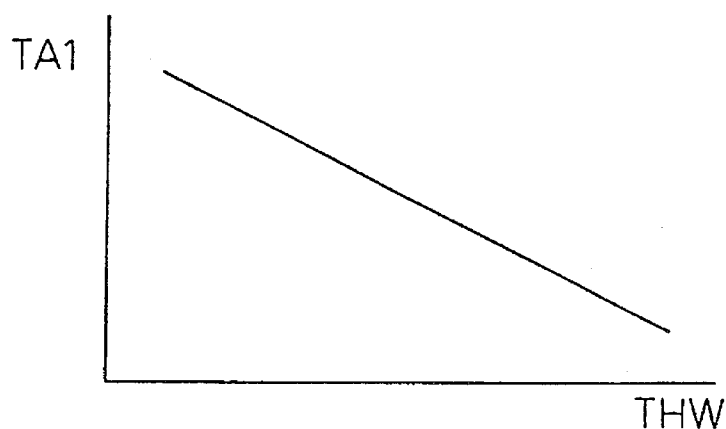
Figure 51C:
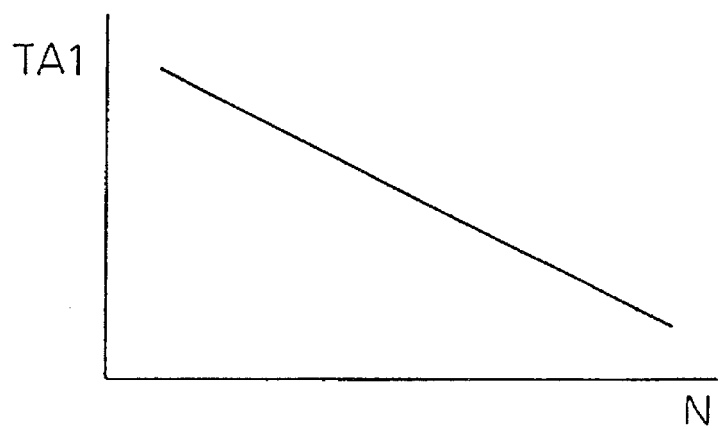

In the embodiment shown in FIGS. 48 and 49, each limit speed N1 that is a function of a cooling wager temperature THW and the degree of opening TA of the throttle valve 15 is stored in the ROM 52, in advance, and an engine speed N is compared with a corresponding limit speed N1 to keep the valve 17 at the half open or the full open position. Alternatively, it is possible that a limit degree of throttle valve opening TA1 is calculated based on a cooling water temperature THW and an engine speed N, and the degree of throttle valve opening TA is compared with the limit degree of opening TA1 to keep the valve 17 at the half open or full open position. If TA>TA1, it is determined that the torque obtained by keeping the valve 17 at the half open position is higher than the reference torque A, and therefore, the valve 17 is kept at the half open position. If TA≦TA1, it is determined that the torque obtained with the valve 17 being at the half open position is lower than the reference torque A, and therefore, the valve 17 is kept at the full open position. The limit degree of opening TA1 is stored as a map shown in FIG. 51A in the ROM 52 in advance. The limit degree of opening TA1 becomes smaller as the cooling water temperature THW increases as shown in FIG. 51B, and as the engine speed M increases as shown in FIG. 51C.

Figure 51D:
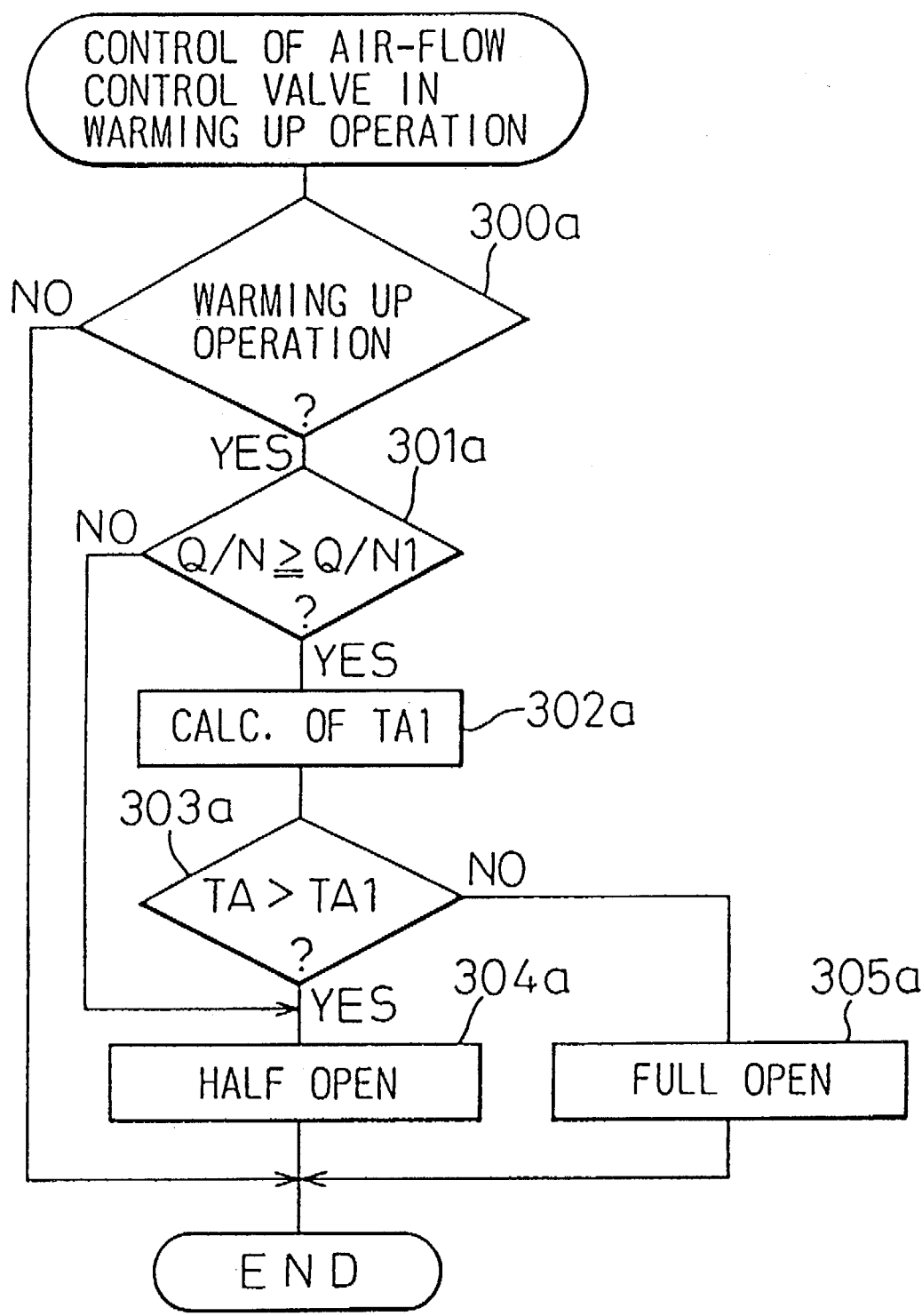
FIG. 51D is a flowchart for executing another embodiment of control of in a warm-up operation of the engine.

FIG. 51D shows a routine for executing control of the degree of opening of the air-flow control valve 17 in the warming-up operation of the engine mentioned above. This routine is executed by interruption every predetermined time.

Referring to FIG. 51D, at step 300a, it is determined whether the warming up operation of the engine is in process. When the warming-up completes, the processing cycle is ended. If the warming up operation of the engine is in process, the routine goes to step 301a where it is determined if Q/N≧Q/N1, namely if the valve 17 is to be changed to the full open position. If Q/N<Q/N1, the routine jumps to step 304a. If Q/N≧Q/N1, the routine goes from step 301a to step 302a, where a limit degree of opening TA1 is calculated using the map shown in FIG. 51A based on a cooling water temperature THW and an engine speed N. At following step 303a, it is determined whether a degree of throttle valve opening TA is larger than the limit degree of opening TA1. If TA>TA1, the routine goes to step 304a where the valve 17 is maintained at the half open position, and the processing cycle is ended. If TA≦TA1, the routine goes to step 305a where the valve 17 is changed to the full open position, and the processing cycle is ended.

Figure 52:
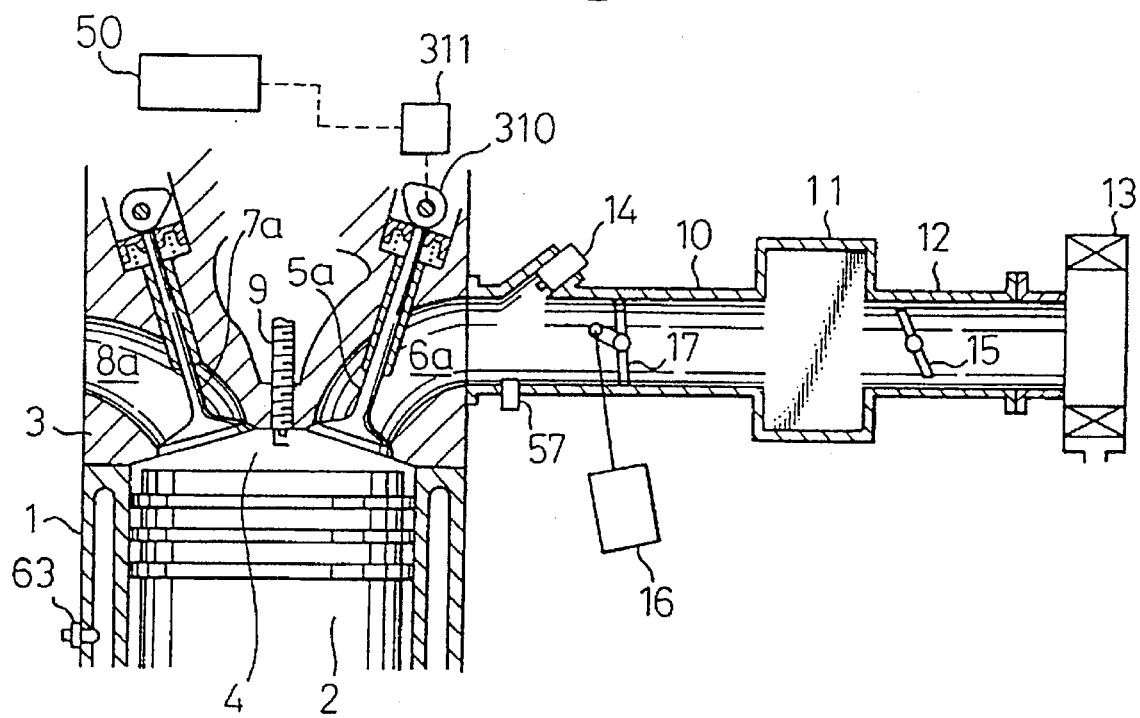
FIG. 52 is a general view illustrating an engine according to another embodiment of the present invention.

FIG. 52 shows an engine according to another embodiment of the present invention. This engine comprises an electronic control unit 50 similar to the electronic control unit 50 shown in FIG. 1, but the unit 50 is simplified to the box in FIG. 52.

A cam 310 for driving first and second intake valves 5a and 5b is provided with an open period changer 311 for changing a open period OP of the intake valves 5a and 5b. The open period changer 311 serves as a unit for increasing the amount of a backwardly flowing gas.

Figure 53:
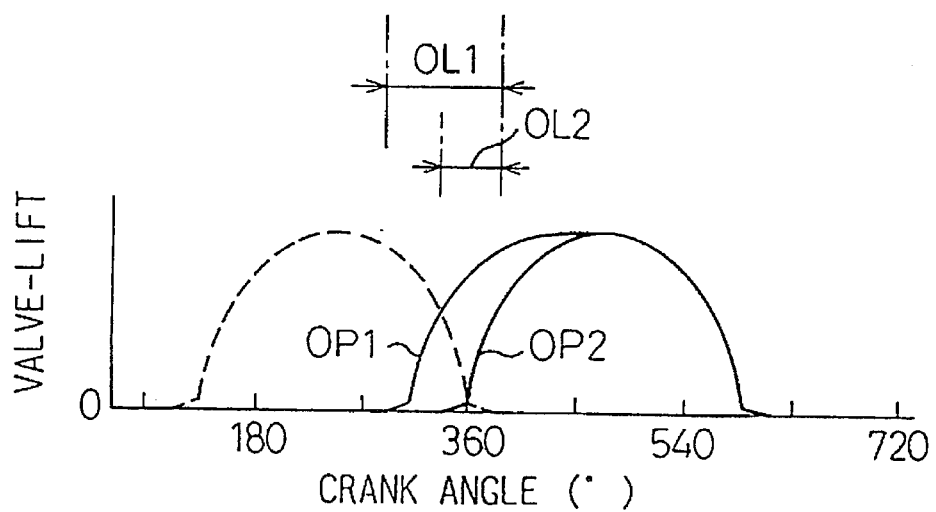
FIG. 53 is a diagram illustrating the opening period of an intake valve.

The open period changer 311 is controlled by the signals output from the electronic control unit The open period changer 311 controls the cam 310 to set the open period OP of the intake valves 5a and 5b to one of OP1 and OP2 shown in FIG. 53. When the open period OP1 is selected, the open period of the intake valves 5a and 5b in an exhaust stroke is extended, and an overlap period OL during which both of the intake valves 5a and 5b and exhaust valves 7a and 7b are simultaneously open is made OL1. When the open period OP2 is selected, the open period of the intake valves 5a and 5b in the exhaust stroke is shortened, and an overlap period OL is made OL2. The overlap period OL2 is shorter than the overlap period OL1. A dotted line shown in FIG. 53 indicates the open period of the exhaust valves 7a and 7b.

In this embodiment, the open period OP of the intake valves 5a and 5b in an exhaust stroke is controlled to control an overlap period. When the overlap period is large, a backwardly flowing gas that backwardly flows into intake ports 6a and 6b through the intake valves 5a and 5b increases. When OP=OP1, the amount of the backwardly flowing gas is increased, and when OP=OP2, the same is decreased. The backwardly flowing gas is drawn, with air, back into the combustion chamber 4 in the following intake stroke. Namely, the backwardly flowing gas works like an EGR gas.

Figure 54:
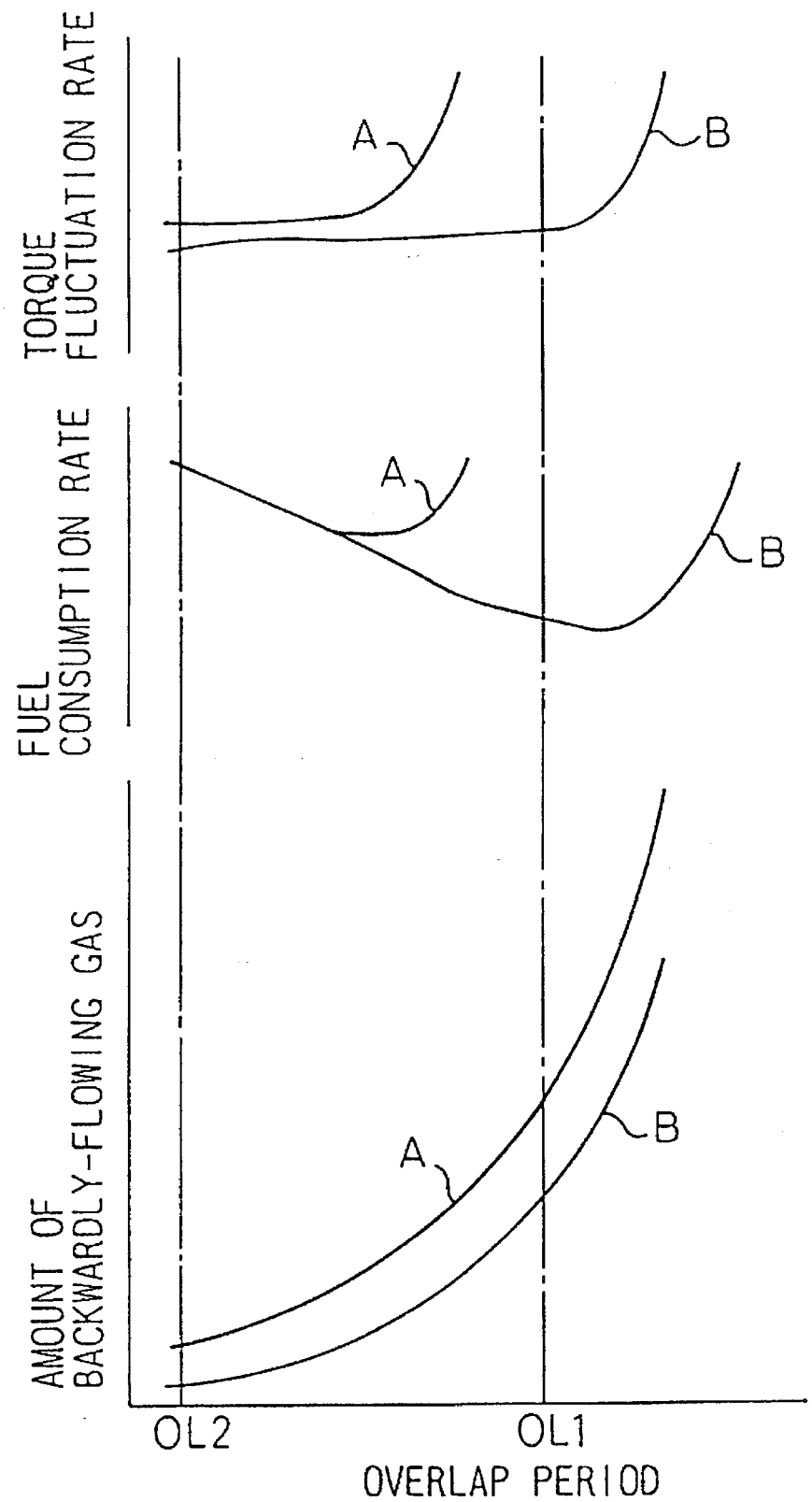
FIG. 54 is a diagram illustrating changes in a torque fluctuation rate, fuel consumption rate, and the amount of a backwardly flowing gas with respect to a change in an overlap period when engine load is low.

FIG. 54 shows changes in a torque fluctuation rate, a fuel consumption rate, and the amount of a backwardly flowing gas with respect to a change in an overlap period when the engine load is low, such as when the engine load is lower than the first reference load Q/N1 shown in FIG. 4. In FIG. 54, curves A are obtained when an air-flow control valve 17 is at a full open position, and curves B are obtained when the valve 17 is at a half open position. When engine load is low, keeping the valve 17 at the half open position, and increasing the overlap period to OL1 results in suppressing the torque fluctuation rate and reducing the fuel consumption rate. When the valve 17 is kept at the half open position, the amount of the backwardly flowing gas is limited. Namely, the amount of the backwardly flowing gas serving as an EGR gas is properly limited when engine load is low. When the valve 17 is kept at the half open position, a swirl in a combustion chamber 4 is enhanced to reduce pumping loss and unburned HC and to secure good combustion if the engine load Q/N is low.

Figure 55:
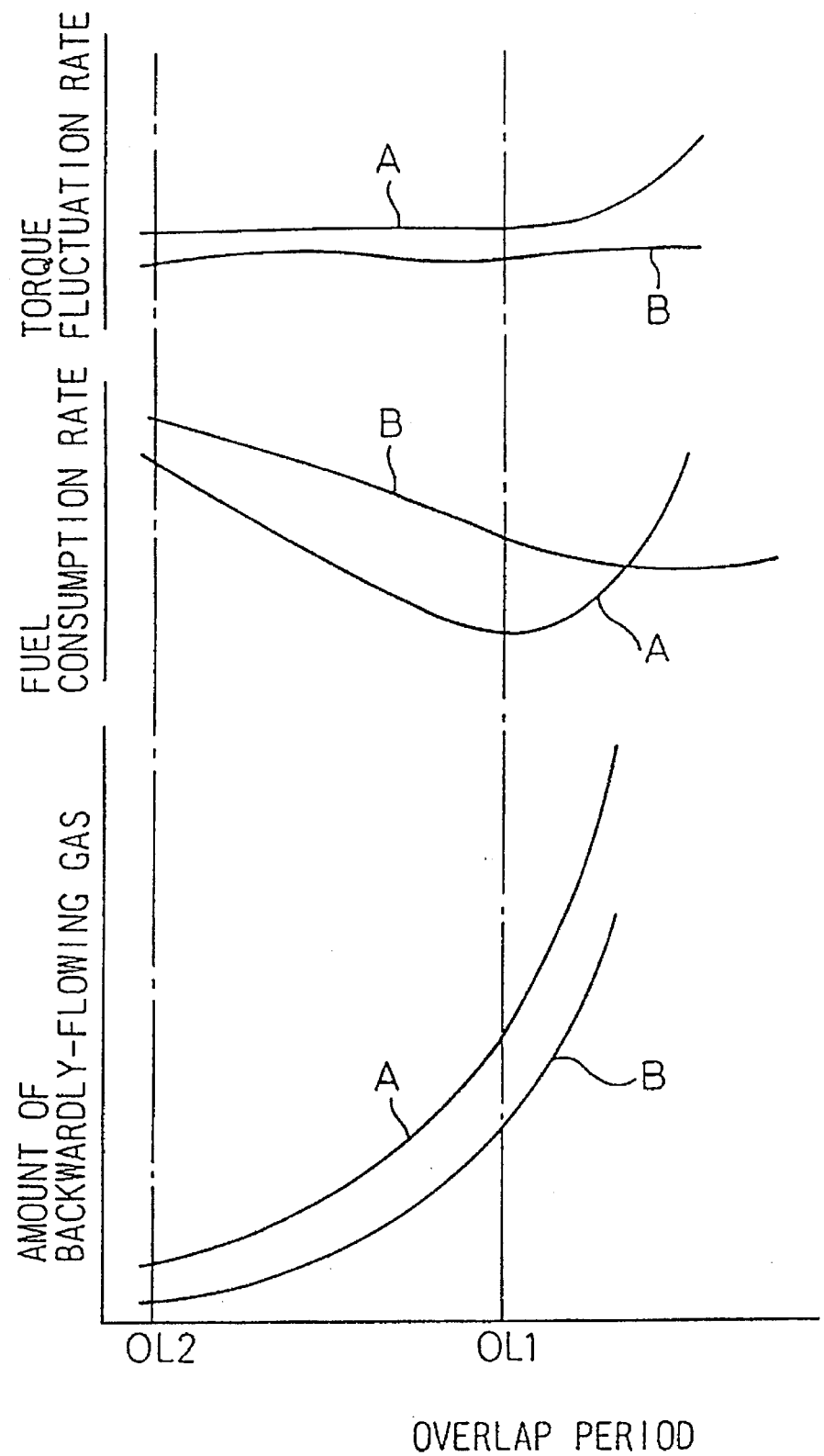
FIG. 55 is a diagram illustrating changes in a torque fluctuation rate, fuel consumption rate, and the amount of a backwardly flowing gas with respect to a change in an overlap period when engine load is medium.

FIG. 55 shows changes in the torque fluctuation rate, fuel consumption rate, and the amount of a backwardly flowing gas with respect to a change in the overlap period when the engine load Q/N is medium, such as when the engine load is slightly higher than the first reference load Q/N1. Curves A are obtained when the air-flow control valve 17 is at the full open position, and curves B are obtained when the valve 17 is at the half open position. When the engine load Q/N is medium, the valve 17 is kept at the full open position, and the overlap period is increased to to suppress the torque fluctuation rate and the fuel consumption rate. When the valve 17 is at the full open position, the amount of a backwardly flowing gas serving as an EGR gas increases to secure good combustion under the medium engine load.

When the engine load is high, the overlap period is set to OL2 to reduce the amount of the backwardly flowing gas. This results in increasing the amount of air supplied into the combustion chamber 4 and securing torque under high engine load.

Figure 56:
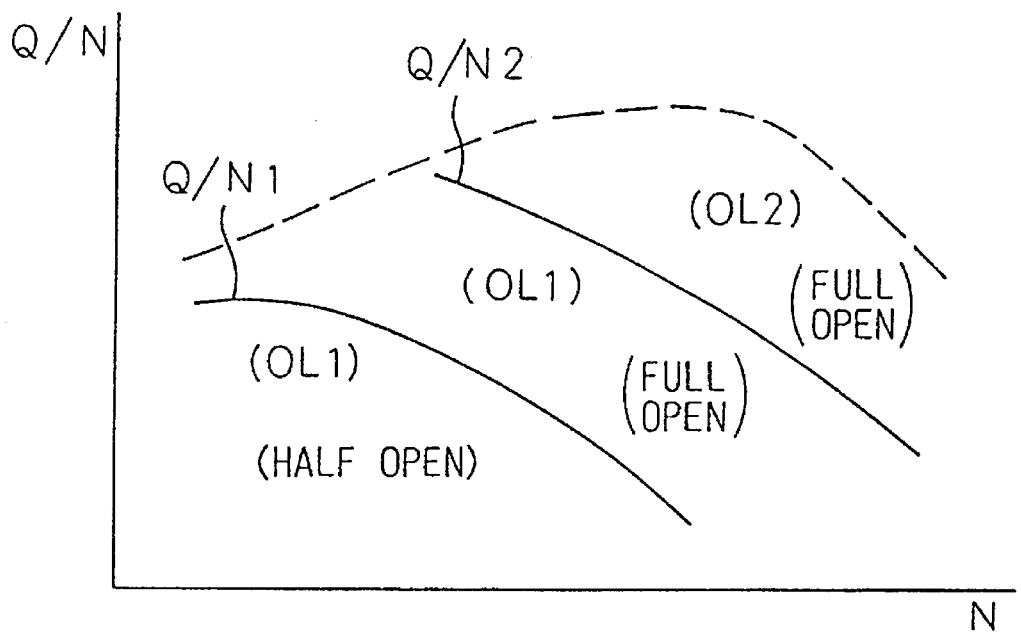
FIG. 56 is a diagram illustrating a second reference load.

Similar to the embodiment shown in FIGS. 3 to 7, the valve 17 is maintained at the half open position when the engine load Q/N is lower than the first reference load Q/N1, and if it is higher than Q/N1, the valve 17 is maintained at the full open position. As shown in FIG. 56, a second reference load Q/N2 is provided, which load Q/N2 is determined according to an engine speed N. The second reference load. Q/N2 is higher than the first reference load Q/N1. When the engine load Q/N is higher than the second reference load Q/N2, the overlap period is set to OL2. When the engine load Q/N is lower than the first reference load Q/N1, the valve 17 is kept at the half open position, and the overlap period is set to OL1. If the engine load Q/N is higher than the first reference load Q/N1 and lower than the second reference load Q/N2, the valve 17 is kept at the full open position, and the overlap period is set to OL1. When the engine load Q/N is higher than the second reference load Q/N2, the valve 17 is kept at the full open position, and the overlap period is set to OL2. The second reference load Q/N2 is stored as a map in a ROM 52 in advance. A dotted line shown in FIG. 56 indicates a full load.

Figure 57:
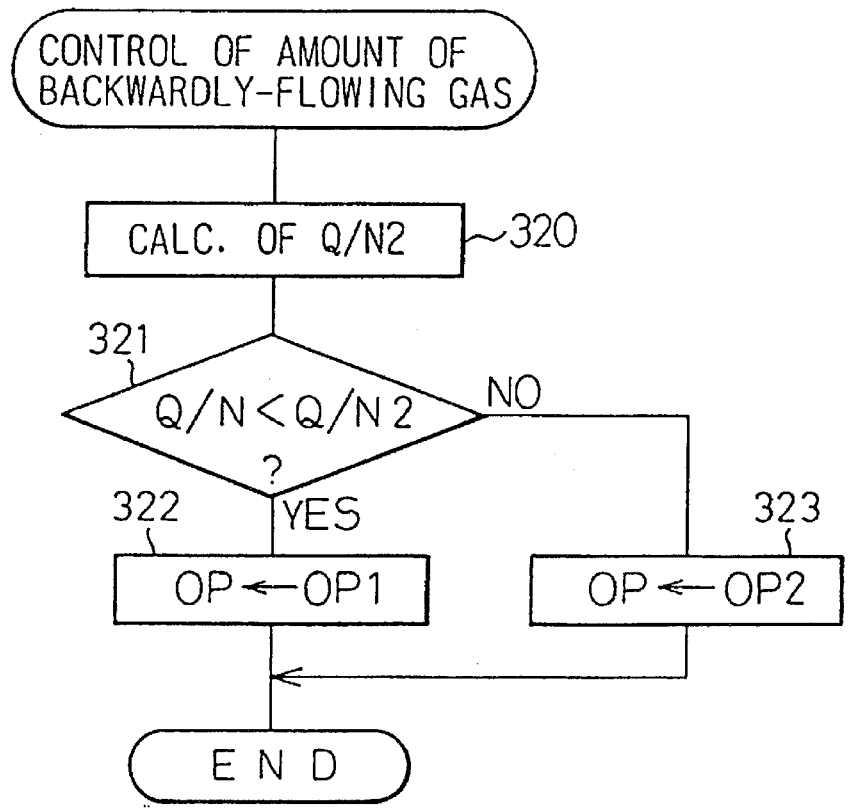
FIG. 57 is a flowchart for executing control of an amount of the backwardly flowing gas.

FIG. 57 shows a routine for executing control of the amount of backwardly flowing gas. This routine is executed by interruption every predetermined time.

Referring to FIG. 57, at step 320, a second reference load Q/N2 is calculated using the map shown in FIG. 56. At the following step 321, it is determined if the present engine load Q/N is lower than the second reference load Q/N2. If Q/N<Q/N2, the routine goes to step 322 where the valve open period OP of the intake valves 5a and 5b is set to OP1 so that OL is set OL1. Then, the processing cycle is ended. If Q/N≧Q/N2, the routine goes to step 323 where the valve open period OP is set to OP2 so that OL is set OL2. Then, the processing cycle is ended.

The above embodiment employs the engine load Q/N as a parameter for changing the valve open period of the intake valves 5a and 5b as well as the degree of opening of the air-flow control valve 17. However, the parameter may be one of the engine speed N, the degree of throttle valve opening TA, the pressure PM in a branch 10, or a combination thereof. The other operations and constructions of the engine shown in FIG. 52 are the same as those of the engine shown in FIG. 1, and therefore, they are not explained again.

A method of controlling the amount of a backwardly flowing gas when the engine is accelerated with a large overlap period and the air-flow control valve 17 being at the full open position will be explained.

Figure 58:
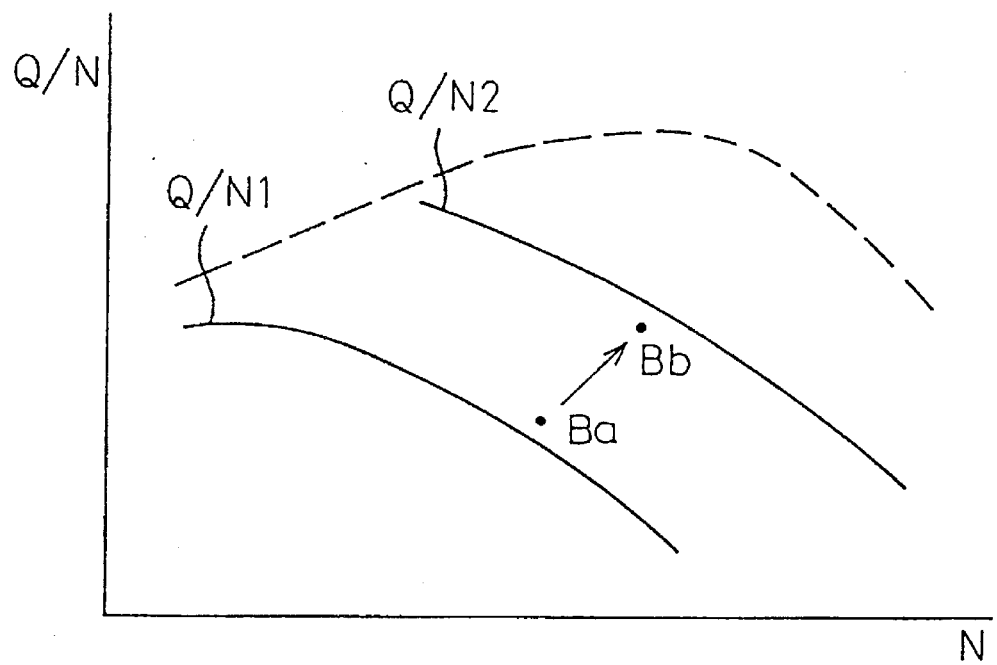
FIG. 58 is a diagram illustrating changes in the operating condition of the engine.
Figure 59:
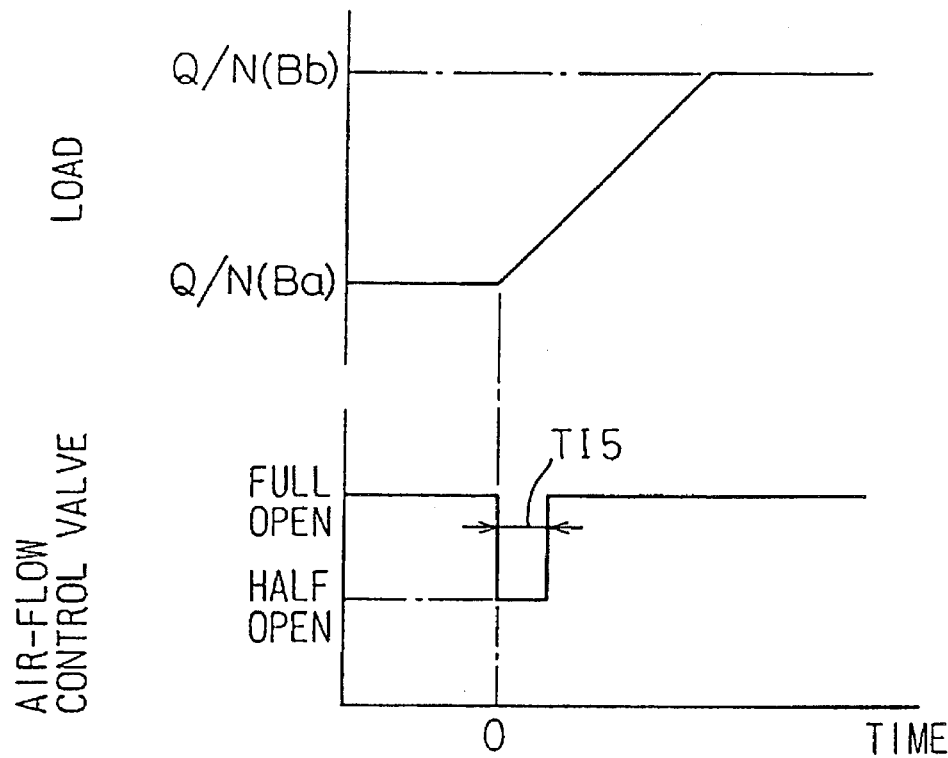
FIG. 59 is a time chart illustrating control of the amount of the backwardly flowing gas when the engine is accelerated.

When the engine is accelerated, the engine operating condition may change from Ba with an engine load of Q/N(Ba) to Bb with an engine load of Q/N(Bb) as shown in FIG. 58. Under the operating condition the air-flow control valve 17 must be at the full open position, and the overlap period must be set to OL1. Under the operating condition Bb, the valve 17 must be at the full open position, and the overlap period must be set to OL1. If the valve 17 is kept at the full open position and the overlap period at OL1 when the condition Ba is suddenly changed to the condition Bb, the amount of a backwardly flowing gas may increase to thereby push back the injected fuel. As a result, the amount of fuel adhering to the walls of the intake ports 6a and 6b increases, and therefore, the air-fuel ratio momentarily becomes too lean. To solve this problem, in this embodiment, the valve 17 is temporarily maintained at the half open position for a fifth set period TI5 as shown in FIG. 59 if the engine is rapidly accelerated under the engine operating condition Ba, to thereby temporarily reduce the amount of the backwardly flowing gas. This prevents an increase in the amount of fuel adhering to the walls of the intake ports 6a and 6b when the engine is rapidly accelerated. Accordingly, the air-fuel ratio will not be too lean when the engine is rapidly accelerated. In this embodiment, the amount of a backwardly flowing gas is reduced by changing the valve 17 from the full open position to the half open position. Alternatively, it is possible to temporarily change the open period of the intake valves 5a and 5b to change the overlap period from OD1 to OL2, to thereby temporarily reduce the amount of the backwardly flowing gas.

Figure 60:
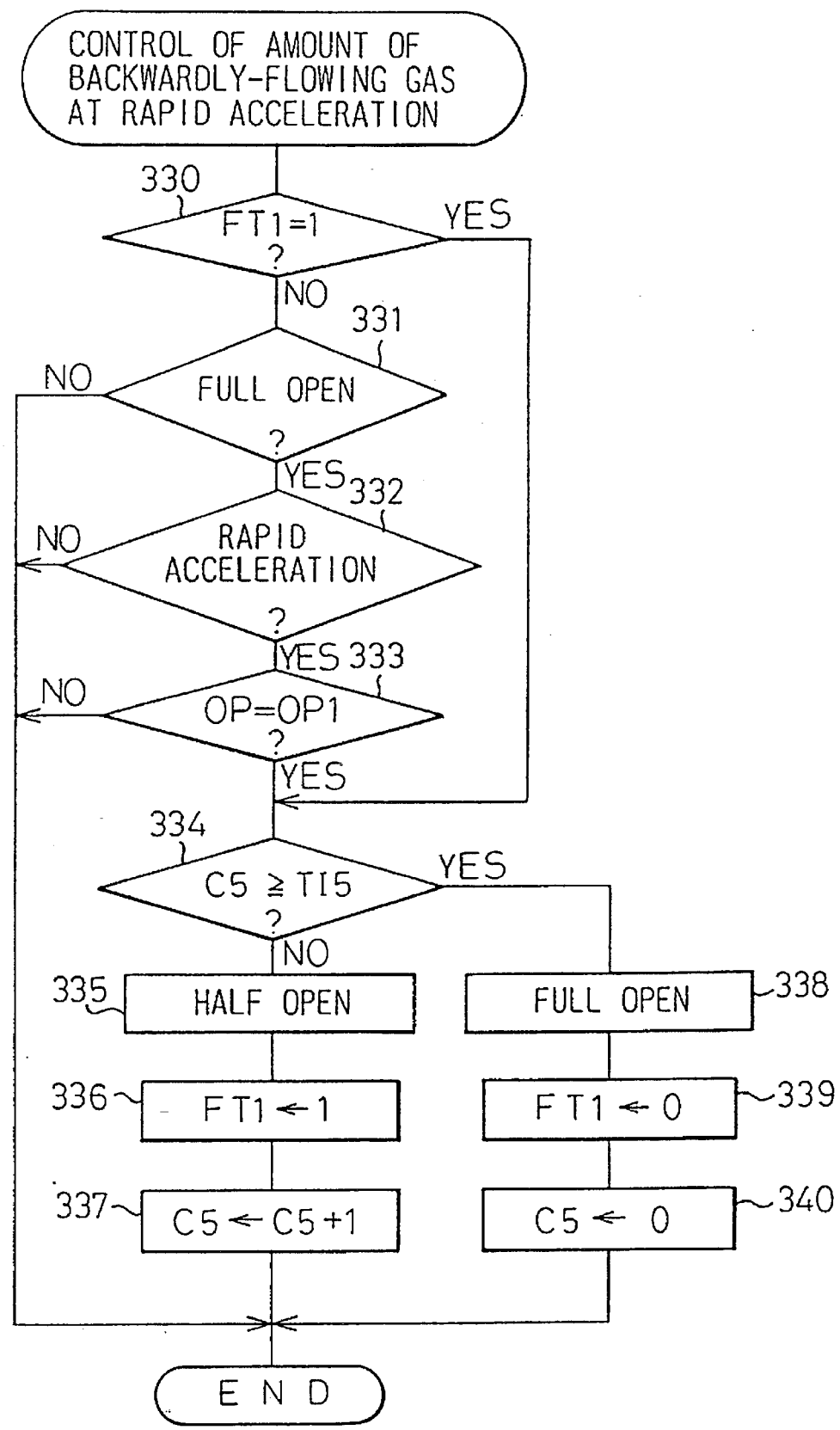
FIG. 60 is a flowchart for executing control of the amount of a backwardly flowing gas when the engine is accelerated.

FIG. 60 shows a routing for executing control of the amount of a backwardly flowing gas mentioned above. This routine is executed by interruption every predetermined time.

Referring to FIG. 60, at step 330, it is determined whether a backwardly flowing gas reduction flag FT1 is set. This flag FT1 is set when it is necessary to temporarily reduce the amount of a backwardly flowing gas. If the flag FT1 is reset, i.e., FT1=0, the routine goes to step 331 where it is determined whether the air-flow control valve 17 is at the full open position. If it is at the half open position, the processing cycle is ended. If it is at the full open position, the routine goes to step 332 where it is determined whether the engine is rapidly accelerated. If the engine is not rapidly accelerated, the processing cycle is ended. If the engine is rapidly accelerated, the routine goes to step 333 where it is determined whether the open period OP of the intake valves 5a and 5b is OP1. If OP is not OP1, i.e., if the overlap period is DL2, the processing cycle is ended. If OP=OP1, i.e., if the overlap period is OL1, the routine goes to step 334 where it is determined whether the count C5 of a fifth timer is above a fifth set time TI5. The count C5 indicates a time during which the valve 17 is temporarily set to the half open position when the valve 17 is at the full open position and when the overlap period is OL1. If it is first time for the routine to go step 334 after the clearance of the count C5, C5<TI5, and therefore, the routine goes to step 335 where the valve 17 is changed to the half open position to temporarily reduce the amount of the backwardly flowing gas. At following step 336, the flag FT1 is set, i.e., FT1=1. At following step 337, the count C5 is incremented by one, and the processing cycle is ended.

In the next processing cycle, FT=1, and therefore, the routine goes from step 330 to step 334. If C5≧TI5 in step 334, the routine goes to step 338 where the valve 17 is changed to the full open position and, at following step 339, the flag FT1 is reset. And, at following step 340, the count C5 is cleared, and the processing cycle is ended.

It is possible to control the open period of the exhaust valves 7a and 7b in an intake stroke, to control the overlap period, to thereby control the amount of the gas backwardly flowing into the intake ports. It is also possible to control both of the open period of the intake valves 5a and 5b in an exhaust stroke and the open period of the exhaust valves 7a and 7b in an intake stroke, to control the overlap period, to thereby control the amount of the gas backwardly flowing into the exhaust ports.

Figure 61:
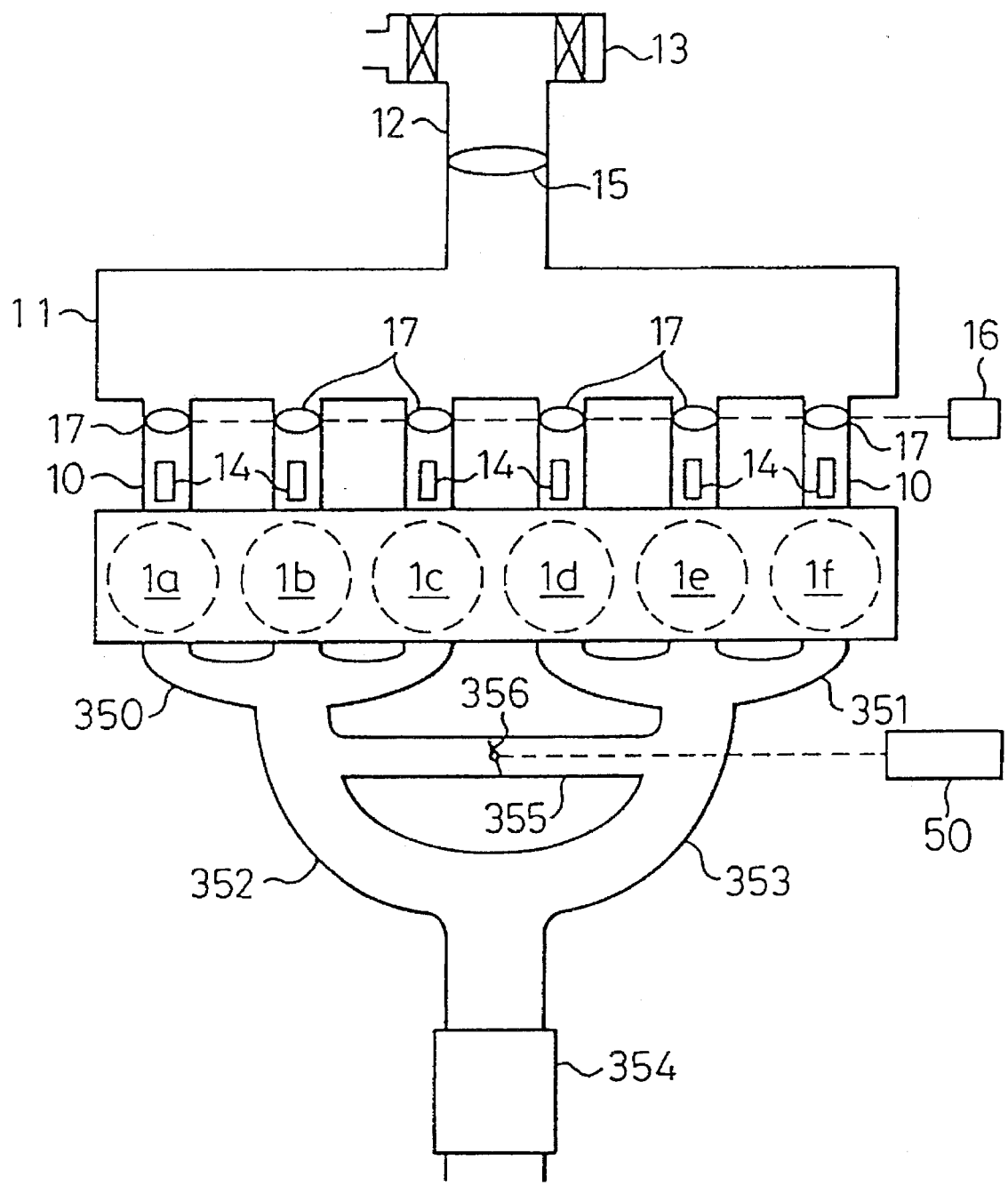
FIG. 61 is a general view illustrating an engine, according to still another embodiment of the present invention.

FIG. 61 shows an engine in which the amount of a backwardly flowing gas is con, rolled according to the present invention. This embodiment employs an electronic control unit 50 like the electronic control unit 50 in FIG. 1, but the unit 50 is simplified to a box in FIG. 61.

The engine includes six cylinders 1a, 1b, 1c, 1d, 1e, and 1f. The first to third cylinders 1a, 1b, and 1c involving different exhaust strokes are connected to a first exhaust manifold 350. The fourth to sixth cylinders 1d, 1e, and 1f involving different exhaust strokes are connected to a second exhaust manifold 351. The first exhaust manifold 350 is connected to a common catalytic converter 354 through a first exhaust pipe 352. The second exhaust manifold 351 is connected to the catalytic converter 354 through a second exhaust pipe 353. The first and second exhaust pipes 352 and 353 are connected to each other through a connection pipe 355. The connection pipe 355 incorporates a switching valve 356 for controlling the passage of an exhaust gas in the connection pipe 355. The switching valve 356 is controlled by signals output from the electronic control unit 50.

Figure 62:
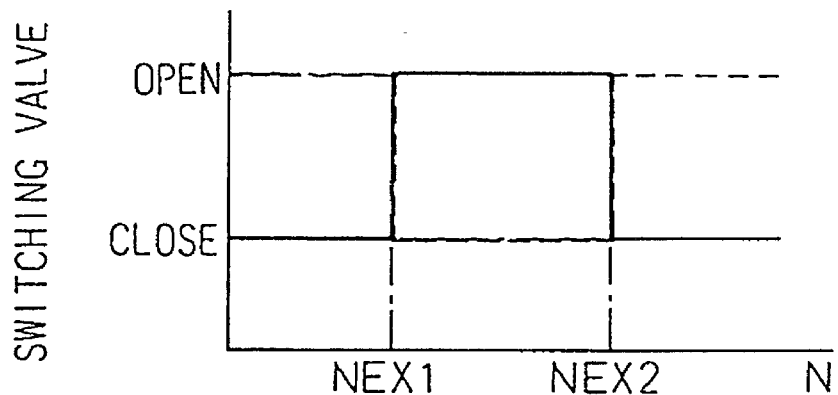
FIG. 62 is a diagram illustrating control of a switching valve for increasing the amount of a backwardly flowing gas.

When the switching valve 356 is closed, the length of the exhaust passage extends, and when it is opened, the length of the exhaust passage shortens. FIG. 62 shows the relationship between an engine speed N and the operation of the switching valve 356. In FIG. 62, a continuous line indicates the valve position of the switching valve 356 to produce the positive pressure wave in the first and second exhaust manifold around the exhaust valves 7a and 7b, and a dotted line indicates that to produce the negative pressure wave around the exhaust valves 7a and 7b. That is, when the engine speed N is lower than a first set speed NEX1, or higher than a second set speed NEX2 that is higher than the first set speed NEX1, the switching valve 356 is closed to produce a positive pressure wave in the first and the second exhaust manifold around the exhaust valves 7a and 7b. If N NEX1 or N>NEX2 and if the switching valve 355 is opened, a negative pressure wave is produced around the exhaust valves 7a and 7b. If NEX1≦N<NEX2 and if the switching valve 356 is closed, a negative pressure wave is produced around the exhaust valves 7a and 7b, and when the switching valve 356 is opened, a positive pressure wave is produced around the exhaust valves 7a and 7b.

To increase the amount of a backwardly flowing gas in the engine shown in FIG. 61, it is necessary to synchronize the positive pressure wave acting around the exhaust valves 7a and 7b with an overlap period. Then, a burned gas in a combustion chamber 4 is promoted to backwardly flow into intake ports 6a and 6b through intake valves 5a and 5b, to thereby increase the amount of the backwardly flowing gas. Namely, the amount of the backwardly flowing gas is increased by closing the switching valve 356 if N NEX1 or N≧NEX2, and by opening the switching valve 356 if NEX1≦N<NEX2. On the other hand, the amount of the backwardly flowing gas decreases if the negative pressure wave is synchronized with the overlap period. In this case, a burned gas in the combustion chamber 4 is quickly discharged into the exhaust manifolds 350 and 351.

Figure 63:
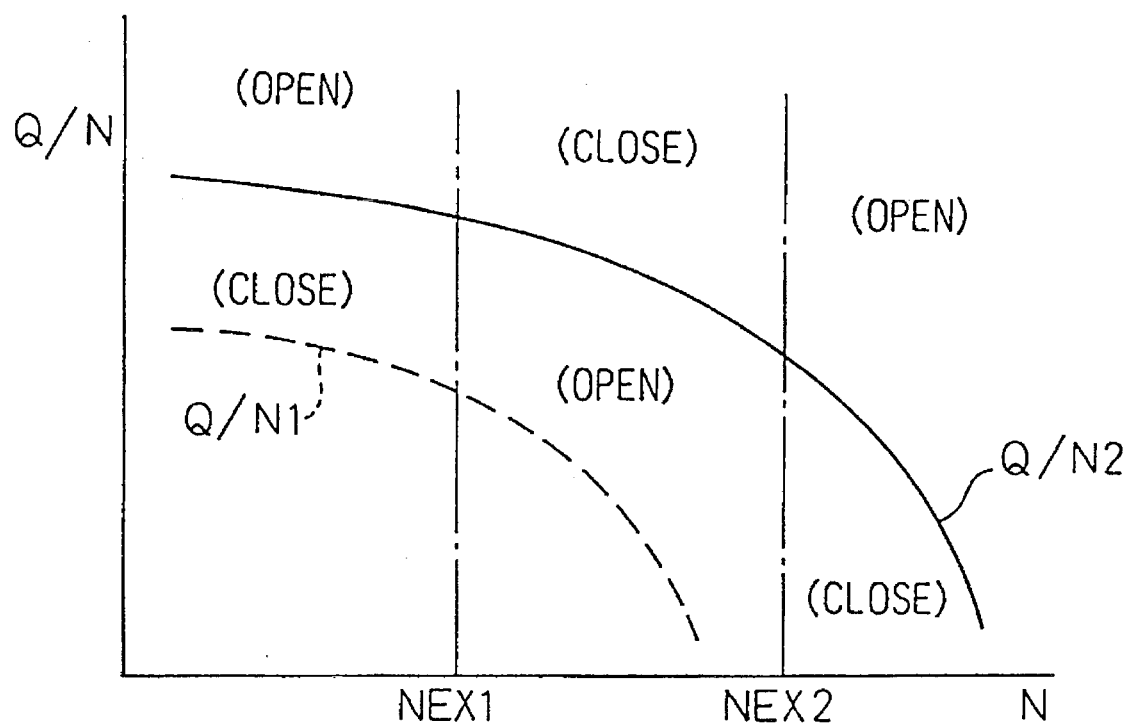
FIG. 63 is a diagram illustrating control of the switching valve under various engine operating conditions.

FIG. 63 shows the relationships among the engine speed N, the engine load Q/N, and the operation of the switching valve 356. The switching valve 356 is closed if N<NEX1 and Q/N<Q/N2 (FIG. 56). The switching valve 356 is opened if NEX1≦N<NEX2 and Q/N<Q/N2. The switching valve 356 is closed if N≧NEX2 and Q/N <Q/N2. As a result, the positive pressure wave acting around the exhaust valves 7a and 7b is synchronized with the overlap period. Consequently, the amount of the backwardly flowing gas is increased when the engine load Q/N is lower than the second reference load Q/N2, to reduce a pumping loss and secure good combustion. The switching valve 356 is opened if N<NEX1 and Q/N≧Q/N2. The switching valve 356 is closed if NEX1≦N<NEX2 and Q/N≧Q/N2. The switching valve 356 is opened if N≧NEX2 and Q/N≧Q/N2. As a result, the negative pressure wave acting around the exhaust valves 7a and 7b is synchronized with the overlap period, Consequently, the amount of the backwardly flowing gas is reduced when the engine load D/N is higher than the second reference load Q/N2, to secure the torque of the engine.

A method of controlling the amount of a backwardly flowing gas when the engine is rapidly accelerated with a positive pressure wave acting around the exhaust valves 7a and 7b being synchronized with an overlap period and the air-flow control valve 17 being at the full open position will be explained.

When the positive pressure wave acting around the exhaust valves 7a and 7b is synchronized with the overlap period and when the air-flow control valve 17 is at the full open position, the amount of the backwardly flowing gas is increased. If the engine is rapidly accelerated under these conditions, the air-fuel ratio momentarily becomes lean as explained with reference to FIGS. 58 and 59. In this case, the amount of the backwardly flowing gas must be reduced. To achieve this, the negative pressure wave acting around the exhaust valves 7a and 7b is momentarily synchronized with the overlap period, to temporarily reduce the amount of the backwardly flowing gas. Alternatively, in a way similar to that in the embodiment shown in FIGS. 58 and 59, the valve 17 may be temporarily changed to the half open position, to reduce the amount of the backwardly flowing gas. This results in preventing the air-fuel ratio from temporarily becoming lean. The other operations and constructions of the engine shown in FIG. 61 are the same as those shown in FIG. 1, and therefore, they are not explained again.

Figure 64:
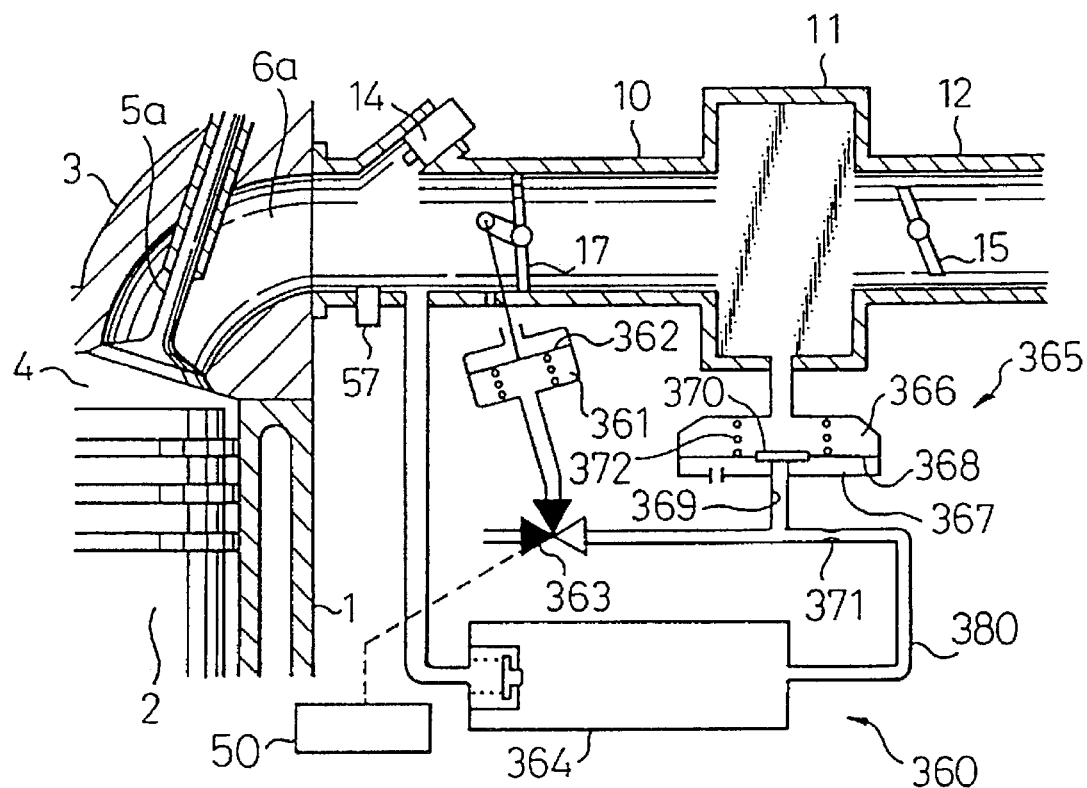
FIG. 64 is an enlarged partial view illustrating an engine according to still another embodiment of the present invention.

FIG. 64 shows an engine according to still another embodiment of the present invention.

This engine is substantially the same as that shown in FIG. 1. A driving apparatus 360 for driving an air-flow control valve 17 and an operation of the valve 17 after the completion of an engine starting operation are different from those shown in FIG. 1. The embodiment shown in FIG. 64 employs an electronic control unit is similar to the electronic control unit 50 shown in FIG. 1, but the unit 50 is simplified to a box in FIG. 64.

The driving apparatus 360 for driving the air-flow control valve 17 includes a diaphragm 362, which is driven in response to the negative pressure in a vacuum chamber 361. The diaphragm 362 is connected to the valve 17. As the negative pressure in the vacuum chamber 361 increases, the degree of opening of the valve 17 increases. The vacuum chamber 361 is connected to a 3-way valve 363, which is controlled by signals output from the electronic control unit 50. The 3-way valve 363 connects the vacuum chamber 361 to the atmosphere or a vacuum tank 364. The vacuum tank 364 is connected to a branch 10 downstream of the valve 17, to store the negative pressure in the branch 10.

A modulator 365 is arranged between the 3-way valve 363 and the vacuum tank 364. The modulator 364 has a vacuum chamber 366 connected to a surge tank 11, an atmospheric chamber 367 connected to the atmosphere, a diaphragm 368 separating the vacuum chamber 366 from the atmospheric chamber 367, a vacuum control port 369 for guiding a vacuum path 380 between the 3-way valve 363 and the vacuum tank 364 to the atmospheric chamber 367, a disk 370 attached to the diaphragm 368, for opening and closing the vacuum control port 369 in response to the displacement of the diaphragm 368, and a compression spring 372 for pushing the diaphragm 368 to close the vacuum control port 369. A choke 371 is arranged in the vacuum path 380 between the modulator 365 and the vacuum tank 364, to minimize air passing from the atmospheric chamber 367 into the branch 10 through the vacuum control port 369 and vacuum tank 364.

Figure 65:
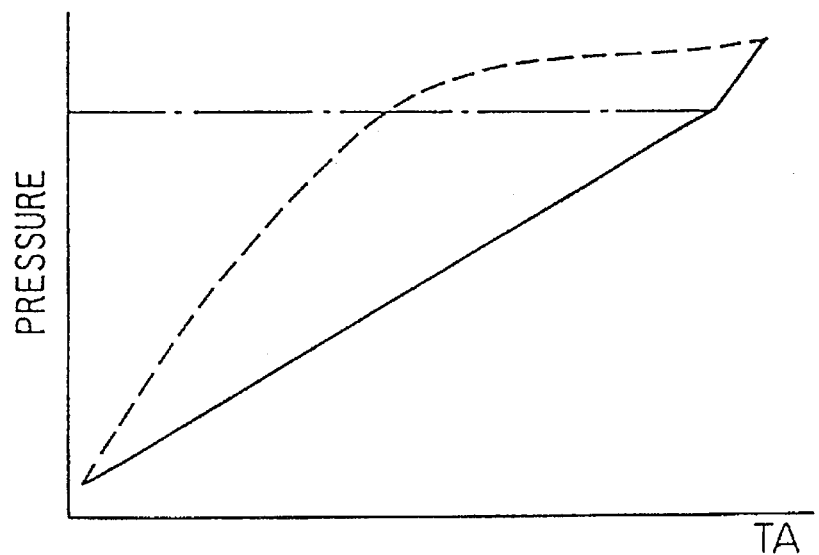
FIG. 65 is a diagram illustrating the relationship between the degree of opening of a throttle valve and the pressure in an intake port or a surge tank.

If the air-flow control valve 17 is not arranged in the branch 10 between the surge tank 11 and a fuel injector 14, the pressure in the surge tank 11 changes as shown by a dotted line in FIG. 65. Namely, the pressure in the surge tank 11 nonlinearly increases as the degree of opening TA of a throttle valve 15 increases. The pressure in the intake ports 6a and 6b is substantially the same as the pressure in the surge tank 11. The amount of air Q fed into the engine is substantially proportional to the pressure in the intake ports 6a and 6b. Accordingly, if there is no valve 17, the amount of air Q nonlinearly increases as the degree of opening TA increases. In particular, an increase in the negative pressure is very small when the degree of opening TA is large. Namely, an increase in the amount of air Q is small when the degree of opening TA 15 is large.

Figure 66:
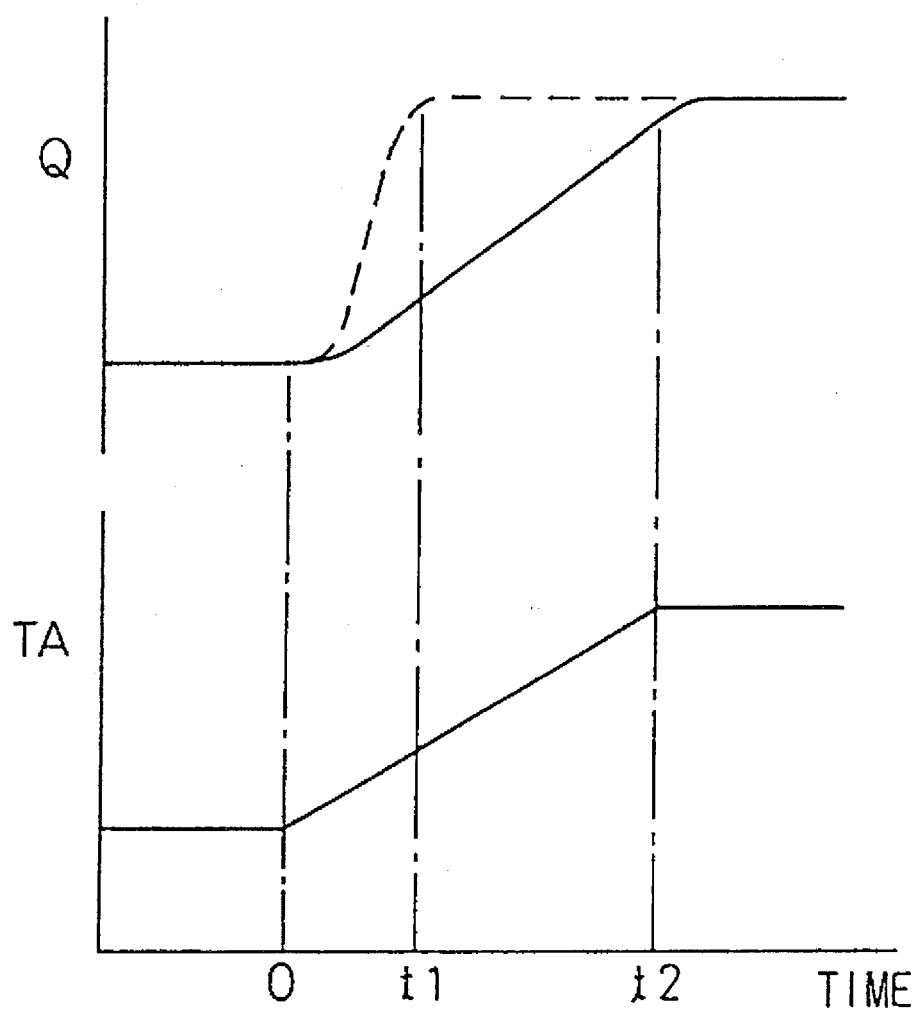
FIG. 66 is a time chart illustrating changes in the amount of air.

When the relationship between the degree of opening TA and the pressure in the intake ports 6a and 6b follows the dotted line shown in FIG. 65, the amount of air Q changes as shown by a dotted line in FIG. 66 when the degree of opening TA changes as shown by a continuous line in FIG. 66. Namely, the amount of air Q increases between time zero and time t1 and shows substantially no increase between the time t1 and time t2, although the degree of opening TA steadily increases between the time zero and the time t2. In this case, the operator of the engine senses no acceleration between the time t1 and the time t2 even if the operator continuously depresses an accelerator pedal (not shown), To solve this problem, the driving apparatus 360 controls the degree of opening of the air-flow control valve 17, so that a pressure difference between the pressure in an air-flow duct 12 upstream of the throttle valve 15, i.e., the atmospheric pressure and the pressure in the surge tank 11 is maintained at the constant, such as 50 mmHg, irrespective of the degree of opening TA, as indicated with a dot-and-dash line shown in FIG. 65. As a result, the pressure in the intake ports 6a and 6b downstream of the valve 17 linearly increases as the degree of opening TA is enlarged, as indicated with a continuous line shown in FIG. 65. Consequently, the amount of air Q fed into the engine linearly increases in response to an increase in the degree of opening TA. Then, the engine operator may sense an acceleration while the accelerator pedal is being depressed.

The operation of the driving apparatus 360 will be explained with reference to FIGS. 64, 67, and 68.

FIG. 64 shows the engine when the engine starting operation is in process. The 3-way valve 363 connects the vacuum chamber 361 to the atmosphere. As a result, the diaphragm 362 is unchanged to keep the air-flow control valve 17 closed, to thereby limit the amount of air supplied into the combustion chamber 4.

Figure 67:
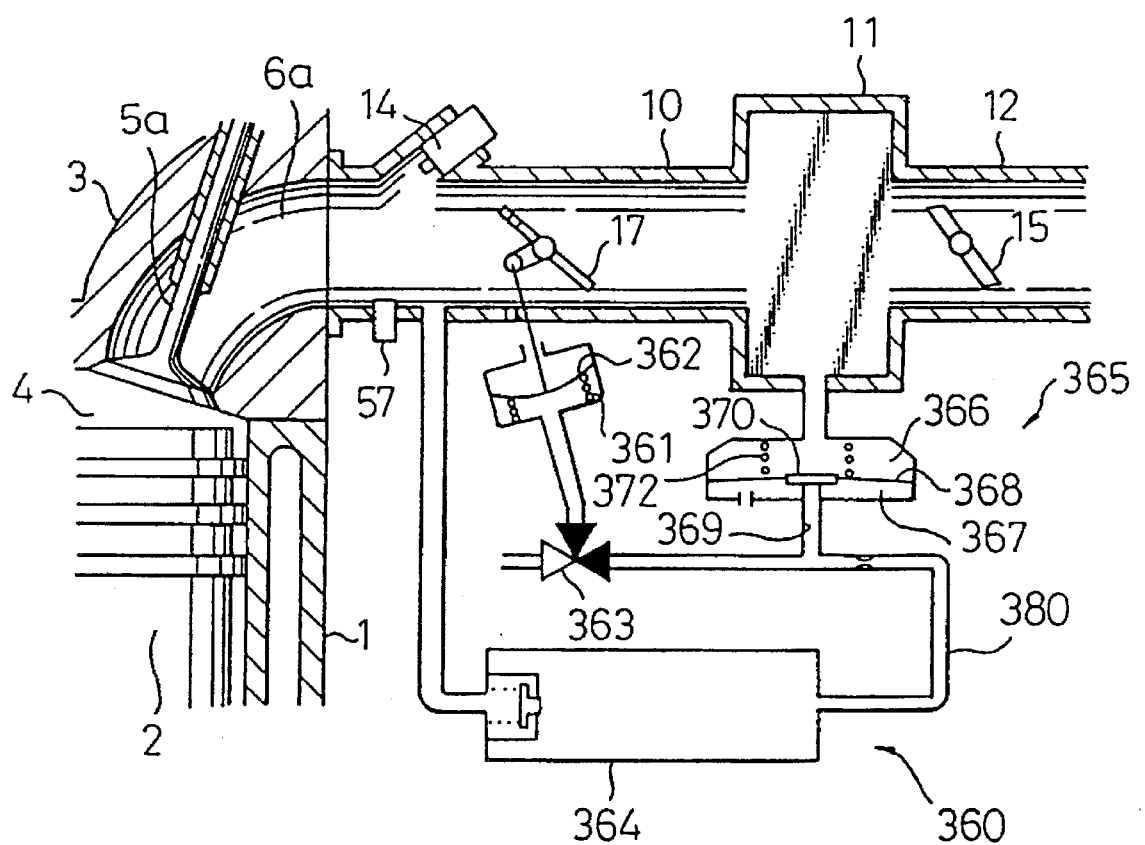
FIGS. 67 and 68 are enlarged views explaining the operation of an air-flow control valve of the engine.
Figure 68:
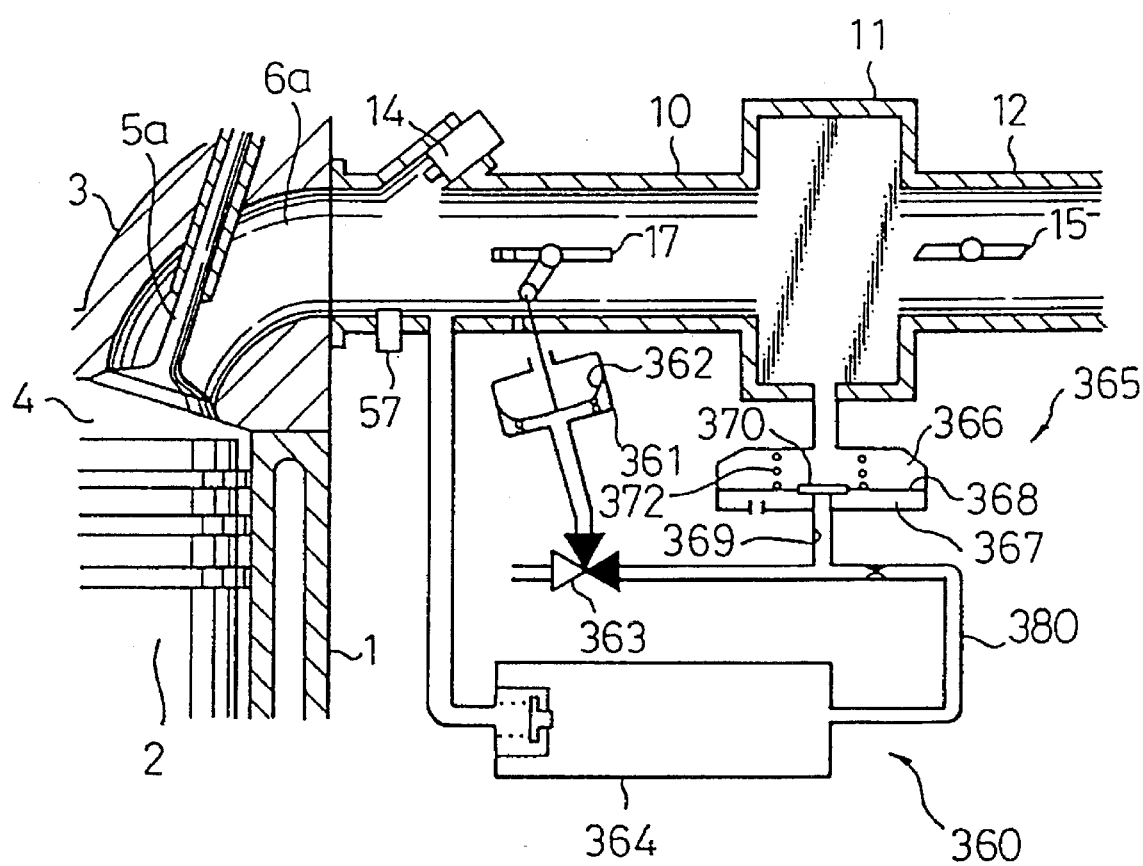

FIGS. 67 and 68 show situations after the engine starting operation has been completed. After the engine starting operation completes, the 3-way valve 363 continuously connects the vacuum chamber 361 to the vacuum tank 364. As a result, the negative pressure in the vacuum tank 364 is introduced into the vacuum chamber 361 through the vacuum path 380, to thereby displace the diaphragm 362 and open the valve 17.

As the degree of opening TA becomes smaller, the negative pressure in the surge tank 11 increases. When the pressure difference between the atmospheric pressure and the negative pressure in the surge tank 11 exceeds, for example, 50 mmHg, the diaphragm 368 of the modulator 365 displaces against the force of the spring 372, as shown in FIG. 57. This results in opening the vacuum control port 369 to the atmospheric chamber 367. Then, the negative pressure introduced into the vacuum chamber 361 through the vacuum path 380 weakens to drive the valve 17 in a closing direction. Then, the negative pressure in the surge tank 11 weakens to reduce the pressure difference between the atmospheric pressure and the negative pressure in the surge tank 11. As a result, the diaphragm 368 of the modulator 365 is pushed back by the spring 372 to close the vacuum control port 369 and drive the valve 17 in an opening direction. These opening and closing actions of the vacuum control port 369 are repeated until a balanced state is obtained. In this way, a given degree of opening of the throttle valve 15 determines the degree of opening of the valve 17.

If the degree of opening TA of the throttle valve 15 increases, the negative pressure in the surge tank 11 weakens to close the vacuum control port 369 and increase a negative pressure introduced into the vacuum chamber 361. As a result, the valve 17 is driven in an opening direction. Then, the negative pressure in the surge tank 11 increases to open the vacuum control port 369 and reduce the negative pressure introduced into the vacuum chamber 351. This results in driving the valve 17 in a closing direction. These opening and closing operations of the vacuum control port 369 are repeated until a balanced state is obtained. In this way, the pressure difference between the atmospheric pressure and the pressure in the surge tank 11 may be maintained substantially constant without regard to the degree of opening TA. As a result, the pressure in the intake ports 6a and 6b linearly rises according to an increase in the degree of opening TA. Namely, the amount of Q air fed into the engine is linearly increased according to an increase in the degree of opening TA. This results in improving drivability, i.e., the engine operator may sense an acceleration while the operator is depressing the accelerator pedal. When the valve 17 is at the intermediate open position, air guided by the valve 17 flows toward and then hits the fuel injected by the injector 14.

Figure 69:
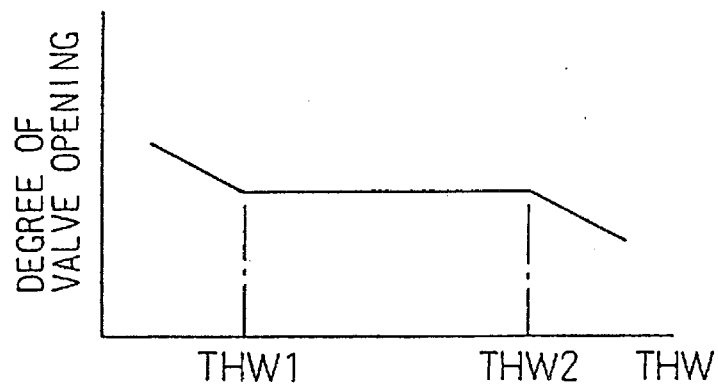
FIG. 69 is a diagram illustrating control of the degree of opening of an air-flow control valve at the engine starting operation.

Next, another embodiment of control of the degree of opening of an air-flow control valve 17 during an engine starting operation will be explained with reference to FIG. 69. This valve 17 has a disk 19 that is not provided with the hole as shown in FIG. 1.

When the temperature THW of engine cooling water is very low, a friction loss rises to increase a pumping loss. The high pumping loss makes it difficult to surely and quickly start the engine. To avoid this problem, the degree of opening of the valve 17 is enlarged when the cooling water temperature THW is below a first reference temperature THW1, to suppress an increase in the pumping loss. As a result, the engine is surely and speedily started even if the temperature of the engine is very low.

When the cooling water temperature THW is too high, fuel supplied to the fuel injector 14 may contain bubbles. The bubbles reduce the amount of fuel injected by the fuel injector 14 to an insufficient level. Then, the engine will not be surely and speedily started. To solve this problem, the degree of opening of the valve 17 is reduced when the cooling water temperature THW is higher than a second reference temperature THW2 as shown in FIG. 69, to thereby increase the negative pressure in the branch 10 downstream of the valve 17. The fuel injector 14 usually injects fuel according to a pressure difference between the pressure in a fuel path for supplying fuel to the fuel injector 14 and the pressure in the branch 10. Accordingly, increasing the negative pressure in the branch 10 will increase the pressure for injecting fuel and then the amount of the injected fuel. This results in injecting a proper amount of fuel even if the engine temperature is very high. When the cooling water temperature THW is between the first reference temperature THW1 and the second reference temperature THW2, the degree of opening of the valve 17 is set such that the amount of air passing through the valve 17 is substantially equal to the amount of air passing through the hole 20.

Figure 70:
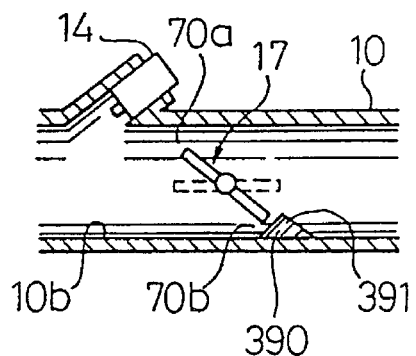
FIG. 70 is an enlarged sectional view illustrating another embodiment of a branch of the engine.

FIG. 70 shows another embodiment of the branch 10 of the engine according to the present invention.

A lower wall part 10b of the branch 10 has a block member 390 circumferentially extending of the branch 10. When the air-flow control valve 17 is at the intermediate open position as shown in FIG. 5, the block member 390 closes a gap 70b between the lower wall part 10b and the valve 17. A slope 391 of the member 390 guides air toward a gap 70a formed between an upper wall part 10a of the branch 10 and the valve 17. As a result, most of air that flows along the valve 17, which is at the intermediate open position, passes through the gap 70a. The air is then guided toward the fuel injector 14 and hits fuel injected by the fuel injector 14, to atomize the fuel. When the valve 17 is at the full open position, the member 390 does not close the gap 70b. Namely, a flow of air is not blocked by the member 390 and a proper amount of air fed into the engine is secured.

Figure 71:
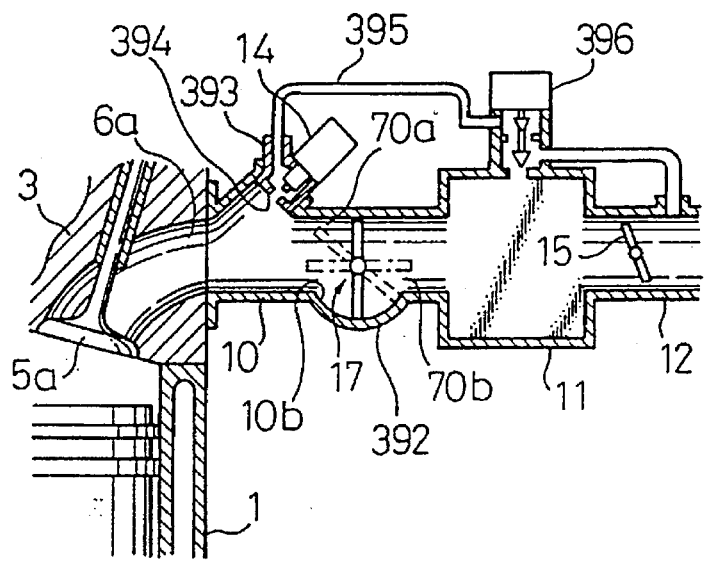
FIG. 71 is an enlarged sectional view illustrating still another embodiment of a branch of the engine.

FIG. 71 shows still another embodiment of the branch 10.

A lower wall part 10b of the branch 10 has a depression 392, which is in contact with the disk 19 of the air-flow control valve 17. When the degree of opening of the valve 17 is smaller than that shown in FIG. 5, the disk 19 of the valve 17 is in contact with the surface of depression 392, to close a gap 70b between the valve 17 and the lower wall part 10b. In this case, substantially all of air flowing along the valve 17 passes through a gap 70a formed between an upper wall 10a of the branch 10 and the valve 17. Namely, all air is guided toward the fuel injector 14, to further atomize fuel injected by the fuel injector 14. When the valve 17 is largely opened, the disk 19 moves away from the depression 392, to open the gap 70b and secure a proper amount of air fed into the engine.

As shown in FIG. 71, the fuel injector 14 is arranged in an air assist chamber 393. The air assist chamber 393 is connected, at one end, to the branch 10 through a fuel-air injection port 394, and, at the other end, to a bypass control valve 396 through an air assist path 395. The bypass control valve 396 is connected to the intake duct 12 upstream of the throttle valve 15. The fuel injector 14 injects fuel into the air assist chamber 393, and the air assist path 395 supplies air into the air assist chamber 393. The fuel and air are injected into the branch 10 through the fuel-air injection port 394, and thereby the injected fuel is atomized. The injected fuel is further atomized by air guided by the valve 17.

When the valve 17 is at an intermediate open position, for example, a half open position as shown in FIG. 5, the negative pressure in the branch 10 downstream of the valve 17 increases. Air supplied into the air assist chamber 393 through the air assist path 395 is driven by a pressure difference between the atmospheric pressure and the pressure in the branch 10 downstream of the valve 17. Accordingly, the amount of air supplied to the air assist chamber 393 increases as the negative pressure in the branch 10 increases. Accordingly, injected fuel is further atomized when the valve 17 is at the intermediate open position, to secure good combustion.

Figure 72:
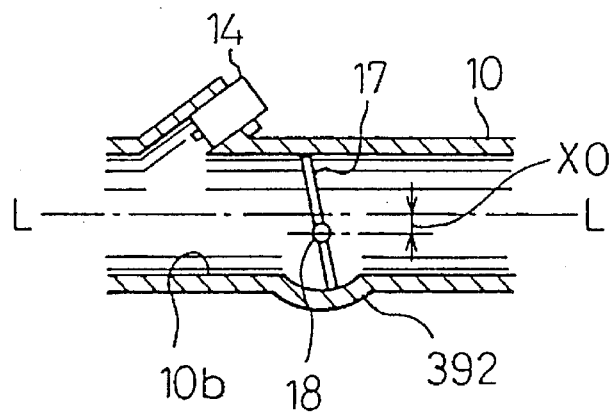
FIG. 72 is an enlarged sectional view illustrating another embodiment of arrangement of the air-flow control valve.

FIG. 72 shows a position for arranging the air-flow control valve 17 according to the present invention.

According to the preceding embodiments, the shaft 18 of the valve 17 is arranged on the axis L—L of the branch 10, and therefore, the rotation axis of the valve 17 is arranged on the axis L—L. In the embodiment shown in FIG. 72, the shaft 18, i.e., the rotation axis of the valve 17 is arranged at a position that is eccentric opposite to the fuel injector 14 with respect to the axis L—L of the branch 10. The eccentricity of the rotation axis of the valve 17 with respect to the center axis L—L is X0 as shown in FIG. 72. The lower wall part 10b of the branch 10 is provided with a depression 392, similar to the embodiment shown in FIG. 71. When the valve 17 is at a half open position, the disk 19 of the valve 17 is in contact with the surface of the depression 392. When the degree of opening 17 becomes larger than that at the half open position, the disk 19 separates from the depression 392.

The eccentricity of the rotational axis of the air-flow control valve 17 will be explained with reference to FIGS. 73 and 74.

Figure 73:
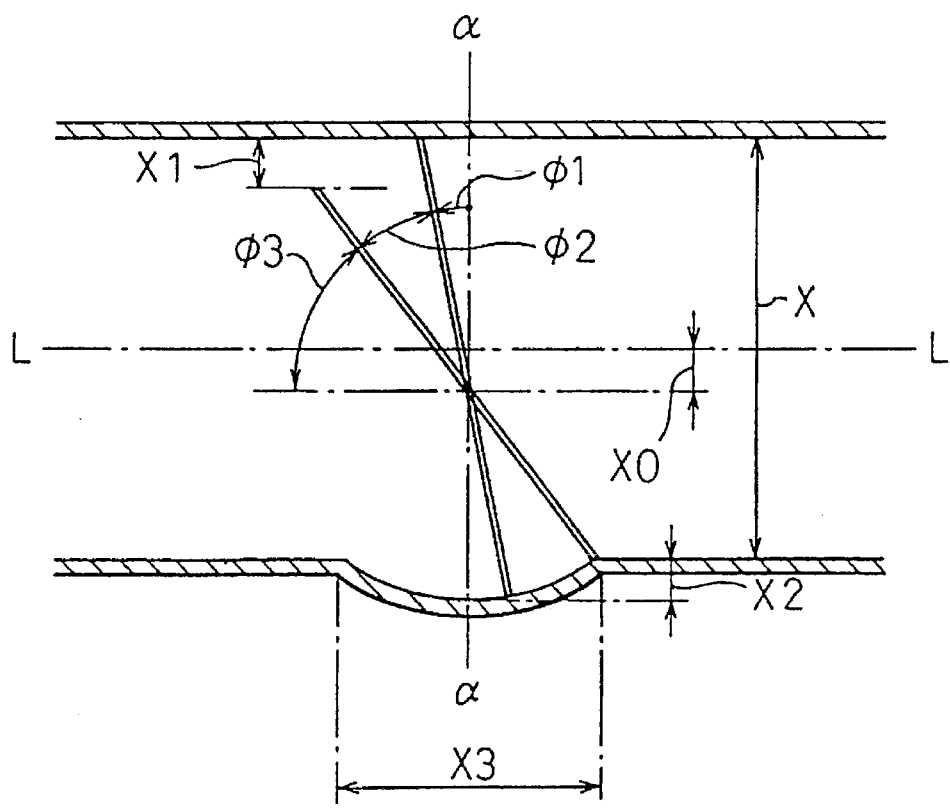
FIG. 73 is an enlarged sectional view explaining the parameters for arranging the air-flow control valve of FIG. 72.

As shown in FIG. 73, the branch 10 has a diameter of X. A vertical plane α—α is orthogonal to the axis L—L of the branch 10 and contains the shaft 18 of the valve 17. When the valve 17 is closed, the disk 19 forms an angle of φ1 with respect to the vertical plane α—α. When the valve 17 is changed from the closed position to a half open position, an angle of rotation of the valve 17 is φ2. When the valve 17 is changed from the half open position to the full open position, an angle of rotation of the valve 17 is φ3. When the valve 17 is at the half open position, the upper disk part 19a of the disk 19 is distanced from the upper wall part 10a of the branch 10 by X1, which is expressed as follows:

$$X1=(X/2+X0)\cdot(1-\sin\phi3/\cos\phi1)$$

The depth X2 of the depression 392 is expressed as follows:

$$X2=(X/2-X0)\cdot(\cos\phi1/\sin\phi3-1)$$

where X1 represents the area of the gap 70a formed between the upper disk part 19a and the upper wall part 10a, and X2 represents the total size of the branch 10.

Figure 74:
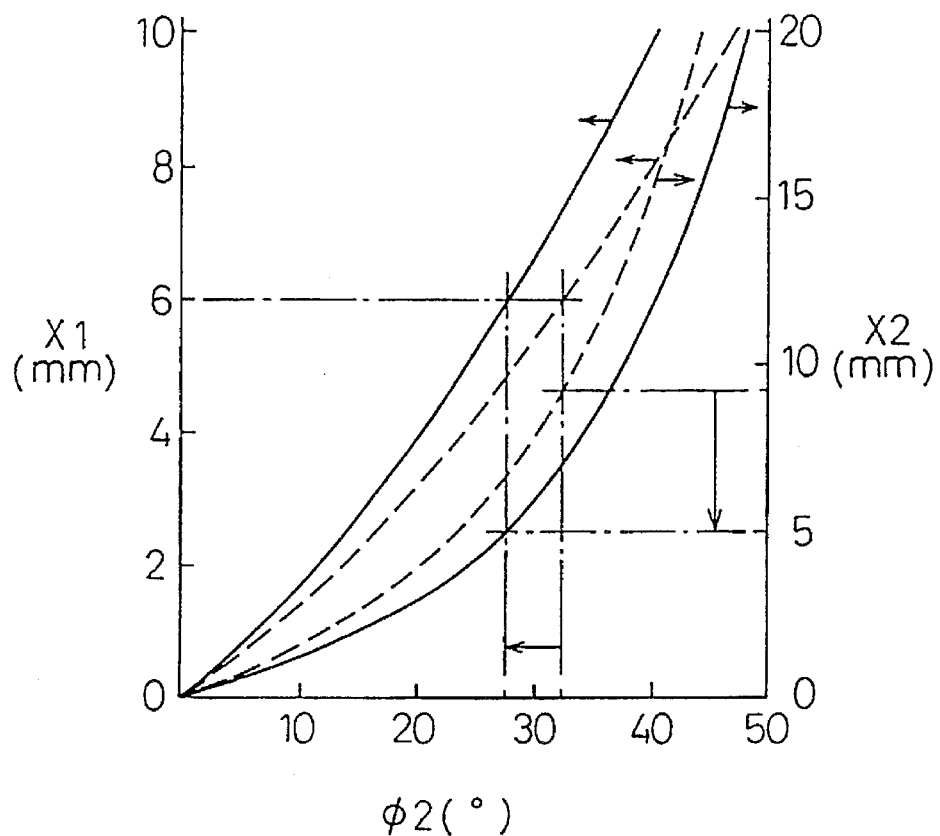
FIG. 74 is a diagram illustrating the relationships between the parameters shown in FIG. 73.

FIG. 74 shows an example of the relationships between the φ2, X1, and X2 when X=34 mm. Continuous lines are obtained when the rotation axis of the air-flow control valve 17 is eccentric by 5 mm, i.e., X0=5 mm. Dotted lines are obtained when the rotation axis of the valve 17 is concentric with X0=0 mm. When X1=6 mm to secure a proper amount of air fed into the engine with the valve 17 being at the half open position, the angle φ2 is about 32 degrees when the rotation axis of the valve 17 is concentric, and when the rotation axis of the valve 17 is eccentric, the angle φ2 is about 28 degrees. Namely, when the rotation center of the valve 17 is eccentric, the rotation angle of the valve 17 during it is changed from the closed position to the half open position is small. As a result, the valve 17 can be quickly changed from the closed position to the half open position as soon as an engine starting operation is completed, to thereby improve the engine starting performance. When X1=6 mm, the amount of air fed into the engine required when the valve 17 is at the half open position is secured to properly atomize injected fuel.

When the rotation axis of the valve 17 is concentric, the angle φ2 is about 32 degrees, and therefore, the depth X2 is about 9 mm. When the rotation axis of the valve 17 is eccentric, the angle φ2 is about 28 degrees, and therefore, the depth X2 is about 5 mm. In this way, the depth of the depression 392 may be shortened by eccentrically arranging the rotation axis of the valve 17. When the depth X2 is reduced, the axial length X3 of the depression 392 is shortened, to thereby reduce the total size of the branch 10.

Figure 75:
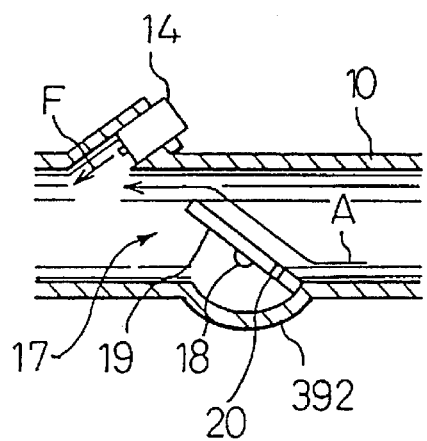
FIG. 75 is an enlarged sectional view illustrating another embodiment of an air-flow control valve.

FIG. 75 shows another embodiment of the air-flow control valve 17 according to the present invention.

The valve 17 has a shaft 18 having a semicircular cross section. A disk 19 is fixed to the flat face of the shaft 18 with screws or adhesives. The shaft 18 is downstream of the disk 19 in an air flow. Accordingly, the upstream surface of the valve 17 is substantially flat.

Figure 76:
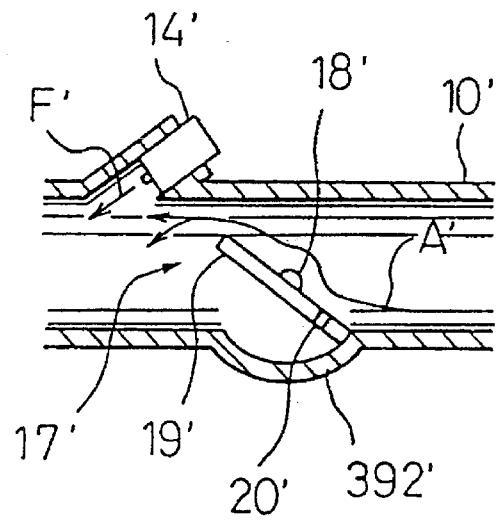
FIG. 76 is an enlarged sectional view illustrating an unpreferable embodiment of an air-flow control valve.

FIG. 76 shows an unpreferable embodiment of the air-flow control valve 17. The lower end of an air-flow control valve 17' is in contact with a concave 392', so that air N flows along the upstream surface of the valve 17' and hits fuel F' injected by a fuel injector 14'. A shaft 18' of the valve 17' is provided upstream of a valve disk 19' in an air flow, and therefore, the upstream surface of the valve 17' is not flat. Accordingly, the air A' is disturbed by the shaft 18'. When the disturbed air A' hits the injected fuel F', the directivity of the fuel F' is deteriorated. In addition, arranging the shaft upstream of the disk 19' increases a pressure loss due to the valve 17'.

To solve this problem, the upstream surface of the air-flow control valve 17 shown in FIG. 75 is substantially flat, so that air A smoothly flows along the upstream surface of the valve 17. This results in improving the directivity of the air A. The air A hits and properly atomizes the injected fuel F without deteriorating the directivity of the fuel. In addition, this arrangement minimizes a pressure loss due to the valve 17.

Figure 77:
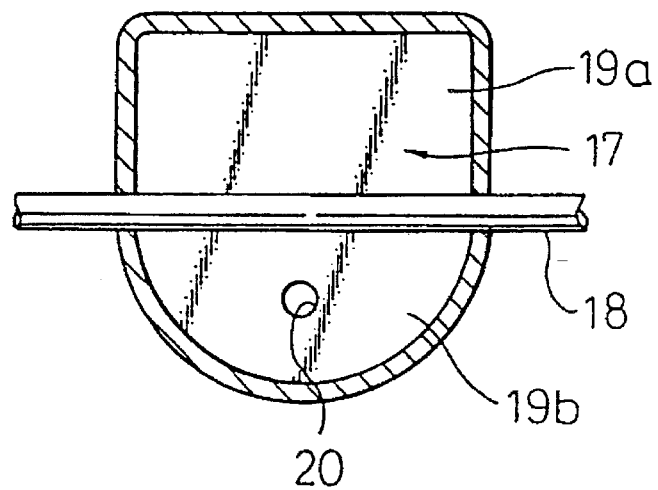
FIG. 77 is a back view illustrating the air-flow control valve shown in FIG. 75.

As shown in FIGS. 75 and 77, the air-flow control valve 17 has a hole 20 on a lower disk part 19b. When the valve 17 is at the half open position, the air A smoothly flows along the valve 17, to improve the velocity of the air A. This results in lowering the pressure in the branch 10 around the downstream surface of the valve 17. Then, part of the atomized fuel F may adhere to the downstream surface of the valve 17. To avoid this problem, the lower disk part 19b of the valve 17 is provided with the hole 20 to jet air, which advances along the downstream surface of the valve 17 and blows off the fuel therefrom.

Referring to FIG. 77, the lower disk part 19b of the valve 17 is semicircular, and the upper disk part 19a thereof is rectangular. The depression 392 is a spherical bore with which the semicircular lower disk part 19b is in contact. This results in reducing air from leaking through the gap between the depression 392 and the lower disk part 19b when the degree of opening of the valve 17 is smaller than the half open position. The rectangular upper disk part 19a enlarges the gap formed between the upper disk part 19a and the inner wall of the branch 10 when the valve 17 is at the half open position. This results in reducing the angle φ2 shown in FIG. 73, so that the valve 17 may be quickly changed from the closed position to the half open position when an engine starting operation is completed.

Figure 78A:
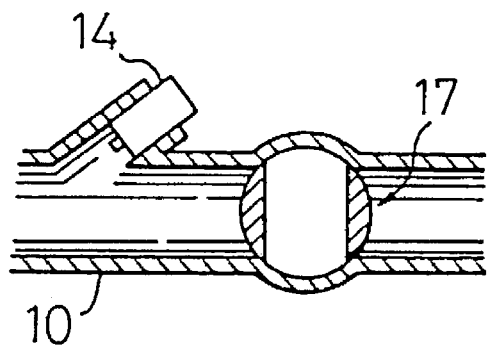
FIGS. 78A through 78C are enlarged sectional views illustrating still another embodiment of an air-flow control valve.
Figure 78B:
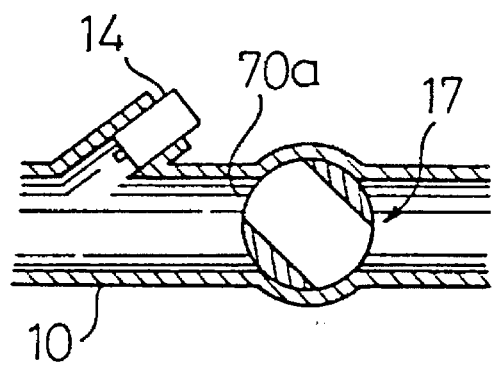
Figure 78C:
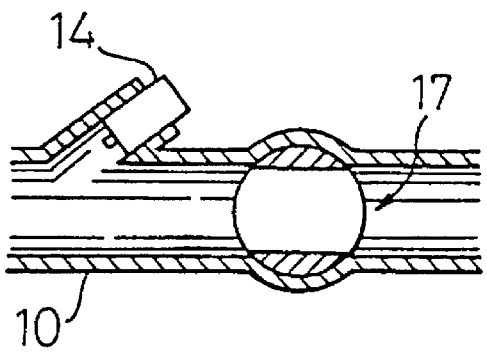

FIGS. 78A to 78C show still another embodiment of the air-flow control valve 17.

The valve 17 is a rotary valve. In FIG. 78A, the valve 17 is closed. In FIG. 78B, the valve 17 is at a half open position. In FIG. 78C, the valve 17 is at a full open position. In FIG. 78B, all air passing through the valve 17 flows through a gap 70a and is guided toward the fuel injector 14, to surely atomize injected fuel without the blocking member 390 shown in FIG. 70.

According to the present invention, it is possible to promote atomization of the injected fuel to ensure a proper combustion, while suppressing a discharge of unburned HC at an engine starting operation.

While the invention has been described by reference to specific embodiments chosen from purposes of illustration, it should be apparent that numerous modifications could be made thereto by those skilled in the art without departing from the basic concept and scope of the invention.

We claim:

1. An engine having an intake passage, a throttle valve arranged in the intake passage, and a fuel injector arranged in the intake passage downstream of the throttle valve for injecting fuel into the intake passage, the engine comprising:

an air-flow control valve arranged in the intake passage between the fuel injector and the throttle valve; and valve control means for controlling a valve position of the air-flow control valve, the valve control means normally controlling the air-flow control valve to an intermediate open position which is between a closed position and a full open position thereof when an engine load is lower than a reference load depending on an engine speed, and to the full open position when the engine load is higher than the reference load, wherein the fuel injector carries out a synchronous fuel injection in which a fuel injection by the fuel injector is carried out at an intake stroke of the engine when the air-flow control valve is controlled to the intermediate open position, and carries out an asynchronous fuel injection in which the fuel injection is carried out at an engine stroke other than the intake stroke when the air-flow control valve is controlled to the full open position, and wherein the engine further comprises fuel injection control means for controlling the fuel injector so that fuel injection type is changed regardless of the valve position of the air-flow control valve depending on an engine operating condition.

2. An engine according to claim 1, the fuel injection control means comprising determining means for determining whether a rapid accelerating operation of the engine is carried out when the air-flow control valve is controlled from the intermediate open position to the full open position, wherein the fuel injection control means controls the fuel injector so that the fuel injection type is changed from the synchronous injection to the asynchronous injection after the air-flow control valve is controlled to the full open position when the determining means determines that the rapid accelerating operation of the engine is carried out, and that the fuel injection type is changed from the synchronous injection to the asynchronous injection before the air-flow control valve is controlled to the full open position when the determining means determines that the slow accelerating operation of the engine is carried out.

3. An engine according to claim 2, wherein the determining means determines whether the rapid accelerating operation of the engine is carried out when the engine load exceeds a first selected load which is slightly smaller than the reference load.

4. An engine according to claim 3, wherein, when the determining means determines that the slow accelerating operation of the engine is carried out, the fuel injection type is changed from the synchronous injection to the asynchronous injection when the engine load exceeds the first selected load.

5. An engine according to claim 2, wherein, when the determining means determines that the rapid accelerating operation of the engine is carried out, the fuel injection type is changed from the synchronous injection to the asynchronous injection when the accelerating operation of the engine finishes.

6. An engine according to claim 1, the fuel injection control means comprising determining means for determining whether a rapid decelerating operation of the engine is carried out when the air-flow control valve is controlled from the full open position to the intermediate open position, wherein the fuel injection control means controls the fuel injector so that the fuel injection type is changed from asynchronous injection to synchronous injection after the air-flow control valve is controlled to the intermediate open position when the determining means determines that the rapid decelerating operation of the engine is carried out, and that the fuel injection type is changed from asynchronous injection to synchronous injection before the air-flow control valve is controlled to the intermediate open position when the determining means determines that the slow accelerating operation of the engine is carried out.

7. An engine according to claim 6, wherein the determining means determines whether the rapid decelerating operation of the engine is carried out when the engine load falls below a second selected load which is slightly larger than the reference load.

8. An engine according to claim 7, wherein, when the determining means determines that the slow decelerating operation of the engine is carried out, the fuel injection type is changed from the asynchronous injection to the synchronous injection when the engine load falls below the second selected load.

9. An engine according to claim 6, wherein, when the determining means determines that the rapid decelerating operation of the engine is carried out, the fuel injection type is changed from the asynchronous injection to the synchronous injection when the decelerating operation of the engine finishes.

10. An engine according to claim 1, wherein the fuel injection is carried out at a compression stroke of the engine when the asynchronous injection is selected.

* * * * *

UNITED STATES PATENT AND TRADEMARK OFFICE
CERTIFICATE OF CORRECTION

PATENT NO. : 5,662,088
DATED : September 2, 1997
INVENTOR(S) Hiroki ICHINOSE, et al.

It is certified that error appears in the above-identified patent and that said Letters Patent is hereby corrected as shown below:

Column 1, line 60, change "a engine" to --an engine--.

Column 3, line 55, change "end" to --and--.

Column 5, line 14, change "35" to --36--.

Column 8, line 27, insert --so-- before "that".

Column 9, line 53, "When the engine..." should start a new paragraph.

Column 10, line 7, change "5a" to --6a--, and change "end" to --and--.

Column 13, line 45, after "step" insert --93--.

Column 13, line 47, change "%he" to --the--.

Column 14, line 5, change "$\zeta a2,$" to --$\zeta_\Delta 2,$--.

Column 14, line 43, change "...Q/N1-" to --...Q/N1·--.

Column 15, line 25, change "came," to --case,--.

Column 16, line 24, change "lead" to --load--.

Column 16, line 25, change "lead" to --load--.

UNITED STATES PATENT AND TRADEMARK OFFICE
CERTIFICATE OF CORRECTION

PATENT NO. : 5,662,088
DATED : September 2, 1997
INVENTOR(S) : Hiroki ICHINOSE, et al.

It is certified that error appears in the above-identified patent and that said Letters Patent is hereby corrected as shown below:

Column 16, line 34, change "lead" to --load-- (both occurrences).

Column 16, line 53, change "lead" to --load-- (both occurrences).

Column 17, line 1, before "changed" insert --is--.

Column 17, line 17, after "exceeds" insert --a--.

Column 17, line 29, change "...(A)-" to --...(A)·--.

Column 18, line 30, change "atmoshpere," to --atmosphere.--.

Column 18, line 34, change "175" to --176--.

Column 20, line 7, change "tame" to --time--.

Column 20, line 8, change "came," to --case,--.

Column 20, line 37, delete the comma after "condition" and insert a period.

UNITED STATES PATENT AND TRADEMARK OFFICE
CERTIFICATE OF CORRECTION

PATENT NO. : 5,662,088
DATED : September 2, 1997
INVENTOR(S) : Hiroki ICHINOSE, et al.

It is certified that error appears in the above-identified patent and that said Letters Patent is hereby corrected as shown below:

Column 20, line 55, after "it" insert --is--.

Column 21, line 4, after "apparatus" insert --16.--.

Column 21, line 47, change "175" to --172--.

Column 21, line 66, after "embodiment" insert --of--.

Column 23, line 32, after "175" insert --is--.

Column 24, line 2, change "end" to --and--.

Column 25, line 5, change "reaching" to --reading--.

Column 25, line 9, change "an other" to --another--.

Column 26, line 56, change "PMAVE-..." to --PMAVE·..---.

Column 26, line 57, change "PMAVE...." to --PMAVE·..---.

Column 26, line 64, change "PMAVE..." to --PMAVE·..---.

Column 27, line 4, change "AVE-..." to --AVE·...---.

Column 28, line 1, change "timer" to --time,--.

Column 28, line 8, change "82" to θ2--.

Column 28, line 36, change "increases," to --increase.--

UNITED STATES PATENT AND TRADEMARK OFFICE
CERTIFICATE OF CORRECTION

PATENT NO. : 5,662,088
DATED : September 2, 1997
INVENTOR(S) : Hiroki ICHINOSE, et al.

It is certified that error appears in the above-identified patent and that said Letters Patent is hereby corrected as shown below:

Column 28, line 50, change "thing" to --timing--.

Column 28, line 58, change "torque-" to --torque.--

Column 28, line 67, change "tooling" to --cooling--.

Column 29, line 2, change "retardante" to --retardance--.

Column 29, line 16, before "is" insert --θK--.

Column 29, line 23, change "255" to --265--.

Column 29, line 42, change "5a" to --6a--.

Column 29, line 44, change "4," to --4.--.

Column 30, line 18, delete "C".

Column 30, line 32, change "end" to --and--.

Column 31, line 40, change "285." to --286.--.

Column 32, line 21, change "5a" to --6a--.

Column 32, line 38, change "position," to --position.--.

Column 32, line 43, change "5b" to --6b--.

UNITED STATES PATENT AND TRADEMARK OFFICE
CERTIFICATE OF CORRECTION

PATENT NO. : 5,662,088
DATED : September 2, 1997
INVENTOR(S) : Hiroki ICHINOSE, et al.

It is certified that error appears in the above-identified patent and that said Letters Patent is hereby corrected as shown below:

Column 32, line 48, after "results" insert --in--.

Column 32, line 60, change "am" to --an--.

Column 33, line 4, after "degree" insert --of--.

Column 33, line 31, change "(S3)" to --(B3)--.

Column 33, line 45, change "TEW" to --THW--.

Column 34, line 16, change "wager" to --water--.

Column 34, line 37, change "M" to --N--.

Column 35, line 1, change "a" to --an--.

Column 35, line 5, after "unit" insert --50.--.

Column 35, line 56, after "increased to" insert --OL1--.

Column 37, line 57, change "con, rolled" to --controlled--.

Column 38, line 24, change "355" to --356--.

Column 38, line 39, change "N NEX1" to --N<NEX1--.

UNITED STATES PATENT AND TRADEMARK OFFICE
CERTIFICATE OF CORRECTION

PATENT NO. : 5,662,088
DATED : September 2, 1997
INVENTOR(S) : Hiroki ICHINOSE, et al.

It is certified that error appears in the above-identified patent and that said Letters Patent is hereby corrected as shown below:

Column 39, line 31, after "unit" insert --which--.

Column 42, line 4, change "circumferentially extending of" to --forming a circumferential extention of--.

Column 43, line 42, change "during it" to --during which time--.

Column 44, line 1, change "N" to --A'--.

Column 44, line 32, change "contact," to --contact.--.

Column 44, line 43, change "7θC" to --78C--.

Column 44, line 57, change "from" to --for--.

Signed and Sealed this

Sixteenth Day of February, 1999

Attest:

*Attesting Officer*

*Acting Commissioner of Patents and Trademarks*